United States Patent
Kawasumi et al.

(10) Patent No.: US 11,355,782 B2
(45) Date of Patent: Jun. 7, 2022

(54) ELECTROLYTIC SOLUTION FOR SECONDARY BATTERIES, SECONDARY BATTERY, BATTERY PACK, ELECTRIC VEHICLE, ELECTRIC POWER STORAGE SYSTEM, ELECTRIC POWER TOOL, AND ELECTRONIC DEVICE

(71) Applicant: MURATA MANUFACTURING CO., LTD., Kyoto (JP)

(72) Inventors: Katsuaki Kawasumi, Kyoto (JP); Toru Odani, Kyoto (JP); Kazumasa Takeshi, Kyoto (JP)

(73) Assignee: Murata Manufacturing Co., Ltd., Kyoto (JP)

(*) Notice: Subject to any disclaimer, the term of this patent is extended or adjusted under 35 U.S.C. 154(b) by 176 days.

(21) Appl. No.: 16/752,992

(22) Filed: Jan. 27, 2020

(65) Prior Publication Data

US 2020/0161707 A1    May 21, 2020

Related U.S. Application Data

(63) Continuation of application No. PCT/JP2018/026739, filed on Jul. 17, 2018.

(30) Foreign Application Priority Data

Jul. 27, 2017  (JP) .............................. JP2017-145116

(51) Int. Cl.
*H01M 10/0568*  (2010.01)
*H01M 4/133*    (2010.01)
*H01M 4/134*    (2010.01)
*H01M 10/0525*  (2010.01)
*H01M 4/02*     (2006.01)

(52) U.S. Cl.
CPC ....... *H01M 10/0568* (2013.01); *H01M 4/133* (2013.01); *H01M 4/134* (2013.01); *H01M 10/0525* (2013.01); *H01M 2004/027* (2013.01); *H01M 2004/028* (2013.01); *H01M 2220/20* (2013.01); *H01M 2300/0054* (2013.01)

(58) Field of Classification Search
None
See application file for complete search history.

(56) References Cited

U.S. PATENT DOCUMENTS

2017/0210764 A1*  7/2017  Maeda ............. H01M 10/0525
2018/0040916 A1   2/2018  Tsuda et al.

FOREIGN PATENT DOCUMENTS

| JP | 2002241335 A | 8/2002 |
| JP | 2010146899 A | 7/2010 |
| JP | 2016131059 A | 7/2016 |
| JP | 2016162553 A | 9/2016 |
| WO | 2016017362 A1 | 2/2016 |
| WO | 2017098850 A1 | 6/2017 |

OTHER PUBLICATIONS

Machine Translation of JP 2002-241335 (Year: 2002).*
International Search Report for Application No. PCT/JP2018/026739, dated Oct. 9, 2018.
Chinese Office Action dated Dec. 31, 2021 in corresponding Chinese Application No. 201880048548.

* cited by examiner

*Primary Examiner* — Wyatt P McConnell
(74) *Attorney, Agent, or Firm* — K&L Gates LLP

(57) ABSTRACT

A secondary battery includes a positive electrode, a negative electrode, and an electrolytic solution including an unsaturated cyclic compound.

13 Claims, 7 Drawing Sheets

ELECTROLYTIC SOLUTION FOR SECONDARY BATTERIES, SECONDARY BATTERY, BATTERY PACK, ELECTRIC VEHICLE, ELECTRIC POWER STORAGE SYSTEM, ELECTRIC POWER TOOL, AND ELECTRONIC DEVICE

CROSS REFERENCE TO RELATED APPLICATIONS

The present application is a continuation of PCT patent application no. PCT/JP2018/026739, filed on Jul. 17, 2018, which claims priority to Japanese patent application no. JP2017-145116 filed on Jul. 27, 2017, the entire contents of which are being incorporated herein by reference.

BACKGROUND

The present disclosure relates to an electrolytic solution which can be used in secondary batteries; a secondary battery manufactured using the electrolytic solution; and a battery pack, an electric vehicle, an electric power storage system, an electric power tool and an electronic device each provided with the secondary battery.

Various electronic devices such as a mobile phone have been widely spread, and it has been demanded to reduce the sizes and weights of the electronic devices and to prolong the lives of the electronic devices. In response to this demand, the development of a secondary battery that has a small size and a lightweight and can achieve a high energy density has been advanced as a power supply.

The application of a secondary battery to electronic devices as well as other use applications has been studied. Examples of the use application include a battery pack which can be installed removably in an electronic device and the like, an electric vehicle such as an electric car, an electric power storage system such as an electric power server for home use, and an electric power tool such as an electric drill.

The secondary battery is provided with an electrolytic solution along with a positive electrode and a negative electrode. The chemical composition of the electrolytic solution can largely affect the battery properties of the secondary battery. Therefore, the chemical composition of the electrolytic solution has been studied extensively.

More specifically, in order to prevent the increase in the resistance of a battery during storage, a fluorinated unsaturated cyclic compound is used as an additive for an electrolytic solution.

SUMMARY

The present disclosure relates to an electrolytic solution which can be used in secondary batteries; a secondary battery manufactured using the electrolytic solution; and a battery pack, an electric vehicle, an electric power storage system, an electric power tool and an electronic device each provided with the secondary battery.

An electronic device or the like on which a secondary battery is to be mounted has been increasingly advanced in terms of the performance and functions thereof. In accordance with this movement, the use frequency of an electronic device or the like has been increasing and the use environment of an electronic device or the like has been expanded. Therefore, there is still room for the improvement in the battery properties of a secondary battery.

The present disclosure has been made for solving these problems, and the purpose of the present disclosure is to provide an electrolytic solution for secondary batteries which enables the achievement of excellent battery properties, a secondary battery, a battery pack, an electric vehicle, an electric power storage system, an electric power tool and an electronic device.

According to an embodiment of the present disclosure, an electrolytic solution for secondary batteries is provided. The electrolytic solution includes an unsaturated cyclic compound represented by Chemical Formula (1):

[Chemical Formula 1]

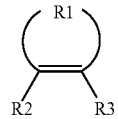

(1)

wherein:

R1 represents at least one group selected from the group consisting of a bivalent hydrocarbon group, a bivalent halogenated hydrocarbon group, a group having such a structure that at least one ether bond (—O—) is introduced into a bivalent hydrocarbon group, a group having such a structure that at least one ether bond is introduced into a bivalent halogenated hydrocarbon group, a group having such a structure that at least one carbonyl group (—C(=O)—) is introduced into a bivalent hydrocarbon group, a group having such a structure that at least one carbonyl group is introduced into a bivalent halogenated hydrocarbon group, a group having such a structure that at least one ether bond and at least one carbonyl group are introduced into a bivalent hydrocarbon group, and a group having such a structure that at least one ether bond and at least one carbonyl group are introduced into a bivalent halogenated hydrocarbon group; and R2 and R3 independently represent at least one group selected from the group consisting of a hydrogen group, a halogen group, a monovalent hydrocarbon group, a monovalent halogenated hydrocarbon group, a monovalent oxygen-containing hydrocarbon group, a monovalent halogenated oxygen-containing hydrocarbon group, and a monovalent group having such a structure that at least two of the aforementioned groups are bonded to each other, a ring including R1 and a carbon-carbon double bond (>C=C<) is a non-aromatic ring;

in a case R2 represents a hydrogen group, R3 represents a group other than a hydrogen group and a halogen group;

in a case R2 represents a halogen group, R3 represents a group other than a hydrogen group, a monovalent oxygen-containing hydrocarbon group and a monovalent halogenated oxygen-containing hydrocarbon group; and R2 and R3 is configured to be bonded to each other).

According to an embodiment of the present disclosure, a secondary battery is provided. The secondary battery includes a positive electrode, a negative electrode and an electrolytic solution, wherein the electrolytic solution has the same composition as that of the electrolytic solution for secondary batteries as described herein according to the present disclosure.

Each of the battery pack, the electric vehicle, the electric power storage system, the electric power tool and the electronic device is provided with a secondary battery, wherein the secondary battery has the same configuration as that of the secondary battery as described herein according to the present disclosure.

According to the electrolytic solution for secondary batteries and the secondary battery according to the present disclosure, the electrolytic solution contains the above-mentioned unsaturated cyclic compound and therefore excellent battery properties can be achieved. In each of the battery pack, the electric vehicle, the electric power storage system, the electric power tool and the electronic device according to the present disclosure, the same effects can be achieved.

The effect described herein is not necessarily limited, and may be any one of the effects described in the present disclosure.

DETAILED DESCRIPTION

Figure 1:
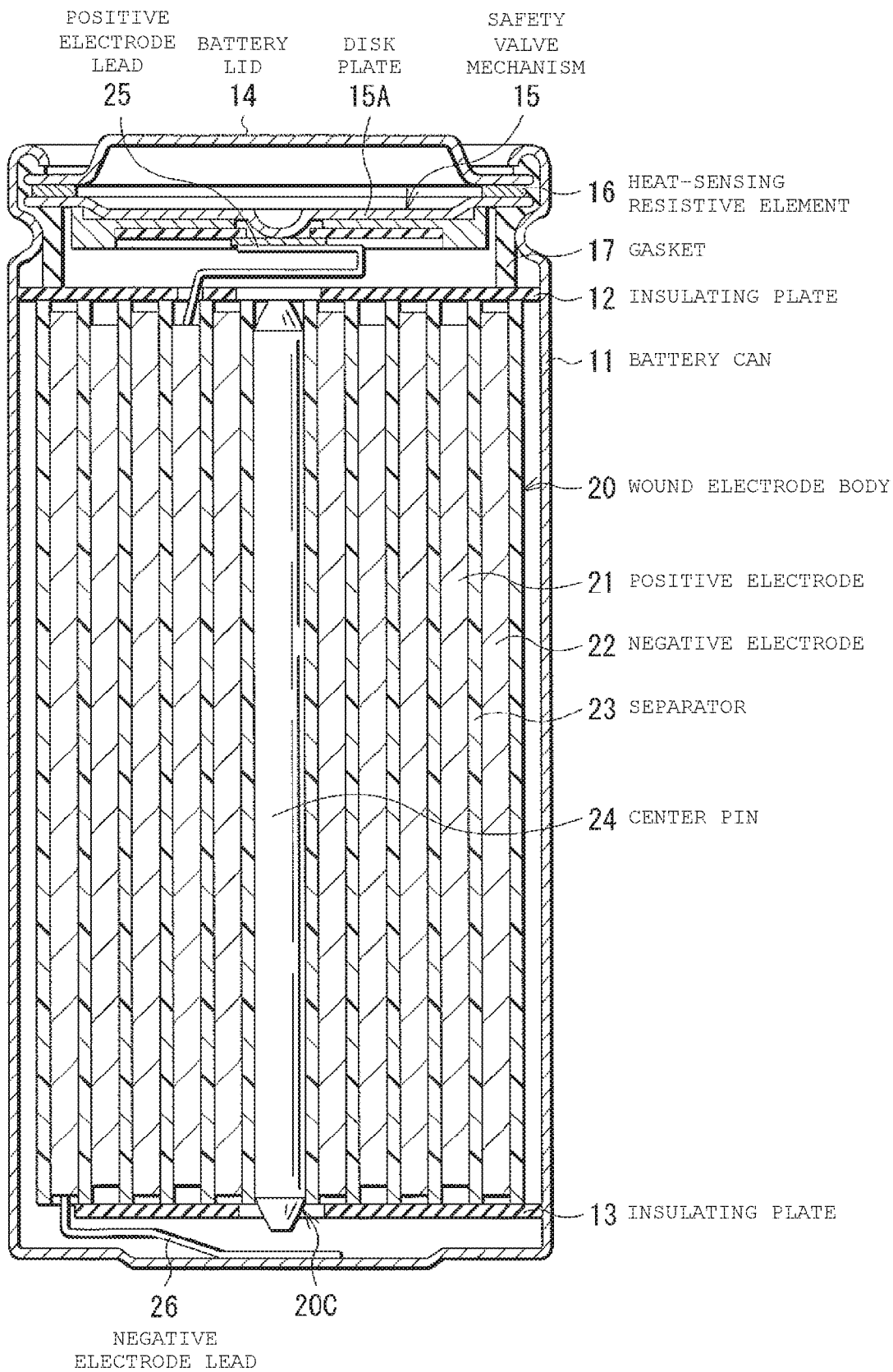
FIG. 1 is a cross-sectional view illustrating the configuration of a (cylinder-type) secondary battery according to an embodiment of the present disclosure.

As described herein, the present disclosure will be described based on examples with reference to the drawings, but the present disclosure is not to be considered limited to the examples, and various numerical values and materials in the examples are considered by way of example.

Firstly, an electrolytic solution for secondary batteries (also simply referred to as an "electrolytic solution", hereinafter) according to one embodiment of the present disclosure will be described.

The electrolytic solution described herein can be used mainly in a secondary battery. The type of the secondary battery is not particularly limited, and is, for example, a lithium ion secondary battery and a lithium metal secondary battery. Details about the lithium ion secondary battery and the lithium metal secondary battery are mentioned later.

At first, the constitution of the electrolytic solution will be described.

The electrolytic solution contains at least one unsaturated cyclic compound. More specifically, the unsaturated cyclic compound is a compound represented by the following Formula (1):

[Chemical Formula 1]

(1)

(wherein:

R1 represents any one group selected from a bivalent hydrocarbon group, a bivalent halogenated hydrocarbon group, a group having such a structure that at least one ether bond is introduced into a bivalent hydrocarbon group, a group having such a structure that at least one ether bond is introduced into a bivalent halogenated hydrocarbon group, a group having such a structure that at least one carbonyl group is introduced into a bivalent hydrocarbon group, a group having such a structure that at least one carbonyl group is introduced into a bivalent halogenated hydrocarbon group, a group having such a structure that at least one ether bond and at least one carbonyl group are introduced into a bivalent hydrocarbon group, and a group having such a structure that at least one ether bond and at least one carbonyl group are introduced into a bivalent halogenated hydrocarbon group; and R2 and R3 independently represent any one group selected from a hydrogen group, a halogen group, a monovalent hydrocarbon group, a monovalent halogenated hydrocarbon group, a monovalent oxygen-containing hydrocarbon group, a monovalent halogenated oxygen-containing hydrocarbon group, and a monovalent group having such a structure that at least two of the aforementioned groups are bonded to each other, provided that:

a ring containing R1 and a carbon-carbon double bond is a non-aromatic ring;

when R2 represents a hydrogen group, R3 represents a group other than a hydrogen group and a halogen group;

when R2 represents a halogen group, R3 represents a group other than a hydrogen group, a monovalent oxygen-containing hydrocarbon group and a monovalent halogenated oxygen-containing hydrocarbon group; and R2 and R3 may be bonded to each other).

As apparent from Formula (1), the unsaturated cyclic compound described herein is a compound in which two substituents (R2 and R3) are introduced into a non-aromatic ring containing R1 and a carbon-carbon double bond.

When the carbon-carbon double bond is represented by >C1=C2< (wherein C1 represents one of two carbon atoms that form the carbon-carbon double bond and C2 represents the other of the two carbon atoms), R2 is bonded to one carbon atom (C1) and R3 is bonded to the other carbon atom (C2).

The reason why the electrolytic solution contains the unsaturated cyclic compound is because the chemical stability of the electrolytic solution can be improved and therefore the decomposition reaction of the electrolytic solution can be prevented. In this case, since the decomposition reaction of the electrolytic solution is prevented, the generation of a gas resulting from the decomposition reaction of the electrolytic solution can also be prevented. Accordingly, the battery properties of a secondary battery using the electrolytic solution can be improved. In this case, even when the secondary battery is used (charged/discharged) particularly under a severe environment such as a high-temperature environment and a low-temperature environment and the secondary battery is stored in the severe environment, the decomposition reaction of the electrolytic solution can be prevented satisfactorily. As a result, the battery properties can be greatly improved.

(R1)

As mentioned above, R1 is any one group selected from a bivalent hydrocarbon group, a bivalent halogenated hydrocarbon group, a bivalent ether-introduced hydrocarbon group, a bivalent ether-introduced halogenated hydrocarbon group, a bivalent carbonyl-introduced hydrocarbon group, a bivalent carbonyl-introduced halogenated hydrocarbon group, a bivalent ether/carbonyl-introduced hydrocarbon group and a bivalent ether/carbonyl-introduced halogenated hydrocarbon group.

The term "bivalent ether-introduced hydrocarbon group" refers to a group having such a structure that at least one ether bond is introduced into a bivalent hydrocarbon group. The term "bivalent ether-introduced halogenated hydrocarbon group" refers to a group having such a structure that at least one ether bond is introduced into a bivalent halogenated hydrocarbon group. The term "bivalent carbonyl-introduced hydrocarbon group" refers to a group having such a structure that at least one carbonyl group is introduced into a bivalent hydrocarbon group. The term "bivalent carbonyl-introduced halogenated hydrocarbon group" refers to a group having such a structure that at least one carbonyl group is introduced into a bivalent halogenated hydrocarbon group. The term "bivalent ether/carbonyl-introduced hydrocarbon group" refers to a group having such a structure that at least one ether bond and at least one carbonyl group are introduced into a bivalent hydrocarbon group. The term "bivalent ether/carbonyl-introduced halogenated hydrocarbon group" refers to a group having such a structure that at least one ether bond and at least one carbonyl group are introduced into a bivalent halogenated hydrocarbon group.

A bivalent hydrocarbon group is a general term for bivalent groups each formed from carbon and hydrogen, and may have a linear form, or a branched form having at least one side chain, or a cyclic form. The bivalent hydrocarbon group may contain at least one carbon-carbon unsaturated bond, or may not contain the carbon-carbon unsaturated bond. The carbon-carbon unsaturated bond is, for example, a carbon-carbon double bond or a carbon-carbon triple bond (—C≡C—).

Specific examples of the bivalent hydrocarbon group include an alkylene group, an alkenylene group, an alkynylene group, a cycloalkylene group, an arylene group and a first bonded group. The term "first bonded group" refers to a bivalent group having such a structure that at least two of an alkylene group, an alkenylene group, an alkynylene group, a cycloalkylene group and an arylene group are bonded to each other.

The type of the alkylene group is not particularly limited, and is, for example, a methylene group, an ethylene group, a propylene group, a butylene group, a pentylene group, a hexylene group, a heptylene group, an octylene group, a nonylene group or a decylene group.

The type of the alkenylene group is not particularly limited, and is, for example, an ethenylene group, a propenylene group, a butenylene group, a pentenylene group, a hexenylene group, a heptenulene group, an octenylene group, a nonenylene group or a decenylene group.

The type of the alkynylene group is not particularly limited, and is, for example, an ethynylene group, a propynylene group, a butynylene group, a pentynylene group, a hexynylene group, a heptynylene group, an octynylene group, a nonylynene group and or a decynylene group.

The type of the cycloalkylene group is not particularly limited, and is, for example, a cyclopropylene group, a cyclobutylene group, a cyclopentylene group, a cyclohexylene group or a cyclodecylene group.

The type of the arylene group is not particularly limited, and is, for example, a phenylene group or a naphthylene group.

The number of carbon atom(s) in the alkylene group is not particularly limited, and is, for example, 1 to 3.

The number of carbon atoms in each of the alkenylene group and the alkynylene group is not particularly limited, and is, for example, 2 or 3. The number of carbon atoms in each of the cycloalkylene group and the arylene group is not particularly limited, and is, for example, 6 to 10.

This is because the solubility, compatibility and the like of the unsaturated cyclic compound can be improved.

The first bonded group is, for example, a bivalent group having such a structure that an alkylene group and an alkenylene group are bonded to each other, a bivalent group having such a structure that an alkylene group and an alkynylene group are bonded to each other, a bivalent group having such a structure that an alkylene group and a cycloalkylene group are bonded to each other, a bivalent group having such a structure that an alkylene group and an arylene group are bonded to each other, and a bivalent group having such a structure that a cycloalkylene group and an arylene group are bonded to each other.

The type of the first bonded group is not particularly limited, and is, for example, a benzylene group.

The bivalent halogenated hydrocarbon group is a group having such a structure that at least one hydrogen group in the above-mentioned bivalent hydrocarbon group is substituted by a halogen group.

The type of the halogen group to be contained in the bivalent halogenated hydrocarbon group is not particularly limited, and includes, for example, at least one group selected from a fluorine group, a chlorine group, a bromine group and an iodine group.

Particularly, the halogen group to be contained in the bivalent halogenated hydrocarbon group is preferably a fluorine group. This is because the chemical stability of the electrolytic solution containing the unsaturated cyclic compound can be further improved.

Particularly, the bivalent halogenated hydrocarbon group is preferably a perfluoro group having such a structure that each of hydrogen groups in the bivalent hydrocarbon group is substituted by a fluorine group. This is because the chemical stability of the electrolytic solution containing the unsaturated cyclic compound can be further improved.

The number of ether bond(s) to be introduced into the bivalent hydrocarbon group may be one, or may be two or more. When the number of ether bond(s) introduced into the bivalent hydrocarbon group is two or more, the two adjacent ether bonds may be bonded to each other directly without a part or the whole of the bivalent hydrocarbon group interposed therebetween, or may be bonded to each other indirectly with a part or the whole of the bivalent hydrocarbon group interposed therebetween.

The position at which the ether bond is introduced into the bivalent hydrocarbon group may be a terminal of the bivalent hydrocarbon group or in the middle of the bivalent hydrocarbon group.

More specifically, in an example in which one ether bond is introduced into a propylene group (—CH$_2$—CH$_2$—CH$_2$—) that is bivalent hydrocarbon group, the ether bond may be introduced into a terminal of the propylene group (i.e., —O—CH$_2$—CH$_2$—CH$_2$—) or may be introduced in the middle of the propylene group (i.e., —CH$_2$—CH$_2$—O—CH$_2$—).

In an example in which two ether bonds that are the bivalent hydrocarbon groups are introduced into a propylene group, the two ether bonds may be introduced respectively into both terminals of the propylene group (i.e., —O—CH$_2$—CH$_2$—CH$_2$—O—), or may be introduced in the middle of the propylene group (i.e., —CH$_2$—O—CH$_2$—O—CH$_2$—), or may be introduced respectively into a terminal of the propylene group and in the middle of the propylene group (i.e. —O—CH$_2$—CH$_2$—O—CH$_2$—).

Details about the number and the position(s) of the ether bond(s) to be introduced into the bivalent halogenated hydrocarbon group are the same as those mentioned with respect to the number and the position(s) of the ether bond(s) to be introduced into the bivalent hydrocarbon group.

Particularly, as mentioned above with respect to the bivalent halogenated hydrocarbon group, the halogen group to be contained in the bivalent ether-introduced halogenated hydrocarbon group is preferably a fluorine group and the bivalent ether-introduced halogenated hydrocarbon group is preferably a perfluoro group.

The number of carbonyl group(s) to be introduced into the bivalent hydrocarbon group may be one, or may be two or more. When the number of carbonyl groups introduced into the bivalent hydrocarbon group is two or more, the adjacent two carbonyl groups may be bonded to each other directly without a part or the whole of the bivalent hydrocarbon group interposed therebetween, or may be bonded to each other indirectly with a part or the whole of the bivalent hydrocarbon group interposed therebetween.

The position at which the carbonyl group into the bivalent hydrocarbon group may be a terminal of the bivalent hydrocarbon group or may be in the middle of the bivalent hydrocarbon group.

More specifically, in an example in which one carbonyl group is to be introduced into a propylene group (—CH$_2$—CH$_2$—CH$_2$—) that is the bivalent hydrocarbon group, the carbonyl group may be introduced into a terminal of the propylene group (i.e., —C(=O)—CH$_2$—CH$_2$—CH$_2$—), or may be introduced in the middle of the propylene group (i.e., —CH$_2$—CH$_2$—C(=O)—CH$_2$—).

In an example in which two carbonyl groups are introduced into a propylene group that is the bivalent hydrocarbon group, the two carbonyl groups may be introduced respectively into both terminals of the propylene group (i.e., —C(=O)—CH$_2$—CH$_2$—CH$_2$—C(=O)—), or may be introduced in the middle of the propylene group (i.e., —CH$_2$—C(=O)—CH$_2$—C(=O)—CH$_2$—), or may be introduced respectively into a terminal of the propylene group and in the middle of the propylene group (i.e., —C(=O)—CH$_2$—CH$_2$—C(=O)—CH$_2$—).

Details about the number and the position(s) of the carbonyl group(s) to be introduced into the bivalent halogenated hydrocarbon group are the same as those mentioned with respect to the number and the positions(s) of the carbonyl group(s) to be introduced into the bivalent hydrocarbon group.

Particularly, as mentioned above with respect to the bivalent halogenated hydrocarbon group, the halogen group to be contained in the bivalent carbonyl-introduced halogenated hydrocarbon group is preferably a fluorine group and the bivalent carbonyl-introduced halogenated hydrocarbon group is preferably a perfluoro group.

The number of ether bond(s) to be introduced into the bivalent hydrocarbon group may be one or may be two or more, and the number of carbonyl group(s) to be introduced into the bivalent hydrocarbon group may be one or may be two or more. When the number of ether bond(s) introduced into the bivalent hydrocarbon group is two or more, the two adjacent ether bonds may be bonded to each other directly without a part or the whole of the bivalent hydrocarbon group interposed therebetween, or may be bonded to each other indirectly with a part or the whole of the bivalent hydrocarbon group interposed therebetween. Similarly, when the number of carbonyl group(s) to be introduced into the bivalent hydrocarbon group is two or more, the adjacent two carbonyl groups may be bonded to each other directly without a part or the whole of the bivalent hydrocarbon group interposed therebetween, or may be bonded to each other indirectly with a part or the whole of the bivalent hydrocarbon group interposed therebetween.

The position at which the ether bond is to be introduced into the bivalent hydrocarbon group may be a terminal of the bivalent hydrocarbon group or may be in the middle of the bivalent hydrocarbon group. Similarly, when the position at which the carbonyl group to be introduced into the bivalent hydrocarbon group may be a terminal of the bivalent hydrocarbon group or may be in the middle of the bivalent hydrocarbon group.

More specifically, in an example in which one ether bond and one carbonyl group are to be introduced into the bivalent hydrocarbon group, the one ether bond and the one carbonyl group may be introduced respectively into both terminals of the propylene group (i.e., —O—CH$_2$—CH$_2$—CH$_2$—C(=O)—), or may be introduced in the middle of the propylene group (i.e., —CH$_2$—O—CH$_2$—C(=O)—CH$_2$—), or may be introduced respectively into a terminal of the propylene group and in the middle of the propylene group (—CH$_2$—O—CH$_2$—C(=O)—CH$_2$—).

Details about the number and the position(s) of the ether bond(s) to be introduced into the bivalent halogenated hydrocarbon group are the same as those mentioned with respect to the number and the position(s) of the ether bond(s) to be introduced into the bivalent hydrocarbon group. Details about the number and position(s) of the carbonyl group(s) to be introduced into the bivalent halogenated hydrocarbon group are the same as those mentioned with respect to the number and the position(s) of carbonyl group(s) to be introduced into the bivalent hydrocarbon group.

Particularly, as mentioned above with respect to the bivalent halogenated hydrocarbon group, the halogen group to be contained in the bivalent ether/carbonyl-introduced halogenated hydrocarbon group is preferably a fluorine group and the bivalent ether/carbonyl-introduced halogenated hydrocarbon group is preferably a perfluoro group.

As mentioned above, the ring containing R1 and the carbon-carbon double bond, i.e. the ring into which two substituents (R2 and R3) are introduced, is not an aromatic ring having a conjugated unsaturated cyclic structure, but a non-aromatic ring not having the conjugated unsaturated cyclic structure. Therefore, the ring containing R1 and a carbon-carbon double bond may have two or more carbon-carbon double bonds. In this case, a plurality of carbon atoms constituting the ring include at least one carbon atom with sp$^3$ hybrid orbital.

Particularly, R1 is preferably a bivalent halogenated hydrocarbon group, preferably a perfluoro alkylene group. This is because the chemical stability of the electrolytic solution can be further improved.

The type of the perfluoro alkylene group is not particularly limited, and is, for example, a perfluoromethylene group, a perfluoroethylene group, a perfluoropropylene group, a perfluorobutylene group, a perfluoropentylene group, a perfluorohexylene group, a perfluoroheptylene group, a perfluorooctylene group, a perfluorononylene group or a perfluorodecylene group.

As mentioned above, each of R2 and R3 is any one group selected from a hydrogen group, a halogen group, a monovalent hydrocarbon group, a monovalent halogenated hydrocarbon group, a monovalent oxygen-containing hydrocarbon group, a monovalent halogenated oxygen-containing hydrocarbon group and a second bonded group. The term "second bonded group" refers to a monovalent group having such a structure that two or more of a hydrogen group, a halogen group, a monovalent hydrocarbon group, a monovalent halogenated hydrocarbon group, a monovalent oxygen-containing hydrocarbon group and a monovalent halogenated oxygen-containing hydrocarbon group are bonded to each other.

R2 and R3 may be the same as or different from each other. R2 and R3 may be bonded to each other to form a ring. The R3-bonding position in R2 may be a terminal of R2 or may be in the middle of R2. Similarly, the R2-bonding position in R3 may be a terminal of R3 or may be in the middle of R3.

The halogen group is, for example, any one group selected from a fluorine group, a chlorine group, a bromine group and an iodine group. As a matter of course, the halogen group may be a group other than the above-mentioned groups.

Particularly, the halogen group is preferably a fluorine group. This is because the chemical stability of the electrolytic solution containing the unsaturated cyclic compound can be further improved.

The term "monovalent hydrocarbon group" is a general term for monovalent groups each composed of carbon and hydrogen, and may have a linear form, or a branched form having at least one side chain, or a cyclic form. The monovalent hydrocarbon group may contain at least one carbon-carbon unsaturated bond or may not contain the carbon-carbon unsaturated bond.

Specific examples of the monovalent hydrocarbon group include an alkyl group, an alkenyl group, an alkynyl group, a cycloalkyl group, an aryl group and a third bonded group. The term "third bonded group" refers to a monovalent group having such a structure that two or more groups selected from an alkyl group, an alkenyl group, an alkynyl group, a cycloalkyl group and an aryl group are bonded to each other.

The type of the alkyl group is not particularly limited, and is, for example, a methyl group, an ethyl group, a propyl group, a butyl group, a pentyl group, a hexyl group, a heptyl group, an octyl group, a nonyl group or a decyl group.

The type of the alkenyl group is not particularly limited, and is, for example, an ethenyl group, a propenyl group, a butenyl group, a pentenyl group, a hexenyl group, a heptenyl group, an octenyl group, a nonenyl group or a decenyl group.

The type of the alkynyl group is not particularly limited, and is, for example, an ethynyl group, a propenyl group, a butynyl group, a pentynyl group, a hexynyl group, a heptynyl group, an octynyl group, a nonylyl group or a decynyl group.

The type of the cycloalkyl group is not particularly limited, and is, for example, a cyclopropyl group, a cyclobutyl group, a cyclopentyl group, a cyclohexyl group or a cyclodecyl group.

The type of the aryl group is not particularly limited, and is, for example, a phenyl group or a naphthyl group.

The number of carbon atom(s) in the alkyl group is not particularly limited, and is, for example, 1 to 4. The number of carbon atom(s) in each of the alkenyl group and the alkynyl group is not particularly limited, and is, for example, 2 to 4. The number of carbon atom(s) in each of the cycloalkyl group and the aryl group is not particularly limited, and is, for example, 6 to 10. This is because the solubility, compatibility and the like of the unsaturated cyclic compound can be improved.

Examples of the third bonded group include a monovalent group having such a structure that an alkyl group and an alkenyl group are bonded to each other, a monovalent group having such a structure that an alkyl group and an alkynyl group are bonded to each other, a monovalent group having such a structure that an alkyl group and a cycloalkyl group are bonded to each other, a monovalent group having such a structure that an alkyl group and an aryl group are bonded to each other, and a monovalent group having such a structure that a cycloalkyl group and an aryl group are bonded to each other.

The type of the third bonded group is not particularly limited, and is, for example, a benzyl group.

The monovalent halogenated hydrocarbon group is a group having such a structure that at least one hydrogen group (—H) in the above-mentioned monovalent hydrocarbon group is substituted by a halogen group.

Details about the halogen group contained in the monovalent halogenated hydrocarbon group are the same as, for example, those mentioned about the halogen group contained in the bivalent halogenated hydrocarbon group.

Particularly, as mentioned above with respect to the bivalent halogenated hydrocarbon group, the halogen group to be contained in the monovalent halogenated hydrocarbon group is preferably a fluorine group and the monovalent halogenated hydrocarbon group is preferably a perfluoro group.

The term "monovalent oxygen-containing hydrocarbon group" is a general term for monovalent groups each composed of carbon, hydrogen and oxygen (O), and may have a linear form, or a branched form having at least one side chain, or a cyclic form. The monovalent oxygen-containing hydrocarbon group may contain at least one carbon-carbon unsaturated bond, or may not contain the carbon-carbon unsaturated bond.

More specifically, the monovalent oxygen-containing hydrocarbon group may be an alkoxy group or the like. The type of the alkoxy group is not particularly limited, and is, for example, a methoxy group, an ethoxy group, a propoxy group or a butoxy group.

The number of carbon atom(s) in the alkoxy group is not particularly limited, and is, for example, 1 to 4.

This is because the solubility, compatibility and the like of the unsaturated cyclic compound can be improved.

The monovalent halogenated oxygen-containing hydrocarbon group is a group having such a structure that at least one hydrogen group in the monovalent oxygen-containing hydrocarbon group is substituted by a halogen group. Details about the halogen group contained in the monovalent halogenated oxygen-containing hydrocarbon group are the same as, for example, those mentioned with respect to the halogen group contained in the bivalent halogenated hydrocarbon group.

Particularly, as mentioned above with respect to the bivalent halogenated hydrocarbon group, the halogen group to be contained in the monovalent halogenated oxygen-containing hydrocarbon group is preferably a fluorine group and the monovalent halogenated oxygen-containing hydrocarbon group is preferably a perfluoro group.

Examples of the second bonded group include a monovalent group having such a structure that a monovalent hydrocarbon group and a monovalent halogenated hydrocarbon group are bonded to each other, a monovalent group having such a structure that a monovalent hydrocarbon group and a monovalent oxygen-containing hydrocarbon group are bonded to each other, a monovalent group having such a structure that a monovalent hydrocarbon group and a monovalent halogenated oxygen-containing hydrocarbon group are bonded to each other, a monovalent group having such a structure that a monovalent halogenated hydrocarbon group and a monovalent oxygen-containing hydrocarbon group are bonded to each other, a monovalent group having such a structure that a monovalent halogenated hydrocarbon group and a monovalent halogenated oxygen-containing hydrocarbon group are bonded to each other, and a monovalent group having such a structure that a monovalent oxygen-containing hydrocarbon group and a monovalent halogenated oxygen-containing hydrocarbon group are bonded to each other.

As mentioned above, the type of R3 is limited depending on the type of R2.

More specifically, in the case where R2 is a hydrogen group, R3 is a group other than a hydrogen group and a halogen group. Namely, R3 is any one group selected from a monovalent hydrocarbon group, a monovalent halogenated hydrocarbon group, a monovalent oxygen-containing hydrocarbon group, a monovalent halogenated oxygen-containing hydrocarbon group and a second bonded group.

In the case where R2 is a halogen group, R3 is a group other than a hydrogen group, a monovalent oxygen-containing hydrocarbon group and a monovalent halogenated oxygen-containing hydrocarbon group. Namely, R3 is any one group selected from a halogen group, a monovalent hydrocarbon group, a monovalent halogenated hydrocarbon group and a second bonded group.

The reason why the type of R3 is limited depending on type of R2 is because the chemical stability of the electrolytic solution can be improved and therefore the decomposition reaction of the electrolytic solution is prevented.

Particularly, the unsaturated cyclic compound is preferably a compound represented by the following Formula (2). This is because the chemical stability of the electrolytic solution can be further improved and therefore the decomposition reaction of the electrolytic solution can be further improved. The compounds described in this section are compounds represented by Formula (1) wherein R1 is a linear perfluoro propylene group.

[Chemical Formula 2]

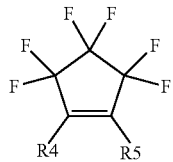

(2)

R4 and R5 independently represent any one group selected from hydrogen group, a halogen group, a monovalent hydrocarbon group, a monovalent halogenated hydrocarbon group, a monovalent oxygen-containing hydrocarbon group, a monovalent halogenated oxygen-containing hydrocarbon group, and a monovalent group having such a structure that at least two of these groups are bonded to each other;

provided that:

when R4 represents a hydrogen group, R5 represents a group other than a hydrogen group and a halogen group;

when R4 represents a halogen group, R5 represents a group other than a hydrogen group, a monovalent oxygen-containing hydrocarbon group and a monovalent halogenated oxygen-containing hydrocarbon group; and R4 and R5 may be bonded to each other).

(R4 and R5)

Details about R4 and R5 are the same as those mentioned above with respect to R2 and R3.

The type of the unsaturated cyclic compound is not particularly limited, and is, for example, any one compound selected from compounds respectively represented by the following Formulae (1-1) to (1-40).

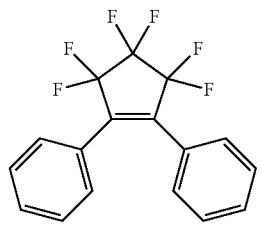

(1-1)

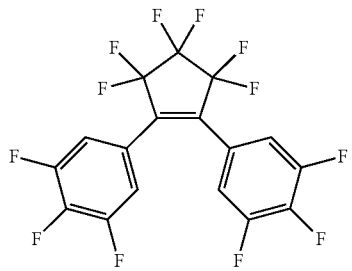

(1-2)

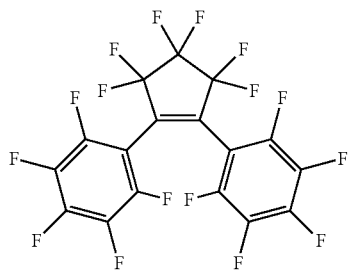

(1-3)

-continued
(1-4)
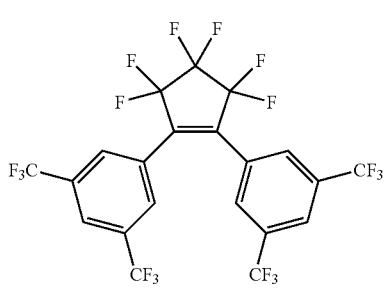
(1-5)
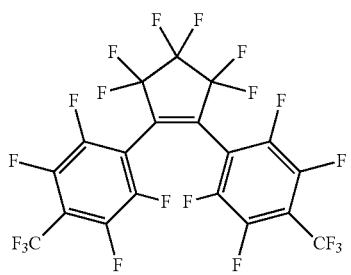
(1-6)
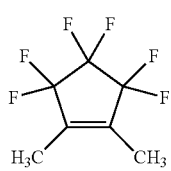
(1-7)
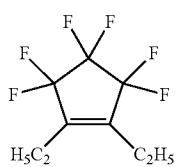
(1-8)
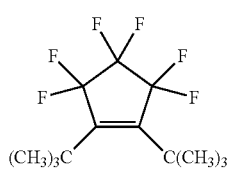
(1-9)
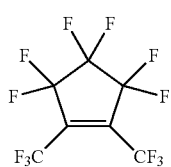
(1-10)
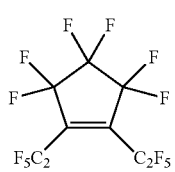
(1-11)
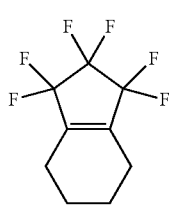
-continued
(1-12)
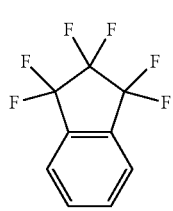
(1-13)
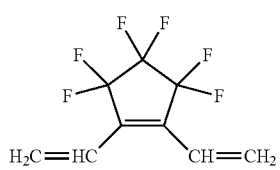
(1-14)
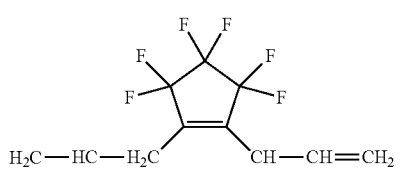
(1-15)
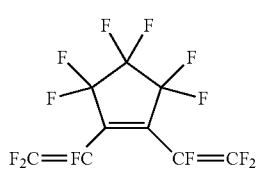
[Chemical Formula 5]
(1-16)
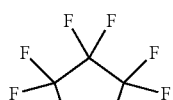
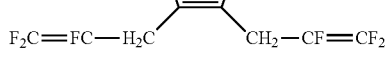
(1-17)
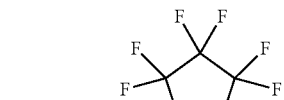
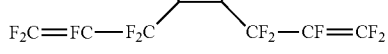
(1-18)
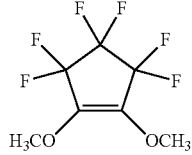
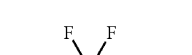
(1-19)
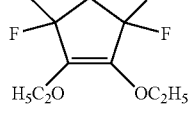
(1-20)
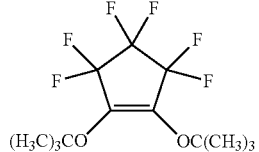

(1-21) 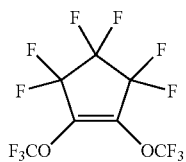
(1-22) 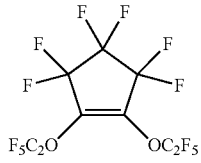
(1-23) 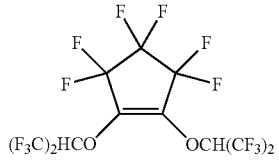
(1-24) 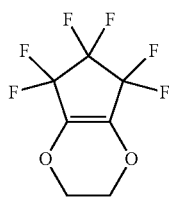
(1-25) 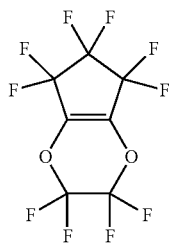
(1-26) 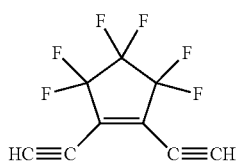
(1-27) 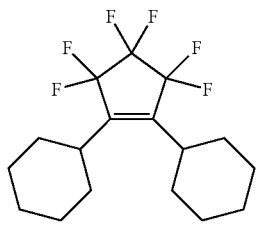
(1-28) 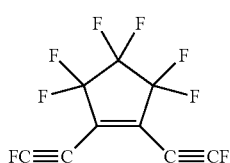
(1-29) 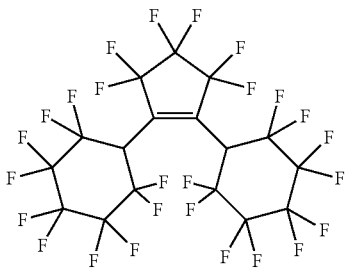
[Chemical Formula 6]
(1-30) 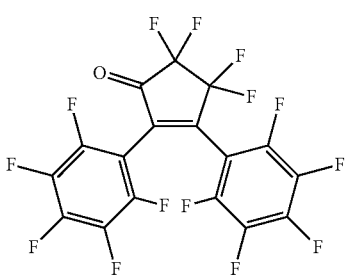
(1-31) 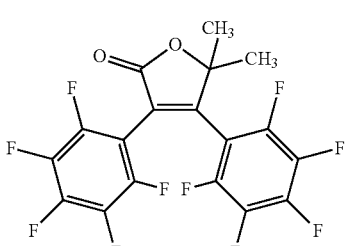
(1-32) 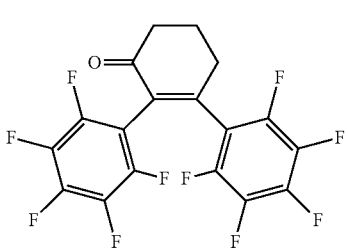
(1-33) 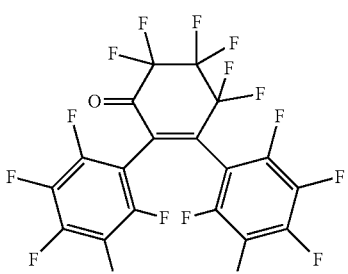
(1-34) 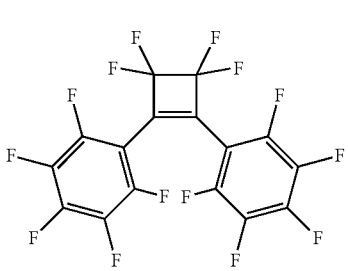

(1-35)
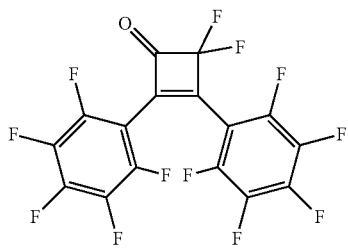

(1-36)
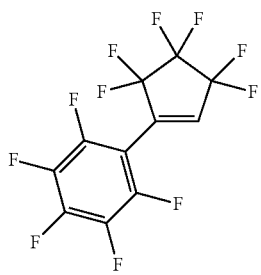

(1-37)
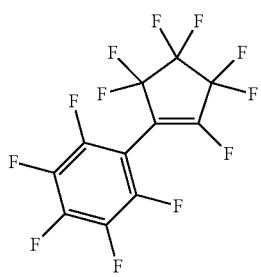

(1-38)
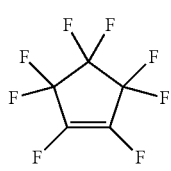

(1-39)
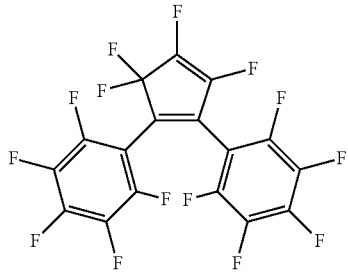

(1-40)
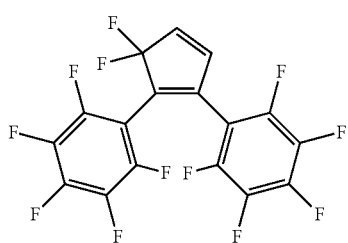

The content of the unsaturated cyclic compound in the electrolytic solution is not particularly limited, and is preferably, for example, 0.01 to 5% by weight, more preferably 0.1 to 3% by weight. This is because the chemical stability of the electrolytic solution can be improved satisfactorily while securing the solubility, compatibility and the like of the unsaturated cyclic compound.

In the case where the electrolytic solution contains at least two unsaturated cyclic compounds, the term "content of the unsaturated cyclic compound" refers to the sum total of the contents of the unsaturated cyclic compounds.

The electrolytic solution may also contain at least one component selected from other materials, in addition to the unsaturated cyclic compound.

The "other material" includes at least one of solvents such as a non-aqueous solvent (organic solvent). The electrolytic solution containing a non-aqueous solvent is a so-called non-aqueous electrolytic solution.

(Carbonic Acid Ester, Linear Carboxylic Acid Ester, Lactone, Nitrile Compound)

The non-aqueous solvent may be, for example, a carbonic acid ester, a linear carbonic acid ester, a lactone or a nitrile (mononitrile) compound. This is because excellent battery capacity, excellent cycle properties, excellent storage properties and the like can be achieved.

The carbonic acid ester includes, for example, one or both of a cyclic carbonic acid ester and a linear carbonic acid ester. Specific examples of the cyclic carbonic acid ester include ethylene carbonate, propylene carbonate and butylene carbonate. Specific examples of the linear carbonic acid ester include dimethyl carbonate, diethyl carbonate, ethyl methyl carbonate and methyl propyl carbonate. Specific examples of the linear carboxylic acid ester include methyl acetate, ethyl acetate, methyl propionate, ethyl propionate, propyl propionate, methyl butyrate, methyl isobutyrate, methyl trimethylacetate and ethyl trimethylacetate. Specific examples of the lactone include γ-butyrolactone and γ-valerolactone. Specific examples of the nitrile compound include acetonitrile, methoxyacetonitrile and 3-methoxypropionitrile.

In addition, the non-aqueous solvent may also be, for example, 1,2-dimethoxyethane, tetrahydrofuran, 2-methyl-tetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N,N'-dimethylimidazolidinone, nitromethane, nitroethane, sulfolane, trimethyl phosphate or dimethylsulfoxide. This is because the same advantages can be achieved.

Particularly, the non-aqueous solvent preferably includes a carbonic acid ester, more preferably includes at least one component selected from ethylene carbonate, propylene carbonate, dimethyl carbonate, diethyl carbonate and ethyl methyl carbonate. This is because a high battery capacity, excellent cycle properties, excellent storage properties and the like can be achieved.

More specifically, the carbonic acid ester preferably includes both of a cyclic carbonic acid ester and a linear carbonic acid ester. In this case, a combination of a high-viscosity (high-permittivity) solvent (e.g., relative permittivity ε≥30) (e.g., ethylene carbonate and propylene carbonate) and a low-viscosity solvent (e.g., viscosity ≤1 mPa·s) (e.g., dimethyl carbonate, ethyl methyl carbonate and diethyl carbonate) is more preferred. This is because the dissociability of an electrolyte salt and the mobility of ions can be improved.

The non-aqueous solvent preferably contains a carbonic acid ester and a linear carboxylic acid ester. In this case, the content of the linear carboxylic acid ester relative to the sum total of the content of the carbonic acid ester and the content of the liner carboxylic acid ester is not particularly limited, and is, for example, 10 to 60% by mass. This is because the dissociability of an electrolyte salt and the mobility of ions can be improved.

The non-aqueous solvent preferably includes at least one component selected from an unsaturated cyclic carbonic acid ester, a halogenated carbonic acid ester, a sulfonic acid ester, an acid anhydride, a polyvalent nitrile compound, a diisocyanate compound and a phosphoric acid ester. This is because the chemical stability of the electrolytic solution can be further improved.

The unsaturated cyclic carbonic acid ester is a cyclic carbonic acid ester containing at least one carbon-carbon unsaturated bond (a carbon-carbon double bond), and includes at least one of compounds respectively represented by the following Formulae (4) to (6). The content of the unsaturated cyclic carbonic acid ester in the non-aqueous solvent is not particularly limited, and is, for example, 0.01 to 10% by weight.

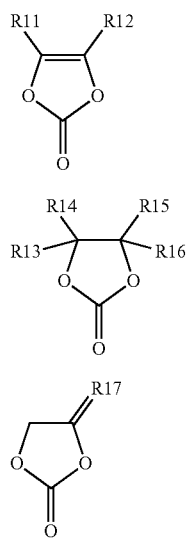

(wherein R11 and R12 independently represent any one group selected from a hydrogen group and an alkyl group;

R13 to R16 independently represent any one group selected from a hydrogen group, an alkyl group, a vinyl group and an allyl group, wherein at least one of R13 to R16 represents any one group selected from a vinyl group and an allyl group;

R17 represents a group represented by formula >CR171R172; and

R171 and R172 independently represent any one group selected from a hydrogen group and an alkyl group).

The compound represented by Formula (4) is a vinylene carbonate-type compound. R11 and R12 may be the same as or different from each other. Details about the alkyl group are as mentioned above. Specific examples of the vinylene carbonate-type compound include vinylene carbonate (1,3-dioxol-2-one), methyl vinylene carbonate (4-methyl-1,3-dioxol-2-one), ethyl vinylene carbonate (4-ethyl-1,3-dioxol-2-one), 4,5-dimethyl-1,3-dioxol-2-one and 4,5-diethyl-1,3-dioxol-2-one. In addition, the vinylene carbonate-type compound may also be 4-fluoro-1,3-dioxol-2-one, 4-trifluoromethyl-1,3-dioxol-2-one or the like.

The compound represented by Formula (5) is a vinyl ethylene carbonate-type compound. R13 to R16 may be the same group as one another or may be different groups from one another. As a matter of course, only some of R13 to R16 may be the same group as one another. Specific examples of the vinyl ethylene carbonate-type compound include vinyl ethylene carbonate (4-vinyl-1,3-dioxolan-2-one), 4-methyl-4-vinyl-1,3-dioxolan-2-one, 4-ethyl-4-vinyl-1,3-dioxolan-2-one, 4-n-propyl-4-vinyl-1,3-dioxolan-2-one, 5-methyl-4-vinyl-1,3-dioxolan-2-one, 4,4-divinyl-1,3-dioxolan-2-one and 4,5-divinyl-1,3-dioxolan-2-one.

The compound represented by Formula (6) is a methylene ethylene carbonate-type compound. R171 and R172 may be the same group as each other, or may be different groups from each other. Specific examples of the methylene ethylene carbonate-type compound include methylene ethylene carbonate (4-methylene-1,3-dioxolan-2-one), 4,4-dimethyl-5-methylene-1,3-dioxolan-2-one and 4,4-diethyl-5-methylene-1,3-dioxolan-2-one.

In addition to the above-mentioned compounds, the unsaturated cyclic carbonic acid ester may also be catechol carbonate having a benzene ring (catechol carbonate) or the like.

The halogenated carbonic acid ester is a carbonic acid ester containing at least one halogen atom as a constituent element, and includes, for example, one or both of compounds respectively represented by the following Formulae (7) and (8). The content of the halogenated carbonic acid ester in the non-aqueous solvent is not particularly limited, and is, for example, 0.01 to 10% by weight.

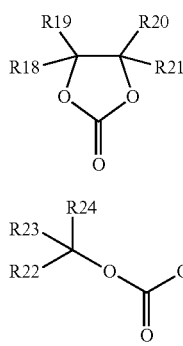

(wherein R18 to R21 independently represent any one group selected from a hydrogen group, a halogen group, an alkyl group and a halogenated alkyl group, wherein at least one of R18 to R21 represents any one group selected from a halogen group and a halogenated alkyl group; and R22 to R27 independently represent any one group selected from a hydrogen group, a halogen group, an alkyl group and a halogenated alkyl group, wherein each of R22 to R27 represents any one group selected from a hydrogen group, a halogen group, an alkyl group and a halogenated alkyl group, and at least one of R22 to R27 represents any one a halogen group and a halogenated alkyl group).

The compound represented by Formula (7) is a halogenated cyclic carbonic acid ester. R18 to R21 may be the same group as one another, or may different groups from one another. As a matter of course, only some of R18 to R21 may be the same group as each other.

The type of the halogen group is not particularly limited, and preferably includes at least one group selected from a fluorine group, a chlorine group, a bromine group and an iodine group, more preferably a fluorine group. The number of halogen group(s) may be one, or may be two or more.

Details about the alkyl group are as mentioned above. The halogenated alkyl group is a group having such a structure that at least one hydrogen group in an alkyl group is substituted (halogenated) by a halogen group. Details about the halogen group are as mentioned above.

Specific examples of the halogenated cyclic carbonic acid ester include compounds respectively represented by the following Formulae (7-1) to (7-21) and also include geometric isomers thereof. Particularly, 4-fluoro-1,3-dioxolan-2-one which is represented by Formula (7-1), 4,5-difluoro-1,3-dioxolan-2-one which is represented by Formula (7-3) and the like are preferred. A trans-form isomer of 4,5-difluoro-1,3-dioxolan-2-one is more preferred than a cis-form isomer thereof. This is because the trans-form isomer is more easily available and can achieve a higher effect.

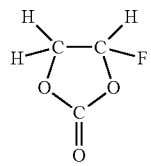
(7-1)

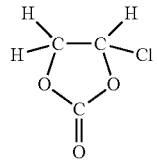
(7-2)

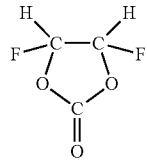
(7-3)

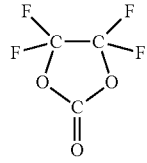
(7-4)

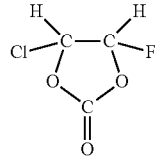
(7-5)

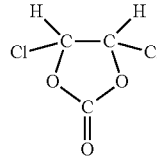
(7-6)

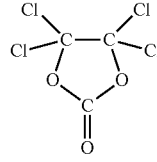
(7-7)

-continued

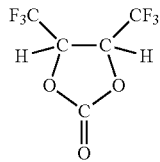
(7-8)

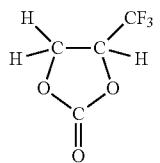
(7-9)

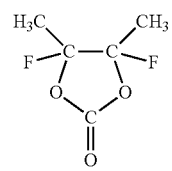
(7-10)

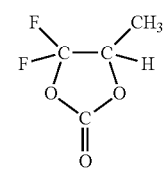
(7-11)

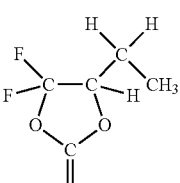
(7-12)

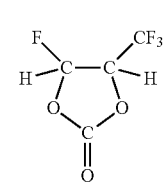
(7-13)

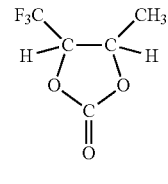
(7-14)

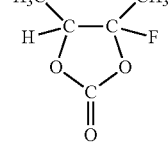
(7-15)

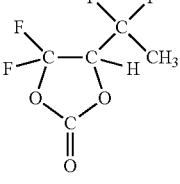
(7-16)

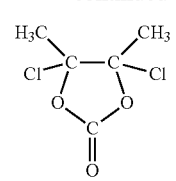 (7-17)

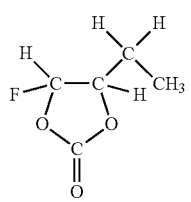 (7-18)

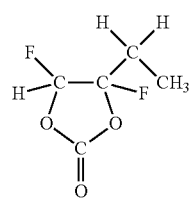 (7-19)

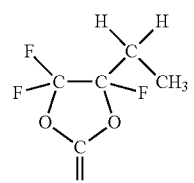 (7-20)

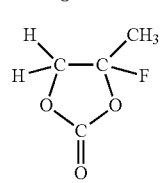 (7-21)

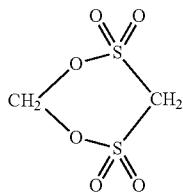 (9-1)

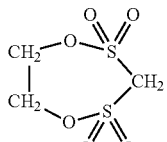 (9-2)

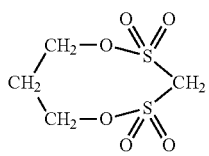 (9-3)

The compound represented by Formula (8) is a halogenated linear carbonic acid ester. R22 to R27 may be the same group as one another, or may different groups from one another. As a matter of course, only some of R22 to R27 may be the same group as each other.

Specific examples of the halogenated linear carbonic acid ester include fluoromethyl methyl carbonate, bis(fluoromethyl) carbonate and difluoromethyl methyl carbonate.

The sulfonic acid ester includes, for example, a monosulfonic acid ester and a disulfonic acid ester. The content of the sulfonic acid ester in the non-aqueous solvent is not particularly limited, and is, for example, 0.01 to 10% by weight.

The monosulfonic acid ester may be a cyclic monosulfonic acid ester or a linear monosulfonic acid ester. Specific examples of the cyclic monosulfonic acid ester include sultones such as 1,3-propane sultone and 1,3-propene sultone. Specific examples of the linear monosulfonic acid ester include compounds each formed by disrupting a cyclic monosulfonic acid ester in the middle.

The disulfonic acid ester may be a cyclic disulfonic acid ester or a linear disulfonic acid ester. Specific examples of the cyclic disulfonic acid ester include compounds respectively represented by the following Formulae (9-1) to (9-3). Specific examples of the linear disulfonic acid ester include compounds in each of which a cyclic disulfonic acid ester is disrupted in the middle.

The acid anhydride is, for example, a carboxylic acid anhydride, a disulfonic acid anhydride or a carboxylic acid sulfonic acid anhydride. The content of the acid anhydride in the non-aqueous solvent is not particularly limited, and is, for example, 0.01 to 10% by weight.

Specific examples of the carboxylic acid anhydride include succinic anhydride, glutaric anhydride and maleic anhydride. Specific examples of the disulfonic acid anhydride include ethanedisulfonic anhydride and propanedisulfonic anhydride. Specific examples of the carboxylic acid sulfonic acid anhydride include sulfobenzoic anhydride, sulfopropionic anhydride and sulfobutyric anhydride.

The polyvalent nitrile compound is a compound having at least two nitrile groups (—CN). More specifically, the polyvalent nitrile compound is, for example, a compound represented by the formula: R28-(CN)$_n$ (wherein R28 represents any one group selected from a n-valent hydrocarbon group and a n-valent oxygen-containing hydrocarbon group; and n represents an integer of 2 or more). The content of the polyvalent nitrile compound in the non-aqueous solvent is not particularly limited, and is, for example, 0.01 to 10% by weight, preferably 0.5 to 5% by weight.

The n-valent hydrocarbon group is, for example, a group having such a structure that n hydrogen groups are removed from each of an alkane group, an alkene, an alkyne, an alicyclic hydrocarbon, an aromatic hydrocarbon and a bonded compound. The type of the alkane is not particularly limited, and is, for example, methane, ethane, propane or butane. The type of the alkene is not particularly limited, and is, for example, ethylene (ethene), propylene (propene) or butane. The type of the alkyne is not particularly limited, and is, for example, ethyne (acetylene), propyne or butyne. The type of the alkyne is not particularly limited, and is, for example, ethyne (acetylene), propyne or butyne. The type of the alicyclic hydrocarbon is not particularly limited, and is, for example, cyclopropane, cyclobutane, cyclopentane or cyclohexane. The type of the aromatic hydrocarbon is not particularly limited, and is, for example, benzene, naphthalene, anthracene, biphenyl or terphenyl.

The n-valent oxygen-containing hydrocarbon group is a group having such a structure that at least one ether bond is introduced into the n-valent hydrocarbon group. Details about the position at which the ether bond(s) is to be introduced into the n-valent hydrocarbon group are the same as those mentioned above about the position at which the ether bond(s) is to be introduced into the bivalent hydrocarbon group.

Specific examples of the polyvalent nitrile compound include succinonitrile (NC—$C_2H_4$—CN), glutaronitrile (NC—$C_3H_6$—CN), adiponitrile (NC—$C_4H_8$—CN), sebaconitrile (NC—$C_8H_{10}$—CN), phthalonitrile (NC—$C_6H_4$—CN), 3,3'-oxydipropionitrile (NC—$C_2H_4$—O—$C_2H_4$—CN), ethyleneglycol bis(propionitrile) ether (NC—$C_2H_4$—O—$C_2H_4$—O—$C_2H_4$—CN), 1,3,6-hexanetricarbonitrile or 1,3,5-pentanetricarbonitrile.

The diisocyanate compound is, for example, a compound represented by the formula: OCN—R29-NCO (wherein R29 represents any one group selected from an alkylene group and an arylene group). The content of the diisocyanate compound in the non-aqueous solvent is not particularly limited, and is, for example, 0.1 to 10% by weight.

Details about the alkylene group and the arylene group are as mentioned above, for example. The number of carbon atom(s) in the alkylene group is not particularly limited, and is, for example, 1 to 18, and the number of carbon atom(s) in the arylene group is not particularly limited, and is, for example, 6 to 18. A specific example of the diisocyanate compound is OCN—$C_6H_{12}$—NCO.

Specific examples of the phosphoric acid ester include trimethyl phosphate, triethyl phosphate and triallyl phosphate. The content of the phosphoric acid ester in the non-aqueous solvent is not particularly limited, and is, for example, 0.5 to 5% by weight.

The "other material" includes at least one electrolyte salt such as a lithium salt. The electrolyte salt may additionally include a salt other than a lithium salt. The salt other than a lithium salt is, for example, a salt of a light metal other than lithium.

Specific examples of the lithium salt include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), dilithium hexafluorosilicate ($Li_2SiF_6$), lithium chloride (LiCl) and lithium bromide (LiBr).

Particularly, at least one compound selected from lithium hexafluorophosphate, lithium tetrafluoroborate, lithium perchlorate and lithium hexafluoroarsenate is preferred, and lithium hexafluorophosphate is more preferred. This is because the internal resistance can be decreased.

The electrolyte salt may also be any one compound selected from compounds respectively represented by the following Formulae (10) to (12). R41 and R43 may be the same group as one another, or may different groups from one another. R51 to R53 may be the same group as one another, or may be different groups from one another. As a matter of course, only some of R51 to R53 may be the same groups as each other, or may be different groups from each other. R61 and R62 may be the same group as each other, or may different groups from each other.

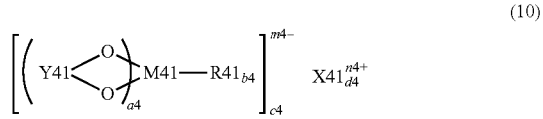

(10)

(wherein X41 represents any one element selected from elements belonging to Groups 1 and 2 on the long format of periodic table and aluminum (Al); M41 represents any one element selected from transition metals and elements belonging to Groups 13, 14 and 15 on the long format of periodic table; R41 represents a halogen group; Y41 represents any one group selected from —C(=O)—R42-C(=O)—, —C(=O)—CR43$_2$- and —C(=O)—C(=O)—, wherein R42 represents any one group selected from an alkylene group, a halogenated alkylene group, an arylene group and a halogenated arylene group, and R43 represents any one group selected from an alkyl group, a halogenated alkyl group, an aryl group and a halogenated aryl group; a4 represents an integer of 1 to 4; b4 represents an integer of 0, 2 or 4; and c4, d4, m4 and n4 independently represent an integer of 1 to 3).

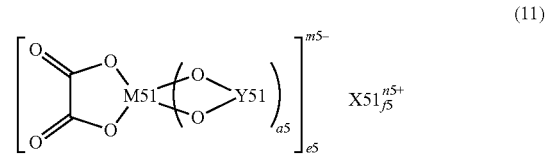

(11)

(wherein X51 represents any one element selected from elements belonging to Groups 1 and 2 on the long format of periodic table; M51 represents any one element selected from transition metals and elements belonging to Groups 13, 14 and 15 on the long format of periodic table; Y51 represents any one group selected from —C(=O)—(CR51$_2$)$_{b5}$-C(=O)—, —R53$_2$C—(CR52$_2$)$_{c5}$-C(=O)—, —R53$_2$C—(CR52$_2$)$_{c5}$-CR53$_2$-, —R53$_2$C—(CR52$_2$)$_{c5}$-S(=O)$_2$—, —S(=O)$_2$—(CR52$_2$)$_{d5}$-S(=O)$_2$— and —C(=O)—(CR52$_2$)$_{d5}$-S(=O)$_2$—, wherein R51 and R53 independently represent any one group selected from a hydrogen group, an alkyl group, a halogen group and a halogenated alkyl group, provided that at least one of R51's represents any one group selected from a halogen group and a halogenated alkyl group and at least one of R53's represents any one group selected from a halogen group and a halogenated alkyl group, and R52 represents any one group selected from a hydrogen group, an alkyl group, a halogen group and a halogenated alkyl group;

a5, e5 and n5 independently represent an integer of 1 or 2; b5 and d5 independently represent an integer of 1 to 4; c5 represents an integer of 0 to 4; and f5 and m5 independently represent an integer of 1 to 3).

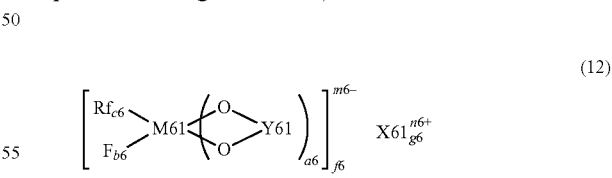

(12)

(wherein X61 represents any one element selected from elements belonging to Groups 1 and 2 on the long format of periodic table; M61 represents any one element selected from transition metals and elements belonging to Groups 13, 14 and 15 on the long format of periodic table; Rf represents any one group selected from a fluorinated alkyl group and a fluorinated aryl group, wherein the number of carbon atom(s) in each of the fluorinated alkyl group and the fluorinated aryl group is 1 to 10; Y61 represents any one group selected from —C(=O)—(CR61$_2$)$_{d6}$-C(=O)—, —R62$_2$C—(CR61$_2$)$_{d6}$-C(=O)—, —R62$_2$C—(CR61$_2$)$_{d6}$-CR62$_2$-, —R62$_2$C—(CR61$_2$)$_{d6}$-S(=O)$_2$—, —S(=O)$_2$—(CR61$_2$)$_{e6}$-S(=O)$_2$— and —C(=O)—(CR61$_2$)$_{e6}$-S(=O)$_2$—, wherein R61 represents any one group selected from a hydrogen group, an alkyl group, a halogen group and a halogenated alkyl group, R62 represents any one group selected from a hydrogen group, an alkyl group, a halogen group and a halogenated alkyl group, and at least one of R62's represents any one group selected from a halogen group and a halogenated alkyl group; a6, f6 and n6 independently represent an integer of 1 or 2; b6, c6 and e6 independently represent an integer of 1 to 4; d6 represents an integer of 0 to 4; and g6 and m6 independently represent an integer of 1 to 3).

In this regard, the element belonging to Group 1 includes hydrogen (H), lithium (Li), sodium (Na), potassium (K), rubidium (Rb), cesium (Cs) and francium (Fr). The element belonging to Group 2 includes beryllium (Be), magnesium (Mg), calcium (Ca), strontium (Sr), barium (Ba) and radium (Ra). The element belonging to Group 13 includes boron (B), aluminum (Al), gallium (Ga), indium (In) and thallium (Tl). The element belonging to Group 14 includes carbon (C), silicon (Si), germanium (Ge), tin (Sn) and lead (Pb). The element belonging to Group 15 includes nitrogen (N), phosphorus (P), arsenic (As), antimony (Sb) and bismuth (Bi).

Specific examples of the compound represented by Formula (10) include compounds respectively represented by the following Formulae (10-1) to (10-6) shown below. Specific examples of the compound represented by Formula (11) include compounds respectively represented by the following Formulae (11-1) to (11-8). Specific examples of the compound represented by Formula (12) include compounds represented by the following Formula (12-1).

(10-1)
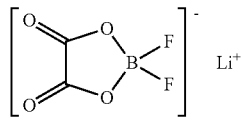

(10-2)
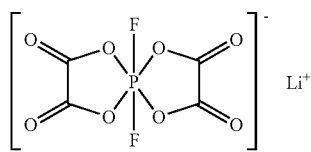

(10-3)
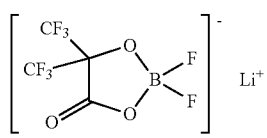

(10-4)
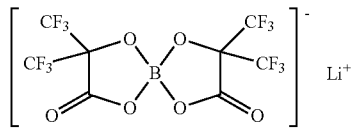

(10-5)
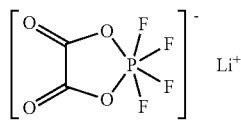

(10-6)
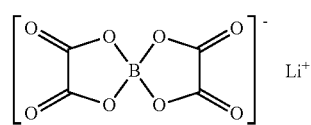

(11-1)
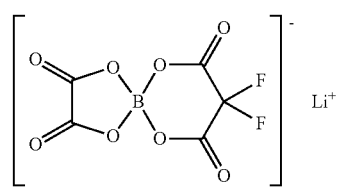

(11-2)
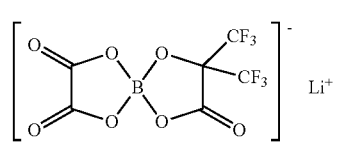

(11-3)
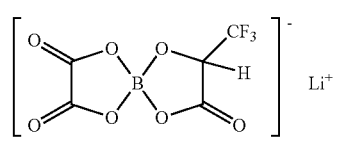

(11-4)
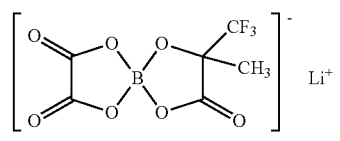

(11-5)
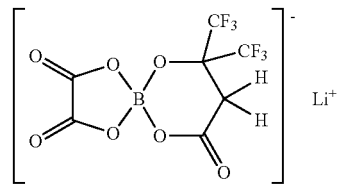

(11-6)
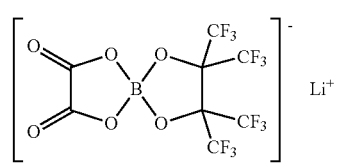

(11-7)
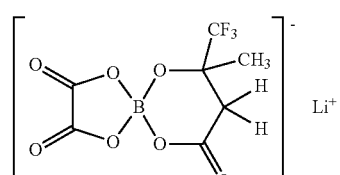

(11-8)
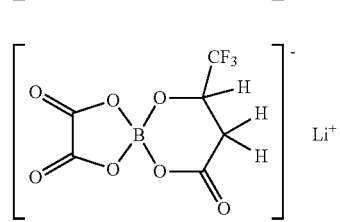

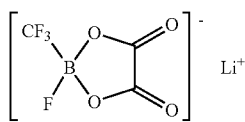
(12-1)

The electrolyte salt may also be any one compound selected from compounds respectively represented by the following Formulae (13) to (15). m and n may be the same value as each other, or may be different values from each other. p, q and r may be the same value as one another, or may be different values from one another. As a matter of course, only some of p, q and r may be the same value as each other.

$$\text{LiN}(C_mF_{2m+1}SO_2)(C_nF_{2n+1}SO_2) \quad (13)$$

(wherein m and n independently represent an integer of 1 or more).

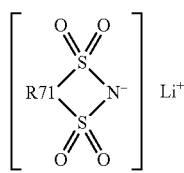
(14)

(wherein R71 represents a linear or branched perfluoroalkylene group having 2 to 4 carbon atoms).

$$\text{LiC}(C_pF_{2p+1}SO_2)(C_qF_{2q+1}SO_2)(C_rF_{2r+1}SO_2) \quad (15)$$

(wherein p, q and r independently represent an integer of 1 or more).

The compound represented by Formula (13) is a linear amide compound. Specific examples of the linear amide compound include lithium bis(fluorosulfonyl)amide (LiN(SO$_2$F)$_2$), lithium (fluorosulfonyl)(trifluoromethanesulfonyl)amide (LiN(SO$_2$F)(CF$_3$SO$_2$)), lithium bis(trifluoromethanesulfonyl)amide (LiN(CF$_3$SO$_2$)$_2$), lithium bis(pentafluoroethanesulfonyl)amide (LiN(C$_2$F$_5$SO$_2$)$_2$), lithium (trifluoromethanesulfonyl)(pentafluoroethanesulfonyl)amide (LiN(CF$_3$SO$_2$)(C$_2$F$_5$SO$_2$)), lithium (trifluoromethanesulfonyl)(heptafluoropropanesulfonyl)amide (LiN(CF$_3$SO$_2$)(C$_3$F$_7$SO$_2$)) and lithium (trifluoromethanesulfonyl)(nonafluorobutanesulfonyl)amide (LiN(CF$_3$SO$_2$)(C$_4$F$_9$SO$_2$)).

The compound represented by Formula (14) is a cyclic imide compound. Specific examples of the cyclic imide compound include compounds respectively represented by the following Formulae (14-1) to (14-4).

[Chemical Formula 18]

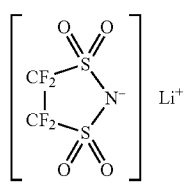
(14-1)

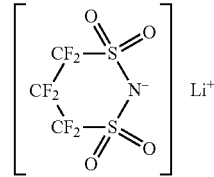
(14-2)

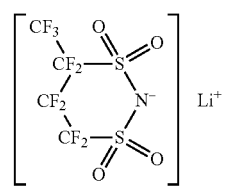
(14-3)

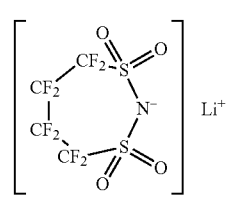
(14-4)

The compound represented by Formula (15) is a linear methide compound. A specific example of the linear methide compound is lithium tris(trifluoromethanesulfonyl)methide (LiC(CF$_3$SO$_2$)$_3$).

The electrolyte salt may also be a phosphorus/fluorine-containing salt such as lithium difluorophosphate (LiPF$_2$O$_2$) and lithium fluorophosphate (Li$_2$PFO$_3$).

The content of the electrolyte salt is not particularly limited, and is preferably 0.3 to 3.0 mol/kg relative to the amount of the solvent. This is because high ion conductivity can be achieved.

Next, the method for producing the electrolytic solution will be described. The electrolytic solution can be produced by, for example, the following procedure.

For the production of the electrolytic solution, an electrolyte salt is added to a solvent, and then the solvent is stirred. As a result, the electrolyte salt is dissolved or dispersed in the solvent. Subsequently, an unsaturated cyclic compound is added to the solvent having the electrolyte salt dissolved or dispersed therein, and then the solvent is stirred. As a result, the unsaturated cyclic compound is dissolved or dispersed in the solvent. In this manner, an electrolytic solution containing the unsaturated cyclic compound is produced.

According to the electrolytic solution, the unsaturated cyclic compound is contained. In this case, the chemical stability of the electrolytic solution can be improved compared with the case where the electrolytic solution does not contain the unsaturated cyclic compound and the case where the electrolytic solution contains another compound in place of the unsaturated cyclic compound, as mentioned above. The "other compounds" are each, for example, any one compound selected from compounds respectively represented by the following Formulae (16-1) to (16-3). The compound represented by Formula (16-1) is a compound having such a structure that R4 is a methoxy group and R5 is a halogen group (a fluorine group) in the above-mentioned Formula (2). The compound represented by Formula (16-2) is a compound having such a structure that each of R4 and R5 is a hydrogen group in Formula (2). The compound represented by Formula (16-3) is a compound having such a structure that R4 is a halogen group (a fluorine group) and R5 is a hydrogen group in Formula (2). Therefore, the decomposition reaction of the electrolytic solution can be prevented, and consequently the battery properties of a secondary battery using the electrolytic solution can be improved.

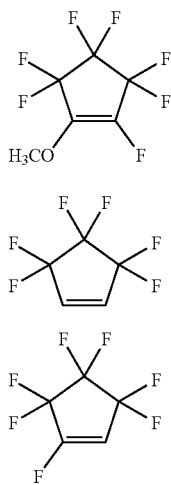

(16-1)

(16-2)

(16-3)

Particularly, with respect to R2 and R3 in Formula (1), when the bivalent hydrocarbon group is an alkylene group or the like, the bivalent halogenated hydrocarbon group is a group having such a structure that at least one hydrogen group in a bivalent hydrocarbon group is substituted by a fluorine group or the like, the halogen group is a fluorine group or the like, the monovalent hydrocarbon group is an alkyl group or the like, the monovalent halogenated hydrocarbon group is a group having such a structure that at least one hydrogen atom in a monovalent hydrocarbon group is substituted by a fluorine group or the like, the monovalent oxygen-containing hydrocarbon group is an alkoxy group, and the monovalent halogenated oxygen-containing hydrocarbon group is a group having such a structure that at least one hydrogen group in a monovalent oxygen-containing hydrocarbon group is substituted by a fluorine group or the like, the chemical stability of the electrolytic solution can be improved satisfactorily and consequently a higher effect can be achieved. In this case, when the number of carbon atom(s) in the alkylene group is 1 to 3, the number of carbon atom(s) in the alkenylene group and the like is 2 or 3, the number of carbon atom(s) in the cycloalkylene group and the like is 6 to 10, the number of carbon atom(s) in the alkyl group and the like is 1 to 4, the number of carbon atom(s) in the alkenyl group and the like is 2 to 4, and the number of carbon atom(s) in the cycloalkyl group and the like is 6 to 10, the solubility, compatibility and the like of the unsaturated cyclic compound can be improved and consequently a higher effect can be achieved. When R1 is a perfluoroalkylene group, the chemical stability of the electrolytic solution can be further improved and consequently, a still higher effect can be achieved.

When the unsaturated cyclic compound is a compound represented by Formula (2), the chemical stability of the electrolytic solution can be further improved and consequently a higher effect can be achieved.

When the content of the unsaturated cyclic compound in the electrolytic solution is 0.01 to 5% by weight, the chemical stability of the electrolytic solution can be improved satisfactorily and consequently a higher effect can be achieved.

When the electrolytic solution contains a carbonic acid ester and a linear carbonic acid ester and the content of the linear carbonic acid ester is 10 to 60% by weight inclusive relative to the sum total of the content of the carbonic acid ester and the content of the linear carbonic acid ester, the dissociability of an electrolyte salt and the mobility of ions are further improved and consequently a higher effect can be achieved.

When the electrolytic solution contains at least one of an unsaturated cyclic carbonic acid ester, a halogenated carbonic acid ester, a sulfonic acid ester, an acid anhydride and a polyvalent nitrile compound, the chemical stability of the electrolytic solution is further improved and consequently a higher effect can be achieved.

Next, a secondary battery in which the above-mentioned electrolytic solution of the present disclosure is used will be described.

Figure 2:
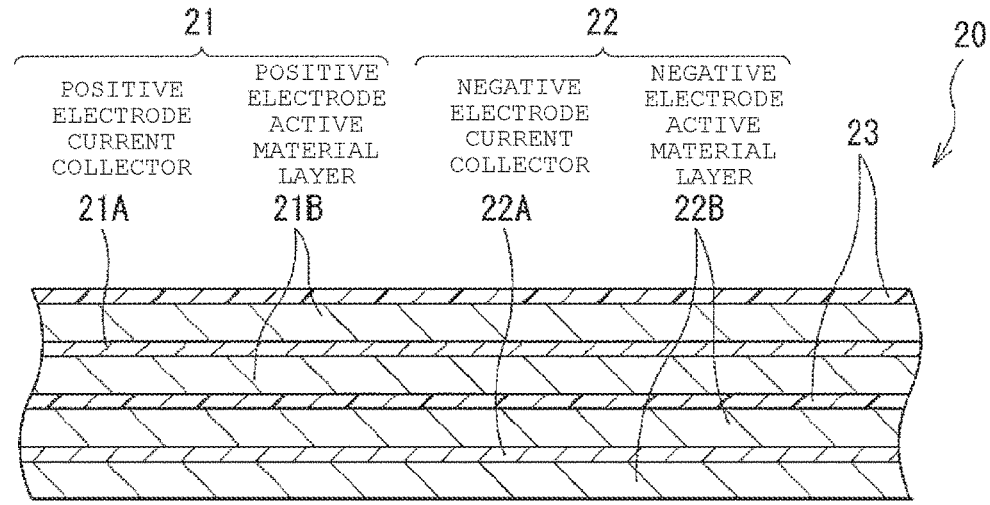
FIG. 2 is a cross-sectional view illustrating an enlarged view of a part of a wound electrode body shown in FIG. 1.

FIG. 1 shows a cross-sectional constitution of a secondary battery, and FIG. 2 shows an enlarged view of a part of a cross-sectional constitution of a wound electrode body 20 shown in FIG. 1.

The secondary battery described in this section is a lithium ion secondary battery in which the battery capacity (the capacity of the negative electrode 22) can be obtained by, for example, utilizing the lithium storage phenomenon and the lithium release phenomenon.

As shown in FIG. 1, the secondary battery is a cylinder-type secondary battery in which a wound electrode body 20 that is a battery element is housed in a hollow cylindrical battery can 11.

More specifically, the secondary battery is provided with, for example: a battery can 11; and a pair of insulating plates 12 and 13 and a wound electrode body 20 which are housed in the battery can 11. The wound electrode body 20 is formed by, for example, laminating a positive electrode 21 and a negative electrode 22 on each other with a separator 23 interposed therebetween and then winding the positive electrode 21, the negative electrode 22 and the separator 23 together. The wound electrode body 20 is impregnated with an electrolytic solution that is a liquid electrolyte.

The battery can 11 has such a hollow structure that, for example, one end is closed and the other end is opened, and contains at least one material selected from iron, aluminum and an alloy of these materials, for example. The surface of the battery can 11 may be plated with nickel or the like The pair of insulating plates 12 and 13 are each arranged so as to sandwich the wound electrode body 20 therebetween and extend vertically relative to the wound periphery of the wound electrode body 20.

A battery lid 14, a safety valve mechanism 15 and a heat-sensing resistive element (positive temperature coefficient (PTC) element) 16 are crimped to the open end of the battery can 11 with a gasket 17 interposed therebetween. In this manner, the battery can 11 is hermetically sealed. The battery lid 14 contains, for example, the same material as that used for the formation of the battery can 11. The safety valve mechanism 15 and the heat-sensing resistive element 16 are each arranged inside of the battery lid 14, and the safety valve mechanism 15 is electrically connected to the battery lid 14 through the heat-sensing resistive element 16. In the safety valve mechanism 15, a disk plate 15A can be inverted when the internal pressure of the battery can 11 becomes equal to or larger than a predetermined value in association with the occurrence of internal short circuit or heating from the outside. As a result, the electric connection between the battery lid 14 and the wound electrode body 20 is disconnected. In order to prevent the abnormal heat generation caused by a high current, the resistance of the heat-sensing resistive element 16 can increase with the increase in temperature. The gasket 17 contains, for example, an insulating material, and asphalt or the like may be applied on the surface of the gasket 17.

At the winding center of the wound electrode body 20, a center pin 24, for example, is inserted. The center pin 24 may not be inserted at the winding center of the wound electrode body 20. A positive electrode lead 25 is attached to the positive electrode 21, and a negative electrode lead 26 is attached to the negative electrode 22. The positive electrode lead 25 contains, for example, a conductive material such as aluminum. The positive electrode lead 25 is attached to, for example, a safety valve mechanism 15 and is electrically connected to the battery lid 14. The negative electrode lead 26 contains, for example, a conductive material such as nickel. The negative electrode lead 26 is attached to, for example, the battery can 11 and is electrically connected to the battery can 11.

The positive electrode 21 includes, for example, a positive electrode current collector 21A and two positive electrode active material layers 21B respectively provided on both surfaces of the positive electrode current collector 21A, as shown in FIG. 2. Only one positive electrode active material layer 21B may be provided on one surface of the positive electrode current collector 21A.

The positive electrode current collector 21A contains, for example, at least one type of conductive material. The type of the conductive material is not particularly limited, and an example of the conductive material is a metallic material such as aluminum, nickel and a stainless steel. The positive electrode current collector 21A may have a monolayer structure or a multilayer structure.

Each of the positive electrode active material layers 21B contains, as a positive electrode active material, at least one positive electrode material capable of storing/releasing lithium. Each of the positive electrode active material layers 21B may further contain at least one another material, such as a positive electrode binder and a positive electrode conducting agent.

The positive electrode material is preferably a lithium-containing compound. This is because a high energy density can be achieved. The type of the lithium-containing compound is not particularly limited, and is, for example, a lithium-containing composite oxide, a lithium-containing phosphoric acid compound or the like.

The lithium-containing composite oxide is an oxide that contains lithium and at least one another element as constituent elements, and has, for example, at least one type of crystal structure selected from a layered rock salt-type crystal structure, a spinel-type crystal structure and the like. The lithium-containing phosphoric acid compound is a phosphoric acid compound that contains lithium and at least one another element as constituent elements, and has a crystal structure such as an olivine-type crystal structure. The term "another element" refers to an element other than lithium.

The type of another element is not particularly limited, and includes at least one arbitrary element. Particularly, the other element is preferably an element belonging to any one of Groups 2 to 15 on the long format of periodic table. More specifically, the other element is more preferably an element such as nickel (Ni), cobalt (Co), manganese (Mn) and iron (Fe). This is because a high voltage can be achieved.

Examples of the lithium-containing composite oxide having a layered rock salt-type crystal structure include compounds respectively represented by the following Formulae (21) to (23).

$$Li_aMn_{(1-b-c)}Ni_bM11_cO_{(2-d)}F_e \quad (21)$$

(wherein M11 represents an at least one element selected from cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr) and tungsten (W);

and a to e satisfy the requirements represented by formulae $0.8 \leq a \leq 1.2$, $0 < b < 0.5$, $0 \leq c \leq 0.5$, $(b+c) < 1$, $-0.1 \leq d \leq 0.2$ and $0 \leq e \leq 0.1$;

wherein the content of lithium varies depending on whether the secondary battery is in a charged state or a discharged state, and a represents a value in the case where the secondary battery is in a completely discharged state).

$$Li_aNi_{(1-b)}M12_bO_{(2-c)}F_d \quad (22)$$

(wherein M12 represents at least one element selected from cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr) and tungsten (W);

and a to d satisfy the requirements represented by formulae $0.8 \leq a \leq 1.2$, $0.005 \leq b \leq 0.5$, $-0.1 \leq c \leq 0.2$ and $0 \leq d \leq 0.1$;

wherein the content of lithium varies depending on whether the secondary battery is in a charged state or a discharged state, and a represents a value in the case where the secondary battery is in a completely discharged state).

$$Li_aCo_{(1-b)}M13_bO_{(2-c)}F_d \quad (23)$$

(wherein M13 represents at least one element selected from nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr) and tungsten (W);

and a to d satisfy the requirements represented by formulae $0.8 \leq a \leq 1.2$, $0 \leq b < 0.5$, $-0.1 \leq c \leq 0.2$ and $0 \leq d \leq 0.1$;

wherein the content of lithium varies depending on whether the secondary battery is in a charged state or a discharged state, and a represents a value in the case where the secondary battery is in a completely discharged state).

Specific examples of the lithium-containing composite oxide having a layered rock salt-type crystal structure include LiNiO$_2$, LiCoO$_2$, LiCo$_{0.98}$Al$_{0.01}$Mg$_{0.01}$O$_2$, LiNi$_{0.5}$Co$_{0.2}$Mn$_{0.3}$O$_2$, LiNi$_{0.8}$Co$_{0.15}$Al$_{0.05}$O$_2$, LiNi$_{0.33}$Co$_{0.33}$Mn$_{0.33}$O$_2$, Li$_{1.2}$Mn$_{0.52}$Co$_{0.175}$Ni$_{0.1}$O$_2$ and Li$_{1.15}$(Mn$_{0.65}$Ni$_{0.22}$Co$_{0.13}$)O$_2$.

In the case where the lithium-containing composite oxide having a layered rock salt-type crystal structure contains nickel, cobalt, manganese and aluminum as the constituent elements thereof, the atomic ratio of nickel is preferably 50 at. % or more. This is because a high energy density can be achieved.

An example of the lithium-containing composite oxide having a spinel-type crystal structure is a compound represented by the following Formula (24).

$$Li_aMn_{(2-b)}M14_bO_cF_d \quad (24)$$

(wherein M14 represents at least one element selected from cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr) and tungsten (W);

and a to d satisfy the requirements represented by formulae $0.9 \leq a \leq 1.1$, $0 \leq b \leq 0.6$, $3.7 \leq c \leq 4.1$ and $0 \leq d \leq 0.1$;

wherein the content of lithium varies depending on whether the secondary battery is in a charged state or a discharged state, and a represents a value in the case where the secondary battery is in a completely discharged state).

A specific example of the lithium-containing composite oxide having a spinel-type crystal structure is $LiMn_2O_4$.

An example of the lithium-containing phosphoric acid compound having an olivine-type crystal structure is a compound represented by the following Formula (25).

$$Li_aM15PO_4 \qquad (25)$$

(wherein M15 represents at least one element selected from cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W) and zirconium (Zr);

and a satisfies the requirement represented by formula $0.9 \leq a \leq 1.1$;

wherein the content of lithium varies depending on whether the secondary battery is in a charged state or a discharged state, and a represents a value in the case where the secondary battery is in a completely discharged state).

Specific examples of the lithium-containing phosphoric acid compound having an olivine-type crystal structure include $LiFePO_4$, $LiMnPO_4$, $LiFe_{0.5}Mn_{0.5}PO_4$ and $LiFe_{0.3}Mn_{0.7}PO_4$.

The lithium-containing composite oxide may be a compound represented by the following Formula (26) or the like.

$$(Li_2MnO_3)_x(LiMnO_2)_{1-x} \qquad (26)$$

(wherein x satisfies the requirement represented by formula $0 \leq x \leq 1$;

wherein the content of lithium varies depending on whether the secondary battery is in a charged state or a discharged state, and x represents a value in the case where the secondary battery is in a completely discharged state).

In addition, the positive electrode material may be, for example, an oxide, a disulfide, a chalcogenide or a conductive polymer. Specific examples of the oxide include titanium oxide, vanadium oxide and manganese dioxide. Specific examples of the disulfide include titanium disulfide and molybdenum sulfide. A specific example of the chalcogenide is niobium selenide. Specific examples of the conductive polymer include sulfur, polyaniline and polythiophene.

The positive electrode binder includes, for example, at least one component selected from a synthetic rubber, a polymeric compound and others. Specific examples of the synthetic rubber include a styrene butadiene-type rubber, a fluorine-based rubber and an ethylene propylene diene. Specific examples of the polymeric compound include poly (vinylidene fluoride) and polyimide.

The positive electrode conducting agent includes at least one conductive material such as a carbon material. Specific examples of the carbon material include graphite, carbon black, acetylene black and Ketjen black. The positive electrode conducting agent may be a metallic material, a conductive polymer or the like, as long as the material is a material having electric conductivity.

The negative electrode 22 includes, for example, a negative electrode current collector 22A and two negative electrode active material layers 22B respectively provided on both surfaces of the negative electrode current collector 22A, as shown in FIG. 2. Only one negative electrode active material layer 22B may be provided on one surface of the negative electrode current collector 22A.

The negative electrode current collector 22A contains, for example, at least one conductive material. The type of the conductive material is not particularly limited, and the conductive material may be a metallic material such as copper, aluminum, nickel and a stainless steel.

The negative electrode current collector 22A may be in a monolayer structure or a multilayer structure.

The surface of the negative electrode current collector 22A is preferably roughened. This is because the close adhesiveness of the negative electrode active material layers 22B to the negative electrode current collector 22A can be improved due to a so-called anchoring effect. In this case, only at least a portion of the surface of the negative electrode current collector 22A which faces the negative electrode active material layer 22B may be roughened. An example of the method for the roughening is a method in which microparticles are formed by employing an electrolysis treatment. In the electrolysis treatment, microparticles are formed on the surface of the negative electrode current collector 22A in an electrolysis vessel by employing the electrolysis method. Therefore, protrusions and depressions are formed on the surface of the negative electrode current collector 22A. A copper foil formed by employing the electrolysis method is generally called "an electrodeposited copper foil".

Each of the negative electrode active material layers 22B contains, as a negative electrode active material, at least one negative electrode material that can store/release lithium. Each of the negative electrode active material layers 22B may further contain at least one of other materials including a negative electrode binder and a negative electrode conducting agent.

In order to prevent the accidental deposition of lithium metal on the surface of the negative electrode 22 during charging, it is preferred that the chargeable capacity of the negative electrode material is larger than the discharge capacity of the positive electrode 21. Namely, it is preferred that the electrochemical equivalent of the negative electrode material capable of storing/releasing lithium is larger than that of the positive electrode 21.

The type of the negative electrode material is not particularly limited, as long as the material can store and release lithium. Examples of the negative electrode material include a carbon material and a metal-based material.

A "carbon material" is a general term for materials each containing carbon as a constituent element. This is because a high energy density can be achieved stably since the crystal structure of a carbon material is very less likely to be changed during the storage of lithium and the release of lithium. This is also because a carbon material can act as a negative electrode conductive agent and consequently the electrical conductivity of the negative electrode active material layer 22B can be improved.

Specific examples of the carbon material include easily graphitizable carbon, hardly graphitizable carbon and graphite. It is preferred that the lattice spacing of (002) plane with respect to hardly graphitizable carbon is 0.37 nm or more and the lattice spacing of (002) plane with respect to graphite is 0.34 nm or less. More specific examples of the carbon material include a pyrolytic carbon-type substance, a coke-type substance, a glass-like carbon fiber, a fired organic polymeric compound, activated carbon and carbon black. The coke-type substance includes, within the scope thereof, pitch coke, needle coke and petroleum coke. The fired organic polymeric compound is a fired product produced by firing (carbonizing) a polymeric compound, e.g., a phenolic resin and a furan resin, at an appropriate temperature. In addition, the carbon material may be low crystalline carbon that is heat-treated at a temperature equal to or lower than about 1000° C., or may be amorphous carbon. The shape of the carbon material may be any one of a fiber-like form, a spherical form, a granular form and a scale-like form.

The metal-based material is a material that contains at least one component selected from metal elements and metalloids as a constituent element. This is because a high energy density can be achieved.

The metal-based material may be any one of an element, an alloy and a compound, or a combination of two or more of them. The metal-based material may also be a material that contains a phase composed of at least one of an element, an alloy and a compound as at least a portion thereof. The alloy includes a material composed of at least two metal elements, as well as a material composed of at least one metal element and at least one metalloid. The alloy may also contain a non-metal element. The texture of this metal-based material is, for example, a solid solution, a eutectic material (a eutectic mixture), an intermetallic compound and a coexistent substance of two or more of them.

For example, the metal element includes at least one metal element capable of forming an alloy in conjunction with lithium, and the metalloid includes at least one metalloid capable of forming an alloy in conjunction with lithium. Specific examples of the metal element and the metalloid include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc, hafnium (Hf), zirconium, yttrium (Y), palladium (Pd) and platinum (Pt).

Among these metal elements, one or both of silicon and tin are preferred, and silicon is more preferred. This is because these elements have an excellent ability to store/release lithium and therefore a remarkably high energy density can be achieved.

The material containing one or both of silicon and tin as constituent elements may be any one of element silicon, a silicon alloy and a silicon compound, or element tin, a tin alloy and a tin compound, or a combination of two or more of these materials, or a material that contains a phase composed of at least one of these materials as at least a portion thereof. The term "element" as used herein refers to an element in a general sense (which may contain impurities in a trace amount), and does not necessarily means an element having a purity of 100%.

The silicon alloy contains, for example, at least one of tin, nickel, copper, iron, cobalt, manganese, zinc, indium, silver, titanium, germanium, bismuth, antimony, chromium and the like as a non-silicon constituent element. The silicon compound contains, for example, at least one of carbon, oxygen and the like as a non-silicon constituent element. The silicon compound may contain, as a non-silicon constituent element, for example, at least one of elements that are mentioned with respect to the silicon alloy.

Specific examples of the silicon alloy and the silicon compound include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq2$) and LiSiO. It is noted that v in $SiO_v$ may be a numerical value satisfying formula: $0.2<v<1.4$.

The tin alloy contains, for example, at least one element selected from silicon, nickel, copper, iron, cobalt, manganese, zinc, indium, silver, titanium, germanium, bismuth, antimony and chromium as a non-tin constituent element. The tin compound contains, for example, at least one element selected from carbon and oxygen as a non-tin constituent element. The tin compound may contain, for example, at least one element selected from the elements which are mentioned with respect to the tin alloy in the description, as a non-tin constituent element.

Specific examples of the tin alloy and the tin compound include $SnO_w$ ($0<w\leq2$), $SnSiO_3$, LiSnO and $Mg_2Sn$.

Particularly, the material containing tin as a constituent element is preferably a material that also contains, in addition to tin that is a first constituent element, a second constituent element and a third constituent element (i.e., a tin-containing material). The second constituent element comprises, for example, at least one element selected from cobalt, iron, magnesium, titanium, vanadium, chromium, manganese, nickel, copper, zinc, gallium, zirconium, niobium, molybdenum, silver, indium, cesium (Ce), hafnium (Hf), tantalum, tungsten, bismuth and silicon. The third constituent element comprises, for example, at least one element selected from boron, carbon, aluminum and phosphorus. This is because a high battery capacity, an excellent cycle property and the like can be achieved when the tin-containing material further contains the second constituent element and the third constituent element.

Particularly, the tin-containing material is preferably a material that contains tin, cobalt and carbon as the constituent elements thereof (i.e., a tin-cobalt-carbon-containing material). In the tin-cobalt-carbon-containing material, the content of carbon is, for example, 9.9 to 29.7% by mass and the content ratio between tin and cobalt (which represented by formula: Co/(Sn+Co)) is 20 to 70% by mass. This is because a high energy density can be achieved.

It is preferred that the tin-cobalt-carbon-containing material has a phase containing tin, cobalt and carbon, wherein the phase is preferably low crystalline or amorphous. The phase is a phase capable of reacting with lithium (i.e., a reactive phase), and therefore excellent properties can be achieved due to the presence of the reactive phase. It is preferred that the half bandwidth (a diffraction angle: 2θ) of a diffraction peak of the reactive phase as obtained by X-ray diffraction is 1° or more when CuKα line is used as a specific X-ray and the scanning rate is 1°/min. This is because lithium can be stored/released more smoothly and the reactivity with the electrolytic solution can be reduced. In addition to the low crystalline or amorphous phase, the tin-cobalt-carbon-containing material may also contain a phase that contains elements of the constituent elements thereof or some of the elements.

Whether or not a diffraction peak obtained by the X-ray diffraction is a diffraction peak corresponding to a reactive phase capable of reacting with lithium can be determined easily by comparing X-ray diffraction charts before and after the electrochemical reaction with lithium with each other. For example, when the position of a diffraction peak is shifted before and after the electrochemical reaction with lithium, it is determined that the diffraction peak is one corresponding to a reactive phase capable of reacting with lithium. In this case, a diffraction peak coming from the low crystalline or amorphous reactive phase appears at an angle 2θ between 20° to 50°, for example. It is considered that this reactive phase contains, for example, the above-mentioned constituent elements and becomes low crystalline or amorphous mainly due to the presence of carbon.

In the tin-cobalt-carbon-containing material, it is preferred that at least some of carbon atoms, which are constituent elements, are bonded to the metal element or the metalloid that is another constituent element. This is because the coagulation or crystallization of tin or the like can be prevented. The state of binding between the elements can be confirmed by employing, for example, an X-ray photoelectron spectroscopy (XPS). In a commercially available device, Al—Kα line, Mg—Kα line or the like is used as soft X-ray, for example. In the case where at least some of carbon atoms are bonded to a metal element, a metalloid or the like, the peak corresponding to an associated wave of 1s orbit (C1s) coming from a carbon atom appears in a region lower than 284.5 eV. In this regard, the peak corresponding to 4f orbit (Au4f) of a gold atom is energy-calibrated so as to appear at 84.0 eV. In general, a surface-contaminating carbon atom is present on the surface of a substance. Therefore, the energy of the peak corresponding to C1s coming from the surface-contaminating carbon atom is defined as 284.8 eV, and the peak is employed as an energy base. In the XPS measurement, the wave form of the peak corresponding to C1s includes a peak coming from the surface-contaminating carbon atom and a peak coming from a carbon atom contained in the tin-cobalt-carbon-containing material. Therefore, the two peaks can be separated by, for example, the analysis using a commercially available software. In the analysis of a wave form, the position of a main peak appearing on the minimum binding energy side is employed as an energy base (284.8 eV).

The tin-cobalt-carbon-containing material is not limited to a material that contains only tin, cobalt and carbon as the constituent elements. In addition to tin, cobalt and carbon, the tin-cobalt-carbon-containing material may further contain, for example, at least one element selected from silicon, iron, nickel, chromium, indium, niobium, germanium, titanium, molybdenum, aluminum, phosphorus, gallium and bismuth and the like as a constituent element.

In addition to the tin-cobalt-carbon-containing material, a material that contains tin, cobalt, iron and carbon as the constituent elements thereof (i.e., a tin-cobalt-iron-carbon-containing material) is also preferred. The chemical composition of the tin-cobalt-iron-carbon-containing material may be any one. As one example, in the case where it is intended to set the content of iron to a smaller amount, the content of carbon is 9.9 to 29.7% by mass, the content of iron is 0.3 to 5.9% by mass, and the content ratio between tin and cobalt (which is represented by formula: Co/(Sn+Co)) is 30 to 70% by mass. In the case where it is intended to set the content of iron to a larger amount, the content of carbon is 11.9 to 29.7% by mass, the content ratio among tin, cobalt and iron (which is represented by formula: (Co+Fe)/(Sn+Co+Fe)) is 26.4 to 48.5% by mass, and the content ratio between cobalt and iron (which is represented by formula: Co/(Co+Fe)) is 9.9 to 79.5% by mass. This is because a high energy density can be achieved when the chemical composition falls within the above-mentioned ranges. The physical properties (e.g., a half bandwidth) of the tin-cobalt-iron-carbon-containing material are the same as those of the tin-cobalt-carbon-containing material.

Alternatively, the negative electrode material may also be, for example, a metal oxide or a polymeric compound. Specific examples of the metal oxide include iron oxide, ruthenium oxide and molybdenum oxide. Specific examples of the polymeric compound include polyacethylene, polyaniline and polypyrrole.

Particularly, it is preferred that the negative electrode material comprises both of a carbon material and a metal-based material for the following reason.

A metal-based material, particularly a material containing one or both of silicon and tin as a constituent element or constituent elements, has an advantage of having a high theoretical capacity, while having the disadvantage of being likely to intensively expand or shrink during charging and discharging. In contrast, the carbon material has the disadvantage of having a low theoretical capacity, while having the advantage of being unlikely to expand or shrink during charging and discharging. Therefore, by using both of the carbon material and the metal-based material in combination, it becomes possible to prevent the expansion or shrinkage of the negative electrode active material layer during charging and discharging while keeping a high theoretical capacity (in other words, a high battery capacity).

Details about the negative electrode binder are, for example, the same as those mentioned about the positive electrode binder as mentioned above. Details about the negative electrode conductive agent are, for example, the same as those mentioned about the negative electrode conductive agent as mentioned above.

In the secondary battery, as mentioned above, in order to prevent accidental deposition of lithium metal on the surface of the negative electrode 22 during discharging, the electrochemical equivalent of the negative electrode material that can store/release lithium is larger than that of the positive electrode. In the case where the open circuit voltage (i.e., battery voltage) upon being fully charged is 4.25 V or more, even if the same positive electrode active material is used, the release amount of lithium per unit mass increases compared with a case where the open circuit voltage is 4.20 V. With taking this fact into consideration, the amounts of the positive electrode active material and the negative electrode active material are adjusted in association with the relationship therebetween. As a result, a high energy density can be achieved.

The separator 23 is arranged between the positive electrode 21 and the negative electrode 22 as shown in, for example, FIG. 2, and enables lithium ions to pass while preventing the occurrence of short-circuiting caused as the result of the contact between these electrodes.

The separator 23 contains, for example, at least one porous membrane made from a synthetic resin, a ceramic or the like, and may be a laminate membrane composed of at least two porous membranes. The synthetic resin is, for example, polytetrafluoroethylene, polypropylene or polyethylene.

Particularly, the separator 23 may include, for example, the above-mentioned porous membrane (base material layer) and a polymeric compound layer provided on one surface or both surfaces of the base material layer. This is because the close adhesiveness of the separator 23 to each of the positive electrode 21 and the negative electrode 22 can be improved and therefore the distortion in the wound electrode body 20 can be eliminated. As a result, the occurrence of a decomposition reaction of the electrolytic solution can be prevented and the leakage of the electrolytic solution with which the base material layer is impregnated can also be prevented, and therefore the electric resistivity may rarely increase and the battery may be rarely swollen even when charge and discharge operations are repeated.

The polymeric compound layer contains a polymeric compound such as poly(vinylidene fluoride). This is because poly(vinylidene fluoride) has excellent physical strength and is electrically stable. The polymeric compound may be one other than poly(vinylidene fluoride). For the formation of the polymeric compound layer, a solution prepared by dissolving the polymeric compound in an organic solvent or the like is applied onto the base material layer and then the base material layer is dried, for example. It is also possible to immerse the base material layer in the solution and then dry the base material layer.

The polymeric compound layer may contain at least one type of insulating particles such as inorganic particles. This is because the safety can be improved. The type of the inorganic particles may be aluminum oxide, aluminum nitride or the like.

As mentioned above, the wound electrode body 20 is impregnated with an electrolytic solution. The electrolytic solution has the same composition as that of the electrolytic solution according to the present disclosure. Namely, the electrolytic solution contains an unsaturated cyclic compound.

The secondary battery can be operated, for example, in the following manner.

During charging, lithium ions are released from the positive electrode 21, and the lithium ions are stored in the negative electrode 22 through the electrolytic solution. On the other hand, during discharging, lithium ions are released from the negative electrode 22, and the lithium ions are stored in the positive electrode 21 through the electrolytic solution.

The secondary battery can be produced by, for example, the following procedure.

For the production of the positive electrode 21, firstly a positive electrode active material is optionally mixed with a positive electrode binder, a positive electrode conducting agent and the like to produce a positive electrode mix. Subsequently, the positive electrode mix is dispersed or dissolved in an organic solvent or the like to produce a paste-like positive electrode mix slurry. Finally, the positive electrode mix slurry is applied onto both surfaces of a positive electrode current collector 21A, and then the positive electrode mix slurry is dried to form positive electrode active material layers 21B. Subsequently, the positive electrode active material layers 21B are compression-molded with a roll pressing machine or the like optionally. In this regard, the positive electrode active material layers 21B may be heated, and the compression molding may be repeated a plurality of times.

For the production of the negative electrode 22, negative electrode active material layers 22B are formed respectively on both surfaces of a negative electrode current collector 22A by the same procedure as the above-mentioned procedure employed for the production of the positive electrode 21. More specifically, a negative electrode mix is prepared by mixing a negative electrode active material with a negative electrode binder, a negative electrode conducting agent and the like, and the negative electrode mix is dispersed in an organic solvent or the like to produce a paste-like negative electrode mix slurry. Subsequently, the negative electrode mix slurry is applied onto both surfaces of a negative electrode current collector 22A and is then dried to form negative electrode active material layers 22B. Subsequently, the negative electrode active material layers 22B are compression-molded with a roll pressing machine or the like if necessary.

The method for forming the negative electrode active material layer 22B is not particularly limited, and is, for example, at least one method selected from a coating method, a vapor phase method, a liquid phase method, a thermal spraying method and a firing method (a sintering method). The coating method is, for example, a method in which a particulate (powdery) negative electrode active material is mixed with a negative electrode binder and the like, then the resultant mixture is dissolved or dispersed in an organic solvent or the like, and then the resultant solution is applied onto the negative electrode current collector 22A. Examples of the vapor phase method include a physical deposition method and a chemical deposition method. More specific examples of the vapor phase method include a vacuum deposition method, a sputtering method, an ion plating method, a laser ablation method, a thermal chemical vapor deposition method, a chemical vapor deposition (CVD) method, and a plasma chemical vapor deposition method. Examples of the liquid phase method include an electrolytic plating method and an electroless plating method. The thermal spraying method is a method in which the negative electrode active material that is in a molten or half-molten state is sprayed onto the negative electrode current collector 22A. The firing method is, for example, a method in which a solution of is applied onto the negative electrode current collector 22A by a coating method and then the solution applied onto the negative electrode current collector 22A is heat-treated at a temperature higher than the melting point of the negative electrode binder or the like. As the firing method, an atmospheric firing method, a reaction firing method, a hot-press firing method or the like can be employed.

For the assembly of a secondary battery, a positive electrode lead 25 is attached to the positive electrode current collector 21A by employing a welding method or the like, and a negative electrode lead 26 is attached to the negative electrode current collector 22A by employing a welding method or the like. Subsequently, the positive electrode 21 and the negative electrode 22 are laminated on each other with a separator 23 interposed therebetween, and then the positive electrode 21, the negative electrode 22 and the separator 23 are wound to form a wound electrode body 20. Subsequently, a center pin 24 is inserted to a winding center of the wound electrode body 20.

Subsequently, the wound electrode body 20 is housed in a battery can 11 while sandwiching the wound electrode body 20 between a pair of insulating plates 12 and 13. In this case, a tip part of the positive electrode lead 25 is attached to a safety valve mechanism 15 by employing a welding method or the like, and a tip part of the negative electrode lead 26 is attached to the battery can 11 by employing a welding method or the like. Subsequently, an electrolytic solution is injected into the battery can 11 to impregnate the wound electrode body 20 with the electrolytic solution. Finally, the battery lid 14, the safety valve mechanism 15 and the heat-sensing resistive element 16 are crimped to an open end part of the battery can 11 with a gasket 17 interposed therebetween. In this manner, the wound electrode body 20 is enclosed in the inside of the battery can 11, resulting in the completion of a cylinder-type secondary battery.

According to this cylinder-type secondary battery, the electrolytic solution has the same composition as that of the present disclosure, and therefore the chemical stability of the electrolytic solution can be improved. As a result, the occurrence of a decomposition reaction of the electrolytic solution during charging-discharging can be prevented, as mentioned above, resulting in the improvement in battery properties.

Particularly when the negative electrode contains a negative electrode material capable of absorbing/releasing lithium and the negative electrode material contains one or both of a carbon material and a metal-based material, the function to prevent the decomposition of the electrolytic solution by the unsaturated cyclic compound can be exerted effectively while a high energy density is secured, and therefore a higher effect can be achieved.

Other actions and effects are the same as those of the electrolytic solution of the present disclosure.

Figure 3:
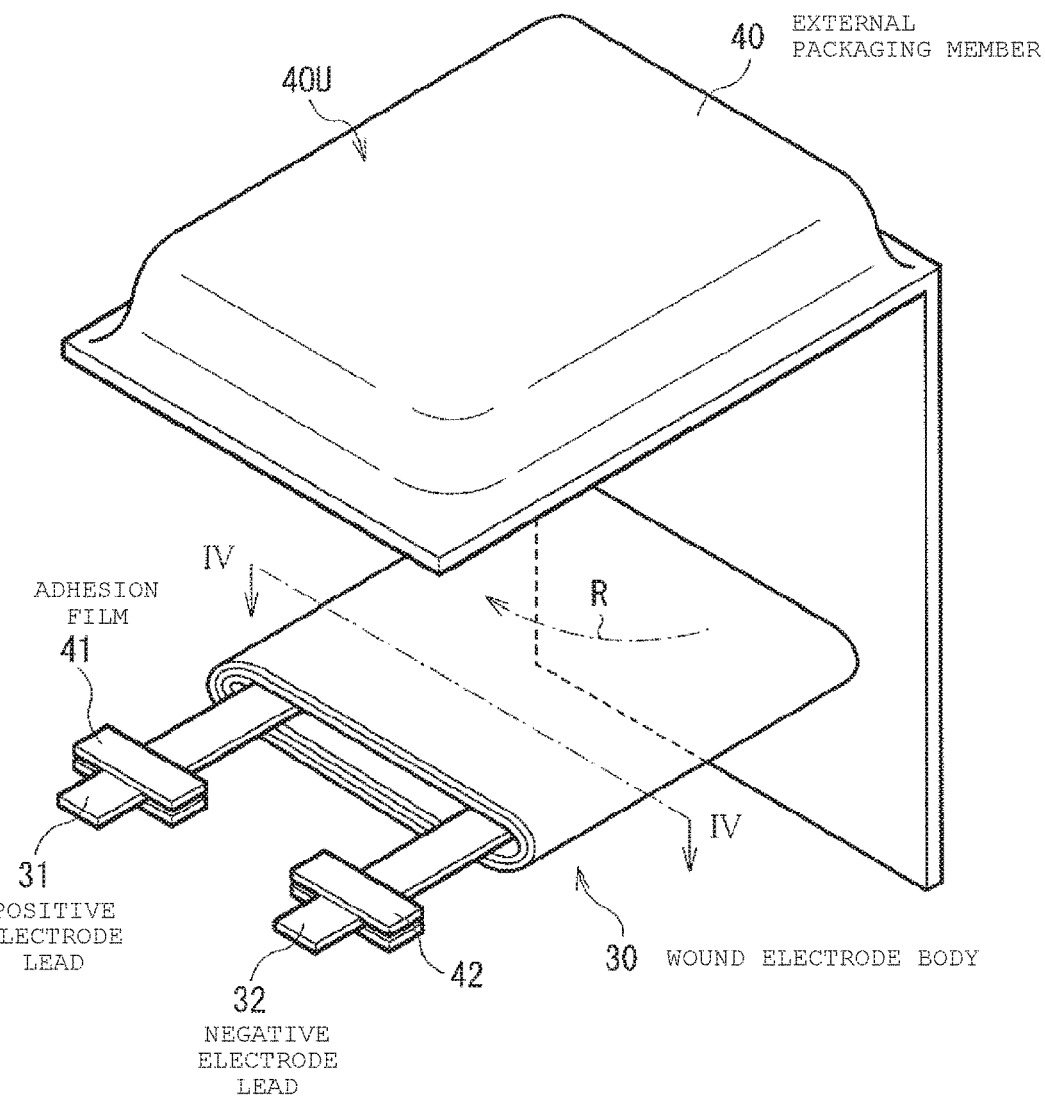
FIG. 3 is a perspective view illustrating the configuration of (laminate film-type) secondary battery according to an embodiment of the present disclosure.
Figure 4:
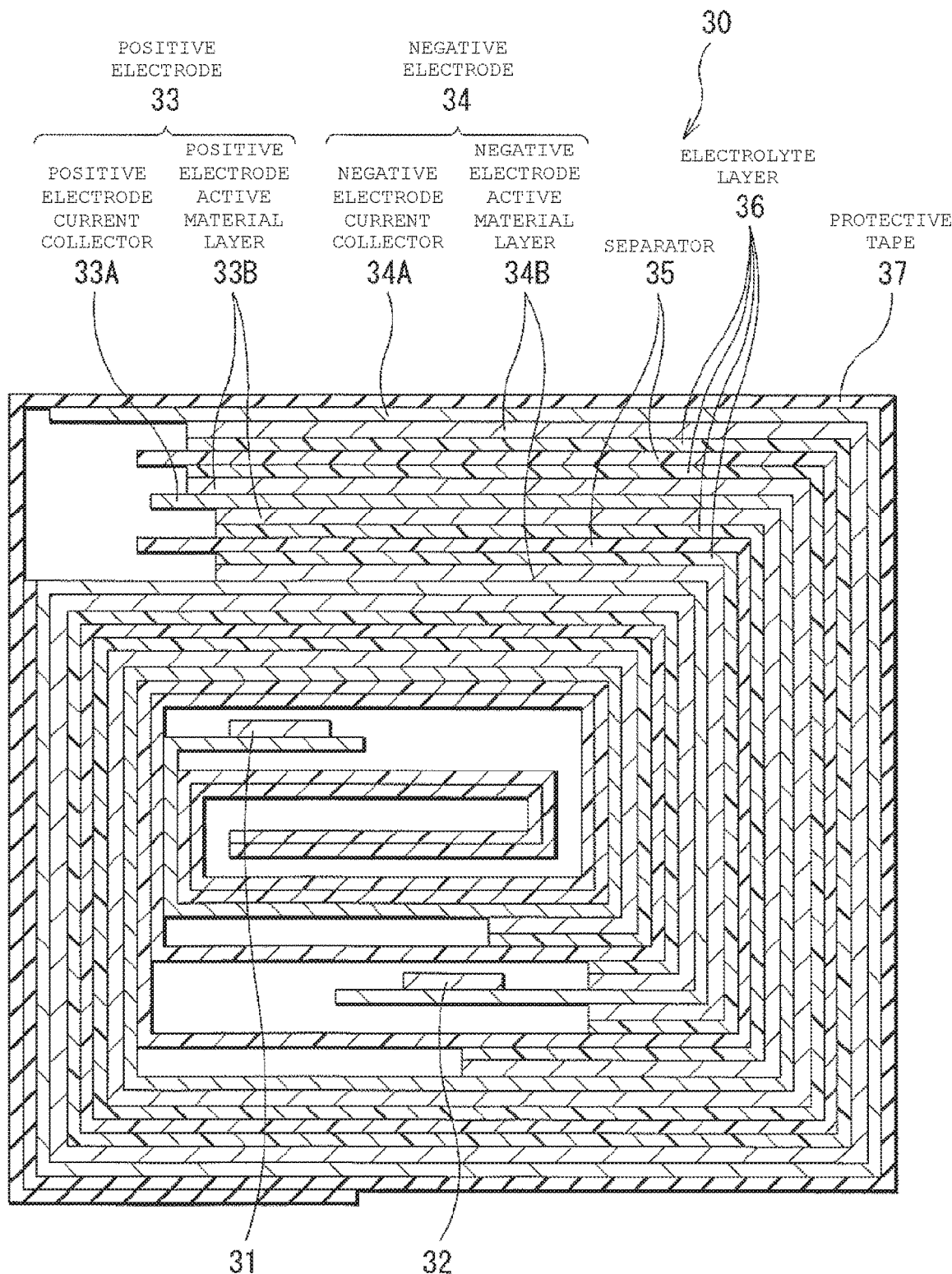
FIG. 4 is a cross-sectional view illustrating the configuration of a wound electrode body, which is taken along line IV-IV shown in FIG. 3.

FIG. 3 shows a perspective configuration of another secondary battery, and FIG. 4 shows a cross-sectional configuration of the wound electrode body 30 shown in FIG. 3 which is taken along line IV-IV shown in FIG. 3. In FIG. 3, the wound electrode body 30 and the external packaging member 40 are separated from each other.

In the following explanation, the constituent elements of the cylinder-type secondary battery which are already described are referred as needed.

The secondary battery is a laminate film-type lithium ion secondary battery (a lithium ion battery) in which a wound electrode body 30 that is a battery element is housed in a film-shaped external packaging member 40 having flexibility (or plasticity), as shown in FIG. 3, for example.

More specifically, the secondary battery is provided with, for example, the wound electrode body 30 in the external packaging member 40. The wound electrode body 30 is formed by, for example, laminating a positive electrode 33 and a negative electrode 34 on each other with a separator 35 and an electrolyte layer 36 interposed therebetween, and then winding the positive electrode 33, the negative electrode 34, the separator 35 and the electrolyte layer 36 together. The electrolyte layer 36 is arranged, for example, between the positive electrode 33 and the separator 35 and is also arranged between the negative electrode 34 and the separator 35. A positive electrode lead 31 is attached to the positive electrode 33, and a negative electrode lead 32 is attached to the negative electrode 34. The outermost peripheral part of the wound electrode body 30 is protected by a protective tape 37.

The positive electrode lead 31 and the negative electrode lead 32 are each guided in the same direction, for example, from the inside of the external packaging member 40 toward the outside of the external packaging member 40. The positive electrode lead 31 contains at least one conductive material such as aluminum (Al). The negative electrode lead 32 contains, for example, at least one conductive material such as copper (Cu), nickel (Ni) and a stainless steel. The conductive material has, for example, a thin film-like or net-like form.

The external packaging member 40 is, for example, a single film that can be folded in the direction shown by arrow R in FIG. 3, and a depression in which the wound electrode body 30 is to be housed is provided on at least a portion of the external packaging member 40. The external packaging member 40 is, for example, a laminate film composed of a melt-bonding layer, a metal layer and a surface protection layer that are laminated in this order. In the step of producing the secondary battery, the external packaging member 40 is, for example, folded in such a manner that the melt-bonding layers can face each other with the wound electrode body 30 interposed therebetween and the outer peripheries of the melt-bonding layers are melt-bonded to each other. In the external packaging member 40, two laminate films may be bonded to each other with an adhesive agent or the like. The melt-bonding layer includes, for example, at least one film selected from a polyethylene film, a polypropylene film and others.

The metal layer includes, for example, at least one member selected from an aluminum foil and the like. The surface protection layer includes, for example, at least one film selected from a nylon film, a polyethylene terephthalate film and the like.

Particularly, the external packaging member 40 is preferably an aluminum laminate film produced by laminating a polyethylene film, an aluminum foil and a nylon film in this order. The external packaging member 40 may be a laminate film having another lamination structure, or may be a polymer film (e.g., a polypropylene film) or a metal film.

Between the external packaging member 40 and the positive electrode lead 31, an adhesion film 41 is interposed for the purpose of preventing the invasion of external air, for example. Between the external packaging member 40 and the negative electrode lead 32, the adhesion film 41 is interposed, for example. The adhesion film 41 contains a material having close adhesiveness to both of the positive electrode lead 31 and the negative electrode lead 32. The material having the close adhesiveness is, for example, a polyolefin resin, and is more specifically at least one material selected from polyethylene, polypropylene, modified polyethylene, modified polypropylene and the like.

The positive electrode 33 includes, for example, a positive electrode current collector 33A and a positive electrode active material layer 33B, and the negative electrode 34 includes, for example, a negative electrode current collector 34A and a negative electrode active material layer 34B. The constitutions of the positive electrode current collector 33A, the positive electrode active material layer 33B, the negative electrode current collector 34A and the negative electrode active material layer 34B are the same as, for example, those of the positive electrode current collector 21A, the positive electrode active material layer 21B, the negative electrode current collector 22A and the negative electrode active material layer 22B, respectively. The constitution of the separator 35 is the same as, for example, that of the separator 23.

The electrolyte layer 36 contains an electrolytic solution and a polymeric compound, and the electrolytic solution has the same composition as that of the present disclosure. Namely, the electrolytic solution contains an unsaturated cyclic compound. The electrolyte layer 36 described herein is a so-called gel-like electrolyte, wherein the electrolytic solution is held by the polymeric compound. This is because a high ionic conductivity (e.g., 1 mS/cm or more at room temperature) can be achieved and the leakage of the electrolytic solution can be prevented. The electrolyte layer 36 may also contain at least one component selected from other materials including additives.

The polymeric compound includes, for example, at least one compound selected from polyacrylonitrile, poly(vinylidene fluoride), polytetrafluoroethylene, polyhexafluoropropylene, poly(ethylene oxide), poly(propylene oxide), polyphosphazene, polysiloxane, poly(vinyl fluoride), poly(vinyl acetate), poly(vinyl alcohol), poly(methyl methacrylate), poly(acrylic acid), poly(methacrylic acid), a styrene-butadiene rubber, a nitrile-butadiene rubber, polystyrene and polycarbonate. The polymeric compound may also be a copolymer. The copolymer is, for example, a copolymer of vinylidene fluoride and hexafluoropyrene. Among these compounds, a preferred example of the homopolymer is poly(vinylidene fluoride), and a preferred example of the copolymer is a copolymer of vinylidene fluoride and hexafluoropyrene. This is because these compounds are electrochemically stable.

In the electrolyte layer 36 that is a gel-like electrolyte, the term "solvent" to be contained in the electrolytic solution is a wide-ranging concept including a liquid material as well as a material having ionic conductivity for dissociating an electrolyte salt. Therefore, in the case where a polymeric compound having ionic conductivity is used, the polymeric compound is also included in the non-aqueous solvent.

It is also possible to use an electrolytic solution without any modification in place of the electrolyte layer 36. In this case, the wound electrode body 30 (the positive electrode 33, the negative electrode 34 and the separator 35) is impregnated with the electrolytic solution.

The secondary battery can be operated, for example, in the following manner.

During charging, lithium ions are released from the positive electrode 33, and the lithium ions are stored in the negative electrode 34 through the electrolyte layer 36. On the other hand, during discharging, lithium ions are released from the negative electrode 34, and the lithium ions are stored in the positive electrode 33 through the electrolyte layer 36.

A secondary battery provided with the gel-like electrolyte layer 36 can be produced by, for example, any one of the following three kinds of processes.

In the first process, firstly, a positive electrode 33 and a negative electrode 34 are produced in the same manner as for the production of the positive electrode 21 and the negative electrode 22. Namely, for the production of the positive electrode 33, positive electrode active material layers 33B are formed respectively on both surfaces of a positive electrode current collector 33A. For the production of the negative electrode 34, negative electrode active material layers 34B are formed respectively on both surfaces of a negative electrode current collector 34A. Subsequently, an electrolytic solution, a polymeric compound, an organic solvent and the like are mixed together to prepare a precursor solution. Subsequently, the precursor solution is applied onto the positive electrode 33, and then the precursor solution is dried to form a gel-like electrolyte layer 36. The precursor solution is applied onto the negative electrode 34, and then the precursor solution is dried to form a gel-like electrolyte layer 36. Subsequently, a positive electrode lead 31 is attached to the positive electrode current collector 33A by employing a welding method or the like, and a negative electrode lead 32 is attached to the negative electrode current collector 34A by employing a welding method or the like. Subsequently, the positive electrode 33 and the negative electrode 34 are laminated on each other with a separator 35 interposed therebetween, and then the positive electrode 33, the negative electrode 34 and the separator 35 are wound together to form a wound electrode body 30. Subsequently, a protective tape 37 is adhered onto the outermost periphery of the wound electrode body 30. Finally, an external packaging member 40 is folded so as to sandwich the wound electrode body 30 therebetween, and then the outer peripheral edges of the external packaging member 40 are bonded to each other by employing a thermal bonding method or the like to enclose the wound electrode body 30 in the external packaging member 40.

In this case, an adhesion film 41 is inserted between the positive electrode lead 31 and the external packaging member 40, and the adhesion film 41 is also inserted between the negative electrode lead 32 and the external packaging member 40.

In the second process, firstly, a positive electrode lead 31 is attached to a positive electrode 33, and a negative electrode lead 32 is attached to a negative electrode 34. Subsequently, the positive electrode 33 and the negative electrode 34 are laminated on each other with a separator 35 interposed therebetween, and then the positive electrode 33, the negative electrode 34 and the separator 35 are wound together to form a wound body that is a precursor of a wound electrode body 30. Subsequently, a protective tape 37 is adhered onto the outermost periphery of the wound body. Subsequently, an external packaging member 40 is folded so as to sandwich the wound body therebetween, and then outer peripheral edges excluding one outer peripheral edge of the external packaging member 40 are bonded to each other by employing a thermal bonding method or the like to house the wound body in the bag-shaped external packaging member 40. Subsequently, an electrolytic solution, a monomer that is a raw material for a polymeric compound, a polymerization initiator, and optionally other materials such as a polymerization inhibitor are mixed together to prepare an electrolyte composition. Subsequently, the electrolyte composition is injected into the bag-shaped external packaging member 40, and then the external packaging member 40 is sealed by employing a thermal bonding method or the like. Finally, the monomer is thermally polymerized to form the polymeric compound. In this manner, the electrolytic solution can be held by the polymeric compound and therefore a gel-like electrolyte layer 36 can be formed.

In the third process, firstly, a wound body is produced by the same procedures as those in the second process, except that a separator 35 having polymeric compound layers formed thereon is used. Subsequently, the wound body is housed in a bag-shaped external packaging member 40. Subsequently, an electrolytic solution is injected into the external packaging member 40, and then an opening of the external packaging member 40 is sealed by employing a thermal bonding method or the like. Finally, the external packaging member 40 is heated while applying a load to the external packaging member 40, thereby adhering the separator 35 to the positive electrode 33 with the polymeric compound layer interposed therebetween and also adhering the separator 35 to the negative electrode 34 with the separator 35 interposed therebetween. As a result, the electrolytic solution penetrates into each of the polymeric compound layers and each of the polymeric compound layers is gelatinized. In this manner, an electrolyte layer 36 can be formed.

In the third process, the swelling of the secondary battery can be suppressed more effectively compared with the first process. Furthermore, in the third process, the non-aqueous solvent, the monomer (the raw material for the polymeric compound) and the like remain in smaller amounts in the electrolyte layers 36 compared with the second procedure, and therefore the process of the formation of the polymeric compound can be controlled satisfactorily. As a result, each of the positive electrode 33, the negative electrode 34 and the separator 35 can be adhered to the electrolyte layers 36 satisfactorily.

According to this laminate film-type secondary battery, the electrolyte layer 36 contains an electrolytic solution and the electrolytic solution has the same composition as that of the electrolytic solution of the present disclosure. Therefore, for the same reasons as those mentioned with respect to the above-mentioned cylinder-type secondary battery, excellent battery properties can be achieved. Other actions and effects are the same as those of the cylinder-type secondary battery.

Next, another secondary battery in which the electrolytic solution of the present disclosure is used will be described. The secondary battery described in this section is a cylinder-type lithium metal secondary battery in which the battery capacity (the capacity of the negative electrode 22) can be obtained by, for example, utilizing the lithium metal dissolution phenomenon and the lithium deposition phenomenon.

The secondary battery has the same configuration as that of the above-mentioned cylinder-type lithium ion secondary battery, except that a negative electrode active material layer 22B is made from lithium metal, and can be produced in the same manner as for the production of the cylinder-type lithium ion secondary battery.

In the secondary battery, lithium metal is used as a negative electrode active material and therefore a high energy density can be achieved. The negative electrode active material layer 22B may be present already at the time of the assembly of the battery. Alternatively, the negative electrode active material layer 22B may not be present yet at the time of the assembly of the battery and may be formed from lithium metal that is deposited during charging. Alternatively, it is also possible to use the negative electrode active material layer 22B as a current collector to eliminate a negative electrode current collector 22A.

The secondary battery can be operated, for example, in the following manner. During charging, lithium ions are released from the positive electrode 21 and the lithium ions are deposited in the form of lithium metal on the surface of the negative electrode current collector 22A through the electrolytic solution. During discharging, on the other hand, lithium metal is eluted in the form of lithium ions from the negative electrode active material layer 22B into electrolytic solution and the lithium ions are stored in the positive electrode 21 through the electrolytic solution.

According to this cylinder-type lithium metal secondary battery, the electrolytic solution has the same composition as that of the electrolytic solution according to the present disclosure, and therefore excellent battery properties can be achieved for the same reasons as those mentioned with respect to the above-mentioned secondary battery. Other actions and effects are the same as those of the lithium ion secondary battery.

The lithium metal secondary battery described in this section may be of a laminate film-type secondary battery in place of a cylinder-type secondary battery. In this case, the same effects can also be achieved.

Next, examples of the application of the above-mentioned secondary battery will be described.

The use applications of the secondary battery are not particularly limited, and include a machine, a device, a tool, an apparatus and a system (i.e., an assembly of a plurality of devices) as long as the secondary battery is used as a power supply for driving purposes, an electric power storage source for electric power reservation purposes or the like. When used as a power supply, the secondary battery may be a main power supply or an auxiliary power supply. The main power supply is a power supply that is used preferentially regardless of the presence or absence of other power supply. The auxiliary power supply may be, for example, a power supply that can be used in place of a main power supply or a power supply that can be switched from a main power supply as required. In the case where the secondary battery is used as an auxiliary power supply, the type of a main power supply is not limited to a secondary battery.

The use applications of the secondary battery include the followings:

an electronic device (including a mobile electronic device), such as a video camera, a digital still camera, a mobile phone, a note-type personal computer, a codeless phone, a headset stereo, a mobile radio, a mobile television and a personal digital assistant;

a mobile daily instrument such as an electric shaver;

a storage device such as a backup power supply and a memory card;

an electric power tool such as an electric drill and an electric saw;

a battery pack that is installed as a removable power supply in a note-type personal computer or the like;

a medical electronic device such as a pacemaker and a hearing aid;

an electric vehicle such as an electric car (including a hybrid car); and an electric power storage system for accumulating an electric power for emergencies and the like, such as a battery system for home use. As a matter of course, the use application of the secondary battery may be other than the above-mentioned use applications.

Particularly, the secondary battery can be used effectively in a battery pack, an electric vehicle, an electric power storage system, an electric power tool, an electronic device and the like. In these use applications, excellent battery properties are required. Therefore, the performance of these products can be improved effectively by using the secondary battery according to the present disclosure. A battery pack is a power supply provided with a secondary battery. The battery pack may be provided with a unit battery or an assembled battery, as mentioned below. An electric vehicle is a vehicle that can be operated (run) using a secondary battery as a driving power supply, and may be an automobile that is also provided with a driving source other than a secondary battery (e.g., a hybrid car), as mentioned above. An electric power storage system is a system in which a secondary battery is used as an electric power storage source. For example, in an electric power storage system for home use, an electric power is accumulated in a secondary battery that serves as an electric power storage source. Therefore, the electric power storage system for home use can be used as an electric appliance for home use or the like by utilizing the electric power. An electric power tool is a tool in which a movable unit (e.g., a drill) is driven utilizing a secondary battery as a driving power supply. An electronic device is a device that can exert various functions thereof by utilizing a secondary battery as a driving power supply (an electric power supply source).

Hereinbelow, some use applications of the secondary battery will be described concretely. The configurations of the application examples described below are intended only as illustrations, and the configurations can be varied as required.

Figure 5:
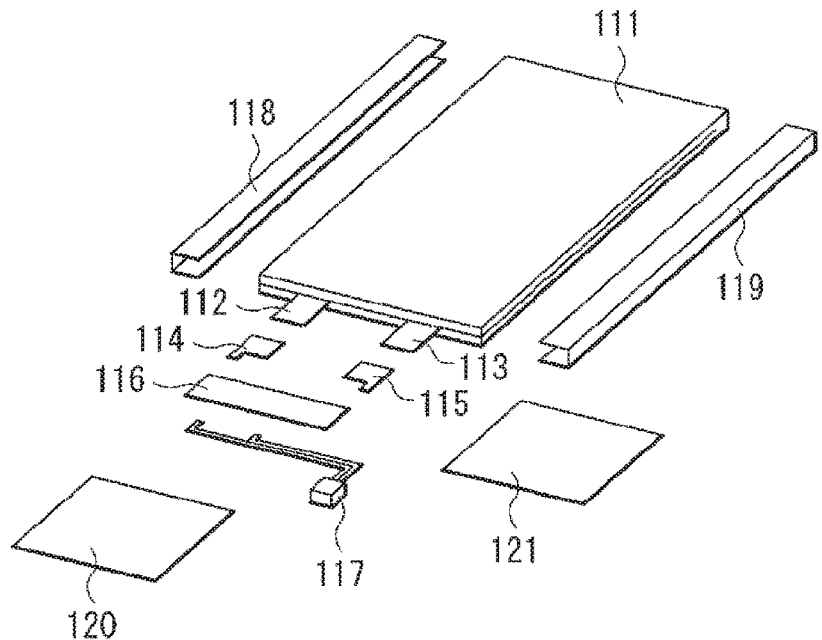
FIG. 5 is a perspective view illustrating the configuration of a use application example of the secondary battery (a battery pack: a unit battery) according to an embodiment of the present disclosure.
Figure 6:
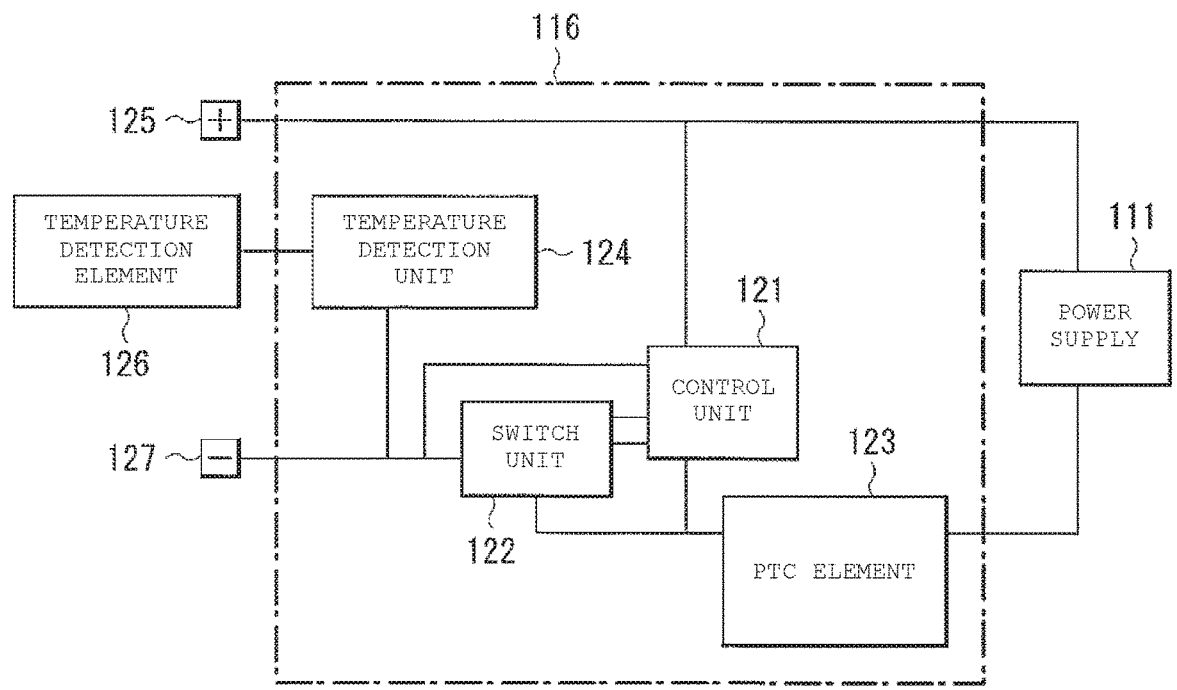
FIG. 6 is a block diagram illustrating the configuration of the battery pack shown in FIG. 5

FIG. 5 is a perspective configuration of a battery pack provided with a unit battery. FIG. 6 is a block configuration of the battery pack shown in FIG. 5. In FIG. 5, a state where the battery pack is disassembled is shown.

The battery pack described in this section is a construct-simplified battery pack (i.e., a soft pack) provided with a single secondary battery, and can be installed in an electronic device typified by a smart phone. As shown in FIG. 5, the battery pack is provided with, for example: a power supply 111 that is a laminate film-type secondary battery; and a circuit board 116 that is connected to the power supply 111. To the power supply 111, a positive electrode lead 112 and a negative electrode lead 113 are attached.

To both side surfaces of the power supply 111, a pair of adhesive tapes 118 and 119 are respectively adhered. On the circuit board 116, a protection circuit module (PCM) is formed. The circuit board 116 is connected to a positive electrode 112 through a tab 114, and is also connected to a negative electrode lead 113 through a tab 115. The circuit board 116 is connected to a connector-attached wire lead 117 for external connection. In the state where the circuit board 116 is connected to the power supply 111, the circuit board 116 is protected by a label 120 and an insulating sheet 121.

By adhering the label 120, the circuit board 116, the insulating sheet 121 and the like are fixed.

The battery pack is also provided with, for example, a power supply 111 and a circuit board 116, as shown in FIG. 6. The circuit board 116 is also provided with, for example, a control unit (controller) 121, a switch unit 122, a PTC element 123 and a temperature detection unit 124. The power supply 111 can be connected to the outside through a positive electrode terminal 125 and a negative electrode terminal 127, and therefore the power supply 111 can be charged and discharged through the positive electrode terminal 125 and the negative electrode terminal 127. The temperature detection unit 124 can detect a temperature using a temperature detection terminal (so-called T terminal) 126.

The control unit 121 controls the entire operation of the battery pack (including the state of usage of the power supply 111). The control unit 121 includes, for example, a central processing device (e.g., a CPU) or a process, a memory and the like.

When, for example, the battery voltage reaches an overcharge detection voltage, the control unit 121 disconnects the switch unit 122 so that a charge current cannot flow through the current passage of the power supply 111. When, for example, a high current flows during charging, the control unit 121 disconnects the switch unit 122 so as to shut off a charge current.

On the other hand, when, for example, the battery voltage reaches an overdischarge detection voltage, the control unit 121 disconnects the switch unit 122 so that a discharge current cannot flow through the current passage of the power supply 111. When, for example, a high current flows during discharging, the control unit 121 disconnects the switch unit 122 so as to shut off a discharge current.

The overcharge detection voltage is not particularly limited and is, for example, 4.2 V±0.05 V, and the overdischarge detection voltage is not particularly limited and is, for example, 2.4 V±0.1 V.

The switch unit 122 switches the state of usage of the power supply 111, i.e., the connection or disconnection of the power supply 111 to an external device, in response to a command from the control unit 121. The switch unit 122 includes, for example, a charge control switch, a discharge control switch and the like. Each of the charge control switch and the discharge control switch is, for example, a semiconductor switch such as a field effect transistor provided with a metal oxide semiconductor (e.g., a MOSFET). The charge-discharge current can be detected, for example, on the basis of the ON resistance of the switch unit 122.

The temperature detection unit 124 measures the temperature of the power supply 111 and outputs the result of the measurement of the temperature to the control unit 121. The temperature detection unit 124 includes, for example, a temperature detection element such as a thermistor. In the case where the control unit 121 performs a charge-discharge control upon the occurrence of abnormal heat generation, the result of the measurement of the temperature measured by the temperature detection unit 124 is used for the correction processing by the control unit 121 in the calculation of a remaining capacity and the like.

Alternatively, the circuit board 116 may not be provided with a PTC element 123. In this case, the PTC element may be attached to the circuit board 116 separately.

Figure 7:
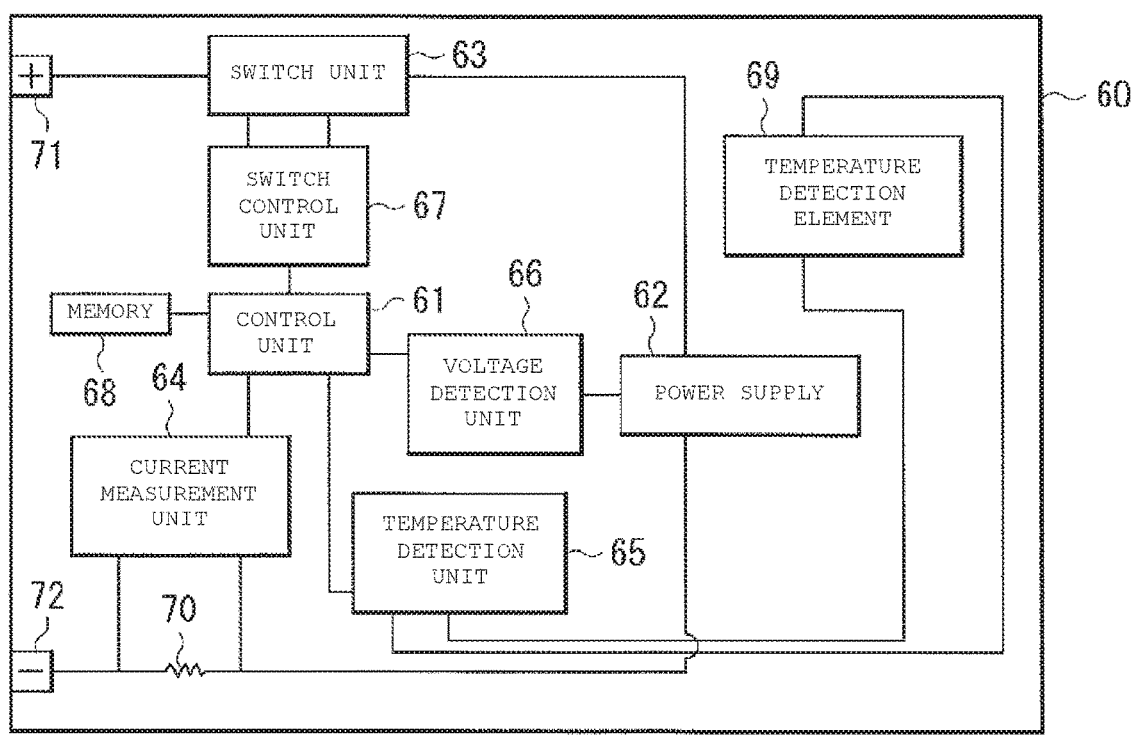
FIG. 7 is a block diagram illustrating the configuration of a use application example of the secondary battery (a battery pack: an assembled battery) according to an embodiment of the present disclosure.

FIG. 7 shows the block configuration of a battery pack provided with an assembled battery.

The battery pack is provided with, for example: a housing 60; and a control unit 61, a power supply 62, a switch unit 63, a current measurement unit 64, a temperature detection unit 65, a voltage detection unit 66, a switch control unit 67, a memory 68, a temperature detection element 69, a current detection resistor 70, a positive electrode terminal 71 and a negative electrode terminal 72 all of which are housed in the housing 60. The housing 60 contains, for example, a plastic material.

The control unit (controller) 61 can control the entire operation of the battery pack (including the state of usage of the power supply 62). The control unit 61 includes, for example, a CPU or a processor. The power supply 62 is an assembled battery including at least two secondary batteries, and the mode of connection between the at least two secondary batteries may be in series, or in parallel or a mixed state thereof. In one example, the power supply 62 includes six secondary batteries that are connected to one another in a (2 in series)×(3 in parallel) configuration.

The switch unit 63 switches the state of usage of the power supply 62, i.e., the connection or disconnection of the power supply 62 to an external device, in response to the command from the control unit 61. The switch unit 63 is provided with, for example, a charge control switch, a discharge control switch, a charging diode and a discharging diode. Each of the charge control switch and the discharge control switch is, for example, a semiconductor switch such as a field effect transistor provided with a metal oxide semiconductor (e.g., a MOSFET).

The current measurement unit 64 measures a current using a current detection resistor 70, and outputs the result of the measurement of the current to the control unit 61. The temperature detection unit 65 measures a temperature using the temperature detection element 69, and outputs the result of the measurement of the temperature to the control unit 61. In the case where the control unit 61 performs a charge-discharge control upon the occurrence of abnormal heat generation for example, the result of the measurement of the temperature is used for the correction processing by the control unit 61 in the calculation of a remaining capacity and the like. The voltage detection unit 66 measures a voltage of the secondary battery in the power supply 62, and supplies the result of the measurement of the voltage, which is analogue-digital converted, to the control unit 61.

The switch control unit 67 controls the operation of the switch unit 63 depending on signals respectively input from the current measurement unit 64 and the voltage detection unit 66.

When, for example, the battery voltage reaches an overcharge detection voltage, the switch control unit 67 disconnects the switch unit 63 (the charge control switch) so that a charge current cannot flow through the current passage in the power supply 62. As a result, in the power supply 62, only discharging through the discharging diode becomes possible. When, for example, a high current flows during discharging, the switch control unit 67 shuts off the charge current.

When, for example, the battery voltage reaches an overdischarge detection voltage, the switch control unit 67 disconnects the switch unit 63 (the discharge control switch) so that a discharge current cannot flow through the current passage in the power supply 62. As a result, in the power supply 62, only charging through the charging diode becomes possible. When, for example, a high current flows during discharging, the switch control unit 67 shuts off the discharge current.

The overcharge detection voltage is not particularly limited and is, for example, 4.2 V±0.05 V, and the overdischarge detection voltage is not particularly limited and is, for example, 2.4 V±0.1 V.

The memory 68 includes, for example, an EEPROM that is a non-volatile memory. In the memory 68, a numerical value calculated by the control unit 61, information on the secondary batteries which is measured in the production process (e.g., an internal resistance in an initial state), and the like are stored. By storing a full charge capacity of each of the secondary batteries in the memory 68, it becomes possible to allow the control unit 61 to know information such as a remaining capacity.

The temperature detection element 69 measures the temperature of the power supply 62, and outputs the result of the measurement of the temperature to the control unit 61. The temperature detection element 69 is equipped with, for example, a thermistor.

Each of the positive electrode terminal 71 and the negative electrode terminal 72 is a terminal that can be connected to an external device capable of being driven with a battery pack (e.g., a note-type personal computer), an external device used for charging a battery pack (e.g., a charger) or the like. The power supply 62 can be charged and discharged through the positive electrode terminal 71 and the negative electrode terminal 72.

Figure 8:
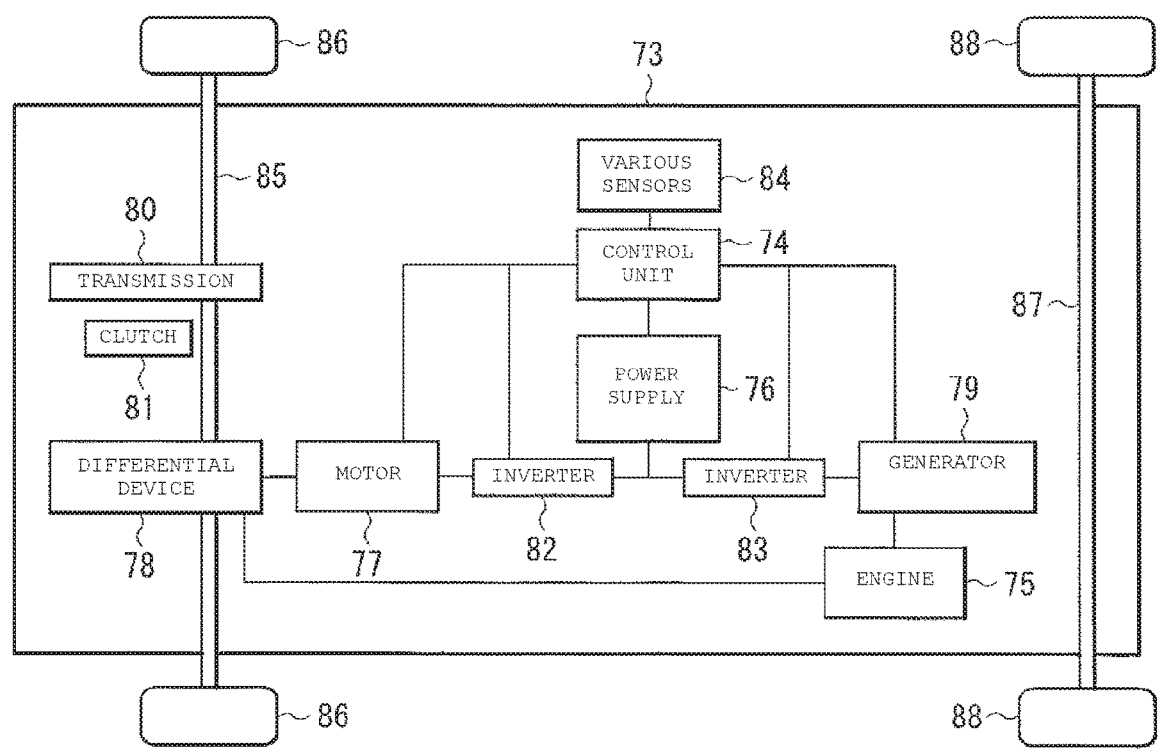
FIG. 8 is a block diagram illustrating the configuration of a use application example of the secondary battery (an electric vehicle) according to an embodiment of the present disclosure.

FIG. 8 shows a block configuration of a hybrid car that is one example of an electric vehicle.

The electric vehicle is provided with, for example: a metal-made housing 73; and a control unit (controller) 74, an engine 75, a power supply 76, a driving motor 77, a differential device 78, a generator 79, a transmission 80, a clutch 81, inverters 82 and 83, and various sensors 84 all of which are housed in the housing 73. In addition, the electric vehicle is also provided with, for example, a front wheel drive shaft 85, front wheels 86, a rear wheel drive shaft 87 and rear wheels 88 all of which are connected to a differential device 78 and the transmission 80.

The electric vehicle can run by, for example, utilizing either one of an engine 75 and a motor 77 as a driving source. The engine 75 is a main power source, such as a gasoline engine. In the case where the engine 75 is used as a power source, a driving force (rotational force) of the engine 75 is transmitted to the front wheels 86 and the rear wheels 88 through the differential device 78, the transmission 80 and the clutch 81 which are driving units (drivers), for example. The rotational force of the engine 75 is transmitted to a generator 79, and therefore the generator 79 generates an alternate current electric power utilizing the rotational force. The alternate current electric power is converted to a direct current electric power through the inverter 83, and therefore the direct current electric power is accumulated in the power supply 76. On the other hand, in the case where the motor 77, which is a conversion unit (converter), is used as a power source, an electric power (direct current electric power) supplied from the power supply 76 is converted to an alternate current electric power through the inverter 82, and therefore the motor 77 is driven utilizing the alternate current electric power. A driving force (rotational force) converted from the electric power by the motor 77 is transmitted to the front wheels 86 and the rear wheels 88 through the differential device 78, the transmission 80 and the clutch 81 which are driving units, for example.

When the electric vehicle is decelerated through a damping mechanism, a resisting force generated during the deceleration is transmitted to the motor 77 as a rotational force. Therefore, it is also possible to generate an alternate current electric power by the motor 77 by utilizing the rotational force. The alternate current electric power is converted to a direct current electric power through the inverter 82, and therefore it is preferred that the direct-current regenerative electric power is accumulated in the power supply 76.

The control unit 74 controls the entire operation of the electric vehicle. The control unit 74 is provided with, for example, a CPU or processor. The power supply 76 is provided with at least one secondary battery. It is also possible that the power supply 76 is connected to an external power supply and receives the supply of an electric power from the external power supply so as to accumulate the electric power therein. The various sensors 84 are used, for example, for controlling the rotation speed of the engine 75 and also controlling the opening angle of a throttle valve (throttle opening angle). The various sensors 84 include, for example, at least one sensor selected from a speed sensor, an acceleration sensor and an engine rotating speed sensor.

In this section, a case where the electric vehicle is a hybrid car is exemplified. However, the electric vehicle may be a vehicle that can be driven only by the power supply 76 and the motor 77 without the need to utilize the engine 75 (i.e., an electric car).

Figure 9:
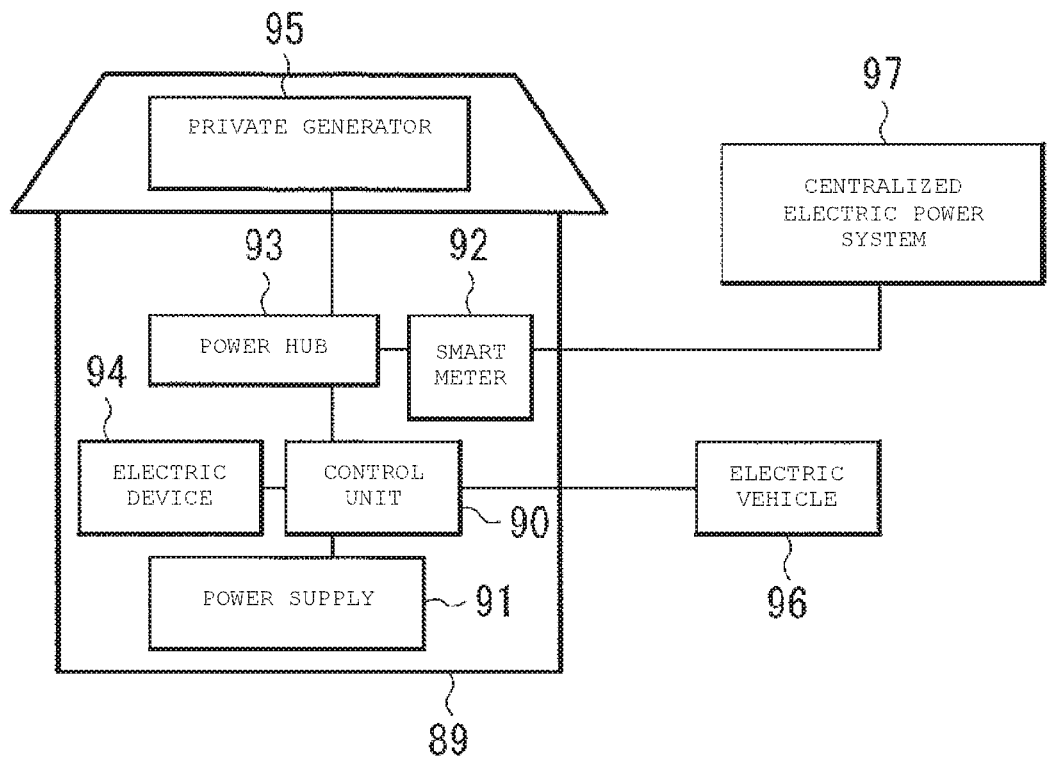
FIG. 9 is a block diagram illustrating the configuration of a use application example of the secondary battery (an electric power storage system) according to an embodiment of the present disclosure.

FIG. 9 shows a block configuration of an electric power storage system.

The electric power storage system is provided with, for example: a house 89 such as a conventional home and a commercial building; and a control unit (controller) 90, a power supply 91, a smart meter 92 and a power hub 93 all of which are housed in the house 89.

In the electric power storage system, it is possible, for example, that the power supply 91 is connected to an electric device 94 that is placed in the house 89 and is also connected to an electric vehicle 96 that is parked at the outside of the house 89. Alternatively, it is also possible, for example, that the power supply 91 is connected to a private generator 95 that is placed in the house 89 through the power hub 93 and is also connected to an external centralized electric power system 97 through the smart meter 92 and the power hub 93.

The electric device 94 also includes at least one home appliance such as a refrigerator, an air conditioner, a television and a water heater. The private generator 95 includes, for example, at least one generator selected from a solar generator, a wind generator and the like. The electric vehicle 96 includes, for example, at least one electric vehicle selected from an electric car, an electric motorcycle and a hybrid car. The centralized electric power system 97 includes, for example, at least one electric power system selected from a thermal power plant, a nuclear power plant, a hydroelectric power plant and a wind power plant.

The control unit 90 controls the entire operation of the electric power storage system (including the state of usage of the power supply 91). The control unit 90 includes, for example, a CPU. The power supply 91 includes at least one secondary battery. The smart meter 92 is, for example, a network-compatible electric power meter to be placed in a house 89 that demands an electric power, and can communicate with an electric power supplier. Accordingly, the smart meter 92 controls the demand-supply balance of an electric power in the houses 89 while communicating with an outside to thereby enable the highly efficient and steady energy supply, for example.

In the electric power storage system, an electric power from the centralized electric power system 97, which is an external power supply, is accumulated in the power supply 91 through the smart meter 92 and the power hub 93, and an electric power from the private generator 95, which is an independent power supply, is accumulated in the power supply 91 through the power hub 93, for example. The electric power accumulated in the power supply 91 is supplied to the electric device 94 and the electric vehicle 96 in response to a command from the control unit 90. As a result, the electric device 94 becomes in an operable state and the electric vehicle 96 becomes in a chargeable state. Namely, the electric power storage system is a system that enables the accumulation and supply of an electric power in the house 89 by utilizing the power supply 91.

The electric power accumulated in the power supply 91 can be used as required.

Therefore, it is possible, for example, that an electric power from the centralized electric power system 97 is accumulated in the power supply 91 during midnight in which an electric power rate is inexpensive and the electric power accumulated in the power supply 91 is used during the day in which an electric power rate is expensive.

The above-mentioned electric power storage system may be placed per house (family), or may be placed every several houses (every several families).

Figure 10:
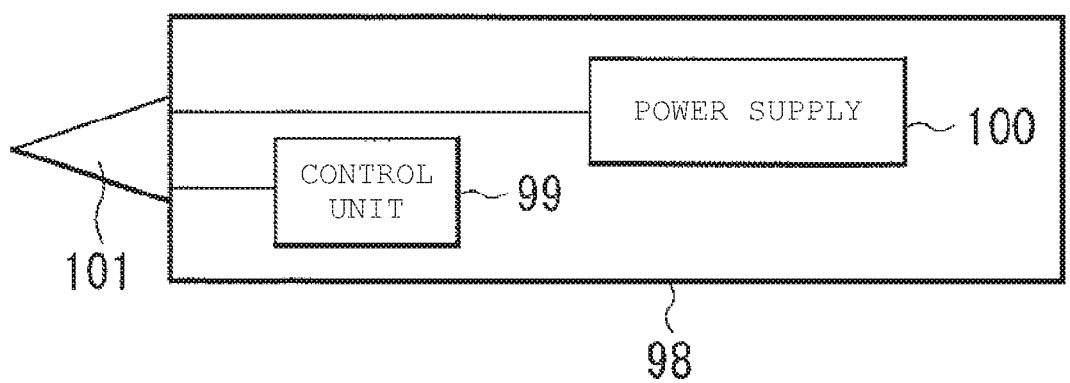
FIG. 10 is a block diagram illustrating the configuration of a use application example of the secondary battery (an electric power tool) according to an embodiment of the present disclosure.

FIG. 10 shows a block configuration of an electric power tool.

The electric power tool described in this section is, for example, an electric drill. The electric power tool is provided with, for example; a tool main body 98; and a control unit 99 and a power supply 100 both of which are arranged in the tool main body 98. In the tool main body 98, a drill part 101, which is a movable unit, is installed operably (rotatably).

The tool main body 98 contains, for example, a plastic material. The control unit 99 controls the entire operation of the electric power tool (including the state of usage of the power supply 100). The control unit 99 includes, for example, a CPU. The power supply 100 includes at least one secondary battery. The control unit 99 supplies an electric power from the power supply 100 to the drill part 101 in response to the operation of an operation switch.

EXAMPLES

Hereinbelow, examples of the present disclosure will be described.

Experiment Examples 1-1 to 1-49

A laminate film-type lithium ion secondary battery shown in FIGS. 3 and 4 was produced by the following procedure.

For the production of a positive electrode 33, firstly a positive electrode active material (lithium cobaltate (LiCoO$_2$)) (91 parts by mass), a positive electrode binder (poly(vinylidene fluoride)) (3 parts by mass) and a positive electrode conductive agent (graphite) (6 parts by mass) were mixed together to prepare a positive electrode mix. Subsequently, the positive electrode mix was introduced into an organic solvent (N-methyl-2-pyrrolidone), and then the organic solvent was stirred to prepare a paste-like positive electrode mix slurry. Subsequently, the positive electrode mix slurry was applied onto both surfaces of a positive electrode current collector 33A (a strip-like aluminum foil, thickness=12 μm) with a coating device, and then the positive electrode mix slurry was dried to form positive electrode active material layers 33B. Finally, the positive electrode active material layers 33B were compression-molded using a roll press machine.

For the production of a negative electrode 34, firstly a negative electrode active material (graphite that was a carbon material, median diameter D50=15 μm) (96 parts by mass), a negative electrode binder (a modified product of a styrene-butadiene rubber copolymer modified with acrylic acid) (1.5 parts by mass) and a thickening agent (carboxymethyl cellulose) (1.5 parts by mass) were mixed together to prepare a negative electrode mix. Subsequently, the negative electrode mix was introduced into an aqueous solvent (pure water), and then the pure water was stirred to prepare a paste-like negative electrode mix slurry. Subsequently, the negative electrode mix slurry was applied onto both surfaces of a negative electrode current collector 34A (a strip-like copper foil, thickness=15 μm) with a coating device, and then the negative electrode mix slurry was dried to form negative electrode active material layers 34B. Finally, the negative electrode active material layers 34B were compression-molded using a roll press machine.

For the preparation of an electrolytic solution, an electrolyte salt (lithium hexafluoridephosphate (LiPF$_6$)) was added to a solvent (ethylene carbonate (EC) and ethyl methyl carbonate (EMC)), then the solvent was stirred, then an unsaturated cyclic compound was added to the solvent, and then the solvent was stirred. The mixing ratio (% by weight) of the solvent, the content (mol/kg) of the electrolyte salt and the type and content (% by weight) of the unsaturated cyclic compound are shown in Tables 1 and 2.

In this case, for comparison, an electrolytic solution was prepared by the same procedure, except that no unsaturated cyclic compound was used. Furthermore, for comparison, an electrolytic solution was prepared by the same procedure, except that another compound was used in place of the unsaturated cyclic compound. The types and the contents (% by weight) of the other compounds are shown in Table 2.

The energy (eV) of lowest unoccupied molecular orbitals (LUMOs) which were calculated with respect to some of the unsaturated cyclic compounds and some of other compounds employing a computational technique is shown in Tables 1 and 2. The computational technique is quantum chemical calculation employing density functional theory, i.e., so-called DFT calculation. In this case, the optimization of the structure of an unsaturated cyclic compound or the like and the calculation of the energy of a LUMO were carried out by utilizing a combination of a B3LYP density function and a 6-31+G* basis function (i.e., B3LYP/6-31+G*) utilizing a quantum chemical calculation program Gaussian03 manufactured by Gaussian Inc.

For the assembly of a secondary battery, firstly an aluminum-made positive electrode lead 31 was welded to the positive electrode current collector 33A, and a copper-made negative electrode lead 32 was welded to the negative electrode current collector 34A. Subsequently, the positive electrode 33 and the negative electrode 34 were laminated on each other with the separator 35 (a microporous polyethylene film, thickness=15 μm) interposed therebetween to produce a laminate. Subsequently, the laminate was wound in the length direction, and then a protective tape 37 was attached to the outermost peripheral part of the laminate to form a wound body. Finally, an external packaging member 40 (outside: a nylon film, thickness=25 μm/an aluminum foil, thickness=40 μm/a polypropylene film, thickness=30 μm: inside) was folded so as to sandwich the wound body therebetween, and then three outer peripheral edges of the external packaging member 40 were thermally bonded to each other. In this case, an adhesion film 41 was inserted between the positive electrode lead 31 and the external packaging member 40, and an adhesion film 42 was also inserted between the negative electrode lead 32 and the external packaging member 40. Finally, the electrolytic solution was injected into the inside of the external packaging member 40 to allow the wound body to be impregnated with the electrolytic solution, and the remaining one outer peripheral edge of the external packaging member 40 was thermally bonded in a pressure-reduced environment.

In this manner, a wound electrode body 30 was formed, and the wound electrode body 30 was enclosed in the inside of the external packaging member 40. In this manner, a laminate film-type lithium ion secondary battery was completed. For the production of each of the secondary batteries, the amount of the positive electrode active material and the amount of the negative electrode active material were adjusted in accordance with the relationship therebetween in such a manner that the open circuit voltage (i.e., battery voltage) at a time of being completely charged became 4.2 V.

In order to evaluate the battery properties of each of the secondary batteries, a cycle property of each of the secondary batteries were examined. The results shown in Tables 1 and 2 were obtained.

In order to examine the cycle property, for the purpose of stabilizing the condition of each of the secondary batteries, firstly each of the secondary batteries was subjected to a charging/discharging procedure (3 cycles) in an ambient-temperature environment (temperature=20° C.). Subsequently, each of the secondary batteries was subjected to a charging/discharging procedure in a high-temperature environment (temperature=50° C.), and the discharge capacity on 4th cycle was measured. Subsequently, each of the secondary batteries was charged and discharged in the same environment (500 cycles), and the discharge capacity on 504th cycle was measured. Finally, a capacity retention rate (%) (=[(a discharge capacity on 504th cycle)/(a discharge capacity on 4th cycle)]×100) was calculated.

In the charging procedure, charging at a constant current was performed at a current density of 1 mA/cm$^2$ until the voltage reached 4.2 V, and then charging at a constant voltage was performed at a voltage of 4.2 V until the current density reached 0.02 mA/cm$^2$. In the discharging procedure, discharging was performed at a current density of 1 mA/cm$^2$ until the voltage reached 3 V.

TABLE 1

Negative electrode active material: carbon material (graphite), charging voltage = 4.2 V

| | Solvent | | | | | | | |
|---|---|---|---|---|---|---|---|---|
| | Carbonic acid ester etc. | | Unsaturated cyclic compound | | | Electrolyte salt | | Capacity retention |
| | | Mixing ratio | | Content | | | | |
| Experiment Example | Type | (% by weight) | Type | (% by weight) | LUMO (eV) | Type | Content (mol/kg) | rate (%) |
| 1-1 | EC + EMC | 30 + 70 | Formula (1-1) | 1 | — | LiPF$_6$ | 1.2 | 80 |
| 1-2 | | | Formula (1-2) | 1 | — | | | 85 |
| 1-3 | | | Formula (1-3) | 0.01 | — | | | 74 |
| 1-4 | | | | 0.1 | — | | | 74 |
| 1-5 | | | | 0.5 | — | | | 88 |
| 1-6 | | | | 1 | −2.55 | | | 93 |
| 1-7 | | | | 3 | — | | | 86 |
| 1-8 | | | | 5 | — | | | 74 |
| 1-9 | | | Formula (1-4) | 1 | — | | | 88 |
| 1-10 | | | Formula (1-5) | 1 | — | | | 90 |
| 1-11 | | | Formula (1-6) | 1 | — | | | 74 |
| 1-12 | | | Formula (1-7) | 1 | — | | | 75 |
| 1-13 | | | Formula (1-8) | 1 | — | | | 74 |
| 1-14 | | | Formula (1-9) | 1 | — | | | 83 |
| 1-15 | | | Formula (1-10) | 1 | — | | | 84 |
| 1-16 | | | Formula (1-11) | 1 | — | | | 75 |
| 1-17 | | | Formula (1-12) | 1 | — | | | 74 |
| 1-18 | | | Formula (1-13) | 1 | — | | | 74 |
| 1-19 | | | Formula (1-14) | 1 | — | | | 82 |
| 1-20 | | | Formula (1-15) | 1 | — | | | 85 |
| 1-21 | | | Formula (1-16) | 1 | — | | | 84 |
| 1-22 | | | Formula (1-17) | 1 | — | | | 83 |
| 1-23 | | | Formula (1-18) | 1 | −0.44 | | | 75 |
| 1-24 | | | Formula (1-19) | 1 | — | | | 75 |

TABLE 2

Negative electrode active material: carbon material (graphite), charging voltage = 4.2 V

| | Solvent | | | | | | | |
|---|---|---|---|---|---|---|---|---|
| | Carbonic acid ester etc. | | Unsaturated cyclic compound | | | | | Capacity |
| | | Mixing ratio | | Content | | Electrolyte salt | | retention |
| Experiment Example | Type | (% by weight) | Type | (% by weight) | LUMO (eV) | Type | Content (mol/kg) | rate (%) |
| 1-25 | EC + EMC | 30 + 70 | Formula (1-20) | 1 | — | LiPF$_6$ | 1.2 | 74 |
| 1-26 | | | Formula (1-21) | 1 | — | | | 78 |
| 1-27 | | | Formula (1-22) | 1 | — | | | 80 |
| 1-28 | | | Formula (1-22) | 1 | — | | | 79 |
| 1-29 | | | Formula (1-22) | 1 | — | | | 75 |
| 1-30 | | | Formula (1-22) | 1 | — | | | 76 |
| 1-31 | | | Formula (1-22) | 1 | — | | | 76 |
| 1-32 | | | Formula (1-22) | 1 | — | | | 75 |
| 1-33 | | | Formula (1-28) | 1 | — | | | 76 |
| 1-34 | | | Formula (1-29) | 1 | — | | | 83 |
| 1-35 | | | Formula (1-30) | 1 | — | | | 82 |
| 1-36 | | | Formula (1-31) | 1 | — | | | 75 |
| 1-37 | | | Formula (1-32) | 1 | — | | | 75 |
| 1-38 | | | Formula (1-33) | 1 | — | | | 81 |
| 1-39 | | | Formula (1-34) | 1 | — | | | 86 |
| 1-40 | | | Formula (1-35) | 1 | — | | | 82 |
| 1-41 | | | Formula (1-36) | 1 | — | | | 86 |
| 1-42 | | | Formula (1-37) | 1 | −2.26 | | | 85 |
| 1-43 | | | Formula (1-38) | 1 | −1.30 | | | 85 |
| 1-44 | | | Formula (1-39) | 1 | — | | | 87 |
| 1-45 | | | Formula (1-40) | 1 | — | | | 86 |
| 1-46 | EC + EMC | 30 + 70 | — | — | — | LiPF$_6$ | 1.2 | 73 |
| 1-47 | | | Formula (16-1) | 1 | −0.70 | | | 73 |
| 1-48 | | | Formula (16-2) | 1 | — | | | 72 |
| 1-49 | | | Formula (16-3) | 1 | — | | | 72 |

The capacity retention rate was greatly varied depending on the presence or absence of an unsaturated cyclic compound. In the followings, the capacity retention rate obtained when the electrolytic solution contained no unsaturated cyclic compound or no other compound (Experiment Example 1-46) was employed as a comparison reference value.

More specifically, in the cases where each of the electrolytic solutions contained another compound (Experiment Examples 1-47 to 1-49), the capacity retention rates were at almost the same as or lower than the comparison reference value. In contrast, in the cases where each of the electrolytic solutions contained an unsaturated cyclic compound (Experiment Examples 1-1 to 1-45), the capacity retention rates were increased independently on the types and contents of the unsaturated cyclic compounds.

Particularly, in the cases where each of the electrolytic solutions contained an unsaturated cyclic compound, satisfactory capacity retention rates were achieved when the content of each of the unsaturated cyclic compounds in an electrolytic solution was 0.01 to 5% by weight.

As apparent from the comparison of energy of LUMOs (Experiment Examples 1-6, 1-23, 1-42, 1-43 and 1-47), even in the cases where unsaturated cyclic compounds each having a small energy of a LUMO and therefore capable of being reduced easily were used (Experiment Examples 1-42, 1-43), the capacity retention rates were increased.

Experiment Examples 2-1 to 2-30

Secondary batteries were produced and the battery properties were examined by the same procedures as mentioned above, except that the compositions of the solvents were changed as shown in Tables 3 and 4 and the charging voltage was changed to 4.45 V.

The types and mixing ratios (% by weight) of newly used solvents are shown in Tables 3 and 4. More specifically, as the carbonic acid esters, propylene carbonate (PC) that was a cyclic carbonic acid ester and diethyl carbonate (DEC) that was a linear carbonic acid ester were used. As the linear carboxylic acid ester, propyl propionate (PP) was used. As the unsaturated cyclic carbonic acid ester, vinylene carbonate (VC) was used. As the halogenated carbonic acid ester, 4-fluoro-1,3-dioxolan-2-one (FEC) was used. As the sulfonic acid esters, propanesultone (PS) and propenesultone (PRS) were used. As the acid anhydrides, succinic anhydride (SAH), maleic anhydride (MAH) and sulfopropionic anhydride (PSAH) were used. As the polyvalent nitrile compounds, succinonitrile (SN) and adiponitrile (AN) were used.

TABLE 3

Negative electrode active material: carbon material (graphite), charging voltage = 4.45 V

| | Solvent | | | | | | Capacity |
|---|---|---|---|---|---|---|---|
| | Carbonic acid ester etc. | | Unsaturated cyclic compound | | Electrolyte salt | | retention |
| Experiment Example | Type | Mixing ratio (% by weight) | Type | Content (% by weight) | Type | Content (mol/kg) | rate (%) |
| 2-1 | EC + EMC | 30 + 70 | Formula (1-1) | 1 | LiPF$_6$ | 1.2 | 67 |
| 2-2 | | | Formula (1-3) | 1 | | | 83 |
| 2-3 | | | Formula (1-4) | 1 | | | 82 |
| 2-4 | EC + EMC + VC | 29 + 69 + 2 | Formula (1-3) | 1 | LiPF$_6$ | 1.2 | 86 |
| 2-5 | EC + EMC + FEC | 29 + 69 + 2 | | | | | 86 |
| 2-6 | EC + EMC + PS | 29 + 69 + 2 | | | | | 87 |
| 2-7 | EC + EMC + PRS | 29 + 69 + 2 | | | | | 84 |
| 2-8 | EC + EMC + SAH | 29 + 69 + 2 | | | | | 84 |
| 2-9 | EC + EMC + MAH | 29 + 69 + 2 | | | | | 84 |
| 2-10 | EC + EMC + PSAH | 29 + 69 + 2 | | | | | 84 |
| 2-11 | EC + EMC + SN | 29 + 69 + 2 | | | | | 85 |
| 2-12 | EC + EMC + AN | 29 + 69 + 2 | | | | | 86 |
| 2-13 | EC + PC + PP | 25 + 15 + 60 | | | | | 83 |
| 2-14 | EC + PC + DEC + PP | 30 + 20 + 40 + 10 | | | | | 84 |
| 2-15 | EC + PC + DEC + PP | 25 + 15 + 30 + 30 | | | | | 84 |
| 2-16 | EC + PC + DEC + PP | 20 + 10 + 10 + 60 | | | | | 83 |

TABLE 4

Negative electrode active material: carbon material (graphite), charging voltage = 4.45 V

| | Solvent | | | | | | Capacity |
|---|---|---|---|---|---|---|---|
| | Carbonic acid ester etc. | | Unsaturated cyclic compound | | Electrolyte salt | | retention |
| Experiment Example | Type | Mixing ratio (% by weight) | Type | Content (% by weight) | Type | Content (mol/kg) | rate (%) |
| 2-17 | EC + EMC | 30 + 70 | — | — | LiPF$_6$ | 1.2 | 58 |
| 2-18 | EC + EMC + VC | 29 + 69 + 2 | | | | | 60 |
| 2-19 | EC + EMC + FEC | 29 + 69 + 2 | | | | | 61 |
| 2-20 | EC + EMC + PS | 29 + 69 + 2 | | | | | 65 |
| 2-21 | EC + EMC + PRS | 29 + 69 + 2 | | | | | 60 |
| 2-22 | EC + EMC + SAH | 29 + 69 + 2 | | | | | 59 |
| 2-23 | EC + EMC + MAH | 29 + 69 + 2 | | | | | 59 |
| 2-24 | EC + EMC + PSAH | 29 + 69 + 2 | | | | | 60 |
| 2-25 | EC + EMC + SN | 29 + 69 + 2 | | | | | 52 |
| 2-26 | EC + EMC + AN | 29 + 69 + 2 | | | | | 55 |
| 2-27 | EC + PC + PP | 25 + 15 + 60 | | | | | 53 |
| 2-28 | EC + PC + DEC + PP | 30 + 20 + 40 + 10 | | | | | 57 |
| 2-29 | EC + PC + DEC + PP | 25 + 15 + 30 + 30 | | | | | 54 |
| 2-30 | EC + PC + DEC + PP | 20 + 10 + 10 + 60 | | | | | 53 |

In the cases where the composition of each of the solvents was changed (Tables 3 and 4), the similar results to those shown in Tables 1 and 2 were obtained.

Namely, in the cases where each of the electrolytic solutions contained an unsaturated cyclic compound (Experiment Examples 2-1 to 2-16), the capacity retention rates were increased compared with the cases where each of the electrolytic solution did not contained an unsaturated cyclic compound (Experiment Examples 2-17 to 2-30).

Particularly, in the cases where each of the electrolytic solutions contained an unsaturated cyclic compound, the following tendencies were observed.

Firstly, when the electrolytic solution contained any one of an unsaturated cyclic carbonic acid ester, a halogenated carbonic acid ester, a sulfonic acid ester, an acid anhydride and a polyvalent nitrile compound (Experiment Examples 2-4 to 2-12), the capacity retention rate was further increased.

Secondly, when the electrolytic solution contained a carbonic acid ester and a linear carboxylic acid ester and the content ratio (mixing ratio) of the linear carboxylic acid ester was 10 to 60% by weight (Experiment Examples 2-13 to 2-16), a satisfactory capacity retention rate was achieved.

Experiment Examples 3-1 to 3-14

Secondary batteries were produced and the battery properties were examined by the same procedures as mentioned above, except that the compositions of the electrolyte salts were changed as shown in Table 5 and the charging voltage was changed to 4.45 V.

The types and content ratios (% by weight) of the newly used electrolyte salts are shown in Table 5. More specifically, as the electrolyte salts, lithium tetrafluoroborate (LiBF$_4$), a compound (LiDFOB) represented by Formula (10-1), a compound (LiDFOP) represented by Formula (10-2), a compound (LiBOB) represented by Formula (10-6), lithium bis(fluorosulfonyl)amide (LiFSA), lithium bis(trifluoromethanesulfonyl)amide (LiTFSA) and lithium difluorophosphate (LiPF$_2$O$_2$) were used. In this case, a portion of the electrolyte salt already used was replaced by any one of the new electrolyte salts.

TABLE 5

Negative electrode active material: carbon material (graphite), charging voltage = 4.45V

| | Solvent | | | | | | |
|---|---|---|---|---|---|---|---|
| | Carbonic acid ester etc. | | Unsaturated cyclic compound | | Electrolyte salt | | Capacity retention rate |
| Experiment Example | Type | Mixing ratio (% by weight) | Type | Content (% by weight) | Type | Content (mol/kg) | |
| 3-1 | EC + EMC | 30 + 70 | Formula (1-3) | 1 | LiPF$_6$ + LiBF$_4$ | 1.2 + 0.08 | 84 |
| 3-2 | | | | | LiPF$_6$ + LiDFOB | 1.2 + 0.08 | 85 |
| 3-3 | | | | | LiPF$_6$ + LiDFOP | 1.2 + 0.08 | 85 |
| 3-4 | | | | | LiPF$_6$ + LiBOB | 1.2 + 0.08 | 85 |
| 3-5 | | | | | LiPF$_6$ + LiFSA | 1.2 + 0.08 | 85 |
| 3-6 | | | | | LiPF$_6$ + LiTFSA | 1.2 + 0.08 | 85 |
| 3-7 | | | | | LiPF$_6$ + LiPF$_2$O$_2$ | 1.2 + 0.08 | 85 |
| 3-8 | EC + EMC | 30 + 70 | — | — | LiPF$_6$ + LiBF$_4$ | 1.2 + 0.08 | 60 |
| 3-9 | | | | | LiPF$_6$ + LiDFOB | 1.2 + 0.08 | 60 |
| 3-10 | | | | | LiPF$_6$ + LiDFOP | 1.2 + 0.08 | 60 |
| 3-11 | | | | | LiPF$_6$ + LiBOB | 1.2 + 0.08 | 59 |
| 3-12 | | | | | LiPF$_6$ + LiFSA | 1.2 + 0.08 | 60 |
| 3-13 | | | | | LiPF$_6$ + LiTFSA | 1.2 + 0.08 | 58 |
| 3-14 | | | | | LiPF$_6$ + LiPF$_2$O$_2$ | 1.2 + 0.08 | 59 |

In the cases where the compositions of the electrolyte salts were changed (Table 5), the similar results to those shown in Tables 1 and 2 were obtained.

Namely, in the cases where each of the electrolytic solutions contained an unsaturated cyclic compound (Experiment Examples 3-1 to 3-7), the capacity retention rates were increased compared with the cases where each of the electrolytic solutions did not contain an unsaturated cyclic compound (Experiment Examples 3-8 to 3-14). Particularly, in the cases where each of the electrolytic solutions contained an unsaturated cyclic compound, the capacity retention rates were further increased depending on the types of the newly used electrolytic salts.

Experiment Examples 4-1 to 4-7

Secondary batteries were produced and the battery properties were examined by the same procedures as mentioned above, except that the type of the negative electrode active material was changed as shown in Table 6.

As the negative electrode active material, a mixture of a carbon material (graphite) and a metal-based material (silicon, median diameter D50=5 μm) was used. In this case, a mixing ratio (by weight) of the carbon material and the metal-based material was as follows: (carbon material):(metal-based material)=90:10.

TABLE 6

Negative electrode active material: carbon material (graphite) + metal-based material (silicon), charging voltage = 4.2 V

| | Solvent | | | | | | |
|---|---|---|---|---|---|---|---|
| | Carbonic acid ester etc. | | Unsaturated cyclic compound | | Electrolyte salt | | Capacity retention rate (%) |
| Experiment Example | Type | Mixing ratio (% by weight) | Type | Content (% by weight) | Type | Content (mol/kg) | |
| 4-1 | EC + EMC | 30 + 70 | Formula (1-1) | 1 | LiPF$_6$ | 1.2 | 72 |
| 4-2 | | | Formula (1-2) | 1 | | | 79 |
| 4-3 | | | Formula (1-3) | 1 | | | 83 |

TABLE 6-continued

Negative electrode active material: carbon material (graphite) + metal-based material (silicon), charging voltage = 4.2 V

| | Solvent | | | | | |
|---|---|---|---|---|---|---|
| | Carbonic acid ester etc. | | Unsaturated cyclic compound | | | Capacity |
| | | Mixing | | Content | Electrolyte salt | retention |
| Experiment Example | Type | ratio (% by weight) | Type | (% by weight) | Type | Content (mol/kg) | rate (%) |
| 4-4 | — | | — | | | | 62 |
| 4-5 | | | Formula (16-1) | 1 | | | 62 |
| 4-6 | | | Formula (16-2) | 1 | | | 61 |
| 4-7 | | | Formula (16-3) | 1 | | | 61 |

In the cases where the type of the negative electrode active material was changed (Table 6), the similar results to those shown in Tables 1 and 2 were obtained.

Namely, when the capacity retention rate achieved when each of the electrolytic solutions did not contained the unsaturated cyclic compound or another compound (Experiment Example 4-4) was employed as a comparison reference value, the capacity retention rates were at the similar levels to the comparison reference value in the cases where each of the electrolytic solutions contained another compound (Experiment Examples 4-5 to 4-7), while the capacity retention rates were increased in the cases where each of the electrolytic solutions contained the unsaturated cyclic compound (Experiment Examples 4-1 to 4-3).

From the results shown in Tables 1 to 6, when each of the electrolytic solutions contained an unsaturated cyclic compound, the cycle properties were improved. As a result, excellent battery properties were achieved in the secondary batteries.

Hereinabove, the present disclosure has been described with reference to its embodiments and examples. However, the present disclosure is not intended to be limited to those embodiments and examples, and various modifications may be made in the technique.

More specifically, cylinder-type secondary batteries and laminate film-type secondary batteries have been described, but the present disclosure is not limited to these embodiments. For example, the secondary battery may also be a square-form secondary battery and a coin-like secondary battery.

The case where the battery element has a wound structure has been described, but the present disclosure is not limited to this embodiment. For example, the battery element may have another structure such as a laminated structure.

A lithium ion secondary battery in which the capacity of a negative electrode can be obtained by utilizing the lithium absorption phenomenon and the lithium storage phenomenon and a lithium ion secondary battery in which the capacity of a negative electrode can be obtained by utilizing the lithium deposition phenomenon and the lithium dissolution phenomenon have been described, but the present disclosure is not limited to these embodiments. For example, the present disclosure may be a secondary battery in which the capacity of a negative electrode can be obtained on the basis of the sum total of a capacity produced as the result of the lithium absorption phenomenon and the lithium release phenomenon and a capacity produced as the result of the lithium deposition phenomenon and the lithium dissolution phenomenon by reducing the capacity of a negative electrode active material capable of absorbing/releasing lithium to a value smaller than the capacity of a positive electrode.

A secondary battery in which lithium is used as an electrode reactive material has been described, but the present disclosure is not limited to this embodiment. The electrode active material may be, for example, another element belonging to Group 1 on the long format of periodic table (e.g., sodium, potassium), or an element belonging to Groups 2 on the long format of periodic table (e.g., magnesium, calcium), or another light metal (e.g., aluminum).

The effects described in this description are illustrative only and not restrictive, and the effects of the present disclosure are not intended to be limited thereto and may be other effects.

The present disclosure is described in further details according to an embodiment of the present disclosure.

(1) A secondary battery including:
a positive electrode;
a negative electrode; and
an electrolytic solution containing an unsaturated cyclic compound represented by the following Formula (1):

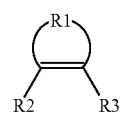

(1)

(wherein:
R1 represents any one group selected from a bivalent hydrocarbon group, a bivalent halogenated hydrocarbon group, a group having such a structure that at least one ether bond (—O—) is introduced into a bivalent hydrocarbon group, a group having such a structure that at least one ether bond is introduced into a bivalent halogenated hydrocarbon group, a group having such a structure that at least one carbonyl group (—C(═O)—) is introduced into a bivalent hydrocarbon group, a group having such a structure that at least one carbonyl group is introduced into a bivalent halogenated hydrocarbon group, a group having such a structure that at least one ether bond and at least one carbonyl group are introduced into a bivalent hydrocarbon group, and a group having such a structure that at least one ether bond and at least one carbonyl group are introduced into a bivalent halogenated hydrocarbon group; and R2 and R3 independently represent any one group selected from a hydrogen group, a halogen group, a monovalent hydrocarbon group, a monovalent halogenated hydrocarbon group, a monovalent oxygen-containing hydrocarbon group, a monovalent halogenated oxygen-containing hydrocarbon group, and a monovalent group having such a structure that at least two of the aforementioned groups are bonded to each other, provided that:

a ring containing R1 and a carbon-carbon double bond (>C=C<) is a non-aromatic ring;

when R2 represents a hydrogen group, R3 represents a group other than a hydrogen group and a halogen group;

when R2 represents a halogen group, R3 represents a group other than a hydrogen group, a monovalent oxygen-containing hydrocarbon group and a monovalent halogenated oxygen-containing hydrocarbon group; and R2 and R3 may be bonded to each other). other than hydrogen group, and R2 and R3 may be bonded to each other).

(2) The secondary battery according to (1), wherein:

the bivalent hydrocarbon group is any one group selected from an alkylene group, an alkenylene group, an alkynylene group, a cycloalkylene group, an arylene group, and a bivalent group having such a structure that at least two of these groups are bonded to each other, the bivalent halogenated hydrocarbon group is a group having such a structure that at least one hydrogen group in any one of the aforementioned bivalent hydrocarbon groups is substituted by a halogen group, the halogen group is any one group selected from a fluorine group, a chlorine group, a bromine group and an iodine group, the monovalent hydrocarbon group is any one group selected from an alkyl group, an alkenyl group, an alkynyl group, a cycloalkyl group, an aryl group, and a monovalent group having such a structure that at least two of these groups are bonded to each other, the monovalent halogenated hydrocarbon group is a group having such a structure that at least one hydrogen group in any one of the aforementioned monovalent hydrocarbon groups is substituted by a halogen group, the monovalent oxygen-containing hydrocarbon group is an alkoxy group, the monovalent halogenated oxygen-containing hydrocarbon group is a group having such a structure that at least one hydrogen group in any one of the aforementioned monovalent oxygen-containing hydrocarbon groups is substituted by a halogen group, and the halogen group contained in each of the bivalent halogenated hydrocarbon group, the monovalent halogenated hydrocarbon group and the monovalent halogenated oxygen-containing hydrocarbon group includes at least one of a fluorine group, a chlorine group, a bromine group and an iodine group.

(3) The secondary battery according to (2), wherein:

the number of carbon atom(s) in the alkylene group is 1 to 3 inclusive, the number of carbon atoms in each of the alkenylene group and the alkynylene group is 2 or 3, the number of carbon atoms in each of the cycloalkylene group and the arylene group is 6 to 10 inclusive, the number of carbon atom(s) in each of the alkyl group and the alkoxy group is 1 to 4 inclusive, the number of carbon atoms in each of the alkenyl group and the alkynyl group is 2 to 4 inclusive, and the number of carbon atoms in each of the cycloalkyl group and the aryl group is 6 to 10 inclusive.

(4) The secondary battery according to any one of (1) to (3), wherein R1 represents a perfluoroalkylene group.

(5) The secondary battery according to any one of (1) to (4), wherein the unsaturated cyclic compound comprises a compound represented by the following Formula (2):

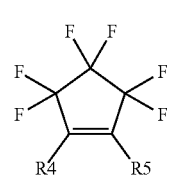

(wherein:

R4 and R5 independently represent any one group selected from a hydrogen group, a halogen group, a monovalent hydrocarbon group, a monovalent halogenated hydrocarbon group, a monovalent oxygen-containing hydrocarbon group, a monovalent halogenated oxygen-containing hydrocarbon group, and a monovalent group having such a structure that at least two of these groups are bonded to each other;

provided that:

when R4 represents a hydrogen group, R5 represents a group other than a hydrogen group and a halogen group;

when R4 represents a halogen group, R5 represents a group other than a hydrogen group, a monovalent oxygen-containing hydrocarbon group and a monovalent halogenated oxygen-containing hydrocarbon group; and R4 and R5 may be bonded to each other).

(6) The secondary battery according to any one of (1) to (5), wherein the content of the unsaturated cyclic compound in the electrolytic solution is 0.01 to 5% by weight inclusive.

(7) The secondary battery according to any one of (1) to (6), wherein:

the electrolytic solution further contains a carbonic acid ester and a linear carbonic acid ester; and the content of the linear carbonic acid ester is 10 to 60% by weight inclusive relative to the sum total of the content of the carbonic acid ester and the content of the linear carbonic acid ester.

(8) The secondary battery according to any one of (1) to (7), wherein the electrolytic solution further contains at least one of an unsaturated cyclic carbonic acid ester, a halogenated carbonic acid ester, a sulfonic acid ester, an acid anhydride and a polyvalent nitrile compound.

(9) The secondary battery according to any one of (1) to (8), wherein the negative electrode contains at least one of a carbon material and a material containing silicon as a constituent element.

(10) The secondary battery according to any one of (1) to (9), wherein the secondary battery is a lithium ion secondary battery.

(11) An electrolytic solution for secondary batteries, containing an unsaturated cyclic compound represented by the following Formula (1):

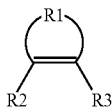

(wherein R1 represents any one group selected from a bivalent hydrocarbon group, a bivalent halogenated hydrocarbon group, a group having such a structure that at least one ether bond is introduced into a bivalent hydrocarbon group, a group having such a structure that at least one ether bond is introduced into a bivalent halogenated hydrocarbon group, a group having such a structure that at least one carbonyl group is introduced into a bivalent hydrocarbon group, a group having such a structure that at least one carbonyl group is introduced into a bivalent halogenated hydrocarbon group, a group having such a structure that at least one ether bond and at least one carbonyl group are introduced into a bivalent hydrocarbon group, and a group having such a structure that at least one ether bond and at least one carbonyl group are introduced into a bivalent halogenated hydrocarbon group; and R2 and R3 independently represent any one group selected from a hydrogen group, a halogen group, a monovalent hydrocarbon group, a monovalent halogenated hydrocarbon group, a monovalent oxygen-containing hydrocarbon group, a monovalent halogenated oxygen-containing hydrocarbon group, and a monovalent group having such a structure that at least two of the aforementioned groups are bonded to each other, provided that:

a ring containing R1 and a carbon-carbon double bond is a non-aromatic ring;

when R2 represents a hydrogen group, R3 represents a group other than a hydrogen group and a halogen group;

when R2 represents a halogen group, R3 represents a group other than a hydrogen group, a monovalent oxygen-containing hydrocarbon group and a monovalent halogenated oxygen-containing hydrocarbon group; and R2 and R3 may be bonded to each other).

(12) A battery pack including:

a secondary battery as recited in any one of (1) to (10);

a control unit for controlling the operation of the secondary battery; and a switch unit for switching the operation of the secondary battery in response to a command from the control unit.

(13) An electric vehicle including:

a secondary battery as recited in any one of (1) to (10);

a conversion unit for converting an electric power supplied from the secondary battery to a driving force;

a driving unit for driving in response to the driving force; and a control unit for controlling the operation of the secondary battery.

(14) An electric power storage system including:

a secondary battery as recited in any one of (1) to (10);

at least one electric device to which an electric power is supplied from the secondary battery; and a control unit for controlling the supply of an electric power from the secondary battery to the electric device.

(15) An electric power tool including:

a secondary battery as recited in any one of (1) to (10); and a movable unit to which an electric power is supplied from the secondary battery.

(16) An electronic device including a secondary battery as recited in any one of (1) to (10) as an electric power supply source.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A secondary battery comprising:
a positive electrode;
a negative electrode; and
a non-aqueous electrolytic solution including an unsaturated cyclic compound represented by Chemical Formula (1):

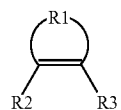

wherein:

R1 represents at least one group selected from the group consisting of a bivalent hydrocarbon group, a bivalent halogenated hydrocarbon group, a group having such a structure that at least one ether bond (—O—) is introduced into a bivalent hydrocarbon group, a group having such a structure that at least one ether bond is introduced into a bivalent halogenated hydrocarbon group, a group having such a structure that at least one carbonyl group (—C(=O)—) is introduced into a bivalent hydrocarbon group, a group having such a structure that at least one carbonyl group is introduced into a bivalent halogenated hydrocarbon group, a group having such a structure that at least one ether bond and at least one carbonyl group are introduced into a bivalent hydrocarbon group, and a group having such a structure that at least one ether bond and at least one carbonyl group are introduced into a bivalent halogenated hydrocarbon group; and R2 and R3 independently represent at least one group selected from the group consisting of a hydrogen group, a halogen group, a monovalent hydrocarbon group, a monovalent halogenated hydrocarbon group, a monovalent oxygen-containing hydrocarbon group, a monovalent halogenated oxygen-containing hydrocarbon group, and a monovalent group having such a structure that at least two of the aforementioned groups are bonded to each other, a ring including R1 and a carbon-carbon double bond (>C=C<) is a non-aromatic ring;

in a case R2 represents a hydrogen group, R3 represents a group other than a hydrogen group and a halogen group;

in a case R2 represents a halogen group, R3 represents a group other than a hydrogen group, a monovalent oxygen-containing hydrocarbon group and a monovalent halogenated oxygen-containing hydrocarbon group; and R2 and R3 is configured to be bonded to each other;

wherein:

the bivalent hydrocarbon group includes at least one group selected from the group consisting of an alkylene group, an alkenylene group, an alkynylene group, a cycloalkylene group, an arylene group, and a bivalent group having such a structure that at least two of these groups are bonded to each other, the bivalent halogenated hydrocarbon group includes a group having such a structure that at least one hydrogen group in any one of the aforementioned bivalent hydrocarbon groups is substituted by a halogen group, the halogen group includes at least one of a fluorine group, a chlorine group, a bromine group and an iodine group, the monovalent hydrocarbon group includes at least one of an alkyl group, an alkenyl group, an alkynyl group, a cycloalkyl group, an aryl group, and a monovalent group having such a structure that at least two of these groups are bonded to each other, the monovalent halogenated hydrocarbon group includes a group having such a structure that at least one hydrogen group in any one of the aforementioned monovalent hydrocarbon groups is substituted by a halogen group, the monovalent oxygen-containing hydrocarbon group includes an alkoxy group, the monovalent halogenated oxygen-containing hydrocarbon group includes a group having such a structure that at least one hydrogen group in any one of the aforementioned monovalent oxygen-containing hydrocarbon groups is substituted by a halogen group, and the halogen group included in each of the bivalent halogenated hydrocarbon group, the monovalent halogenated hydrocarbon group and the monovalent halogenated oxygen-containing hydrocarbon group includes at least one of a fluorine group, a chlorine group, a bromine group and an iodine group;

wherein:

the number of carbon atom(s) in the alkylene group is from 1 to 3, the number of carbon atoms in each of the alkenylene group and the alkynylene group is 2 or 3, the number of carbon atoms in each of the cycloalkylene group and the arylene group is from 6 to 10, the number of carbon atom(s) in each of the alkyl group and the alkoxy group is from 1 to 4, the number of carbon atoms in each of the alkenyl group and the alkynyl group is from 2 to 4, and the number of carbon atoms in each of the cycloalkyl group and the aryl group is from 6 to 10; and wherein a content of the unsaturated cyclic compound in the non-aqueous electrolytic solution is from 0.01 to 5% by weight.

2. The secondary battery according to claim 1, wherein R1 represents a perfluoroalkylene group.

3. The secondary battery according to claim 1, wherein the unsaturated cyclic compound comprises a compound represented by Chemical Formula (2):

(Chemical Formula 2)

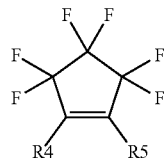

(2)

wherein:

R4 and R5 independently represent at least one group selected from the group consisting of a hydrogen group, a halogen group, a monovalent hydrocarbon group, a monovalent halogenated hydrocarbon group, a monovalent oxygen-containing hydrocarbon group, a monovalent halogenated oxygen-containing hydrocarbon group, and a monovalent group having such a structure that at least two of these groups are bonded to each other;

in a case R4 represents a hydrogen group, R5 represents a group other than a hydrogen group and a halogen group;

in a case R4 represents a halogen group, R5 represents a group other than a hydrogen group, a monovalent oxygen-containing hydrocarbon group and a monovalent halogenated oxygen-containing hydrocarbon group; and R4 and R5 is configured to be bonded to each other.

4. The secondary battery according to claim 1, wherein:

the non-aqueous electrolytic solution further includes a carbonic acid ester and a linear carbonic acid ester; and a content of the linear carbonic acid ester is from 10 to 60% by weight relative to a sum total of the content of the carbonic acid ester and a content of the linear carbonic acid ester.

5. The secondary battery according to claim 1, wherein the non-aqueous electrolytic solution further includes at least one of an unsaturated cyclic carbonic acid ester, a halogenated carbonic acid ester, a sulfonic acid ester, an acid anhydride and a polyvalent nitrile compound.

6. The secondary battery according to claim 1, wherein the negative electrode includes at least one of a carbon material and a material including silicon as a constituent element.

7. The secondary battery according to claim 1, wherein the secondary battery includes a lithium ion secondary battery.

8. A non-aqueous electrolytic solution for secondary batteries comprising an unsaturated cyclic compound represented by Chemical Formula (1):

(Chemical Formula 1)

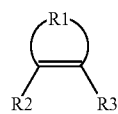

(1)

wherein:

R1 represents at least one group selected from the group consisting of a bivalent hydrocarbon group, a bivalent halogenated hydrocarbon group, a group having such a structure that at least one ether bond is introduced into a bivalent hydrocarbon group, a group having such a structure that at least one ether bond is introduced into a bivalent halogenated hydrocarbon group, a group having such a structure that at least one carbonyl group is introduced into a bivalent hydrocarbon group, a group having such a structure that at least one carbonyl group is introduced into a bivalent halogenated hydrocarbon group, a group having such a structure that at least one ether bond and at least one carbonyl group are introduced into a bivalent hydrocarbon group, and a group having such a structure that at least one ether bond and at least one carbonyl group are introduced into a bivalent halogenated hydrocarbon group; and R2 and R3 independently represent at least one group selected from the group consisting of a hydrogen group, a halogen group, a monovalent hydrocarbon group, a monovalent halogenated hydrocarbon group, a monovalent oxygen-containing hydrocarbon group, a monovalent halogenated oxygen-containing hydrocarbon group, and a monovalent group having such a structure that at least two of the aforementioned groups are bonded to each other, a ring including R1 and a carbon-carbon double bond is a non-aromatic ring;

in a case R2 represents a hydrogen group, R3 represents a group other than a hydrogen group and a halogen group;

in a case R2 represents a halogen group, R3 represents a group other than a hydrogen group, a monovalent oxygen-containing hydrocarbon group and a monovalent halogenated oxygen-containing hydrocarbon group; and R2 and R3 is configured to be bonded to each other;

wherein:

the bivalent hydrocarbon group includes at least one group selected from the group consisting of an alkylene group, an alkenylene group, an alkynylene group, a cycloalkylene group, an arylene group, and a bivalent group having such a structure that at least two of these groups are bonded to each other, the bivalent halogenated hydrocarbon group includes a group having such a structure that at least one hydrogen group in any one of the aforementioned bivalent hydrocarbon groups is substituted by a halogen group, the halogen group includes at least one of a fluorine group, a chlorine group, a bromine group and an iodine group, the monovalent hydrocarbon group includes at least one of an alkyl group, an alkenyl group, an alkynyl group, a cycloalkyl group, an aryl group, and a monovalent group having such a structure that at least two of these groups are bonded to each other, the monovalent halogenated hydrocarbon group includes a group having such a structure that at least one hydrogen group in any one of the aforementioned monovalent hydrocarbon groups is substituted by a halogen group, the monovalent oxygen-containing hydrocarbon group includes an alkoxy group, the monovalent halogenated oxygen-containing hydrocarbon group includes a group having such a structure that at least one hydrogen group in any one of the aforementioned monovalent oxygen-containing hydrocarbon groups is substituted by a halogen group, and the halogen group included in each of the bivalent halogenated hydrocarbon group, the monovalent halogenated hydrocarbon group and the monovalent halogenated oxygen-containing hydrocarbon group includes at least one of a fluorine group, a chlorine group, a bromine group and an iodine group;

wherein:

the number of carbon atom(s) in the alkylene group is from 1 to 3, the number of carbon atoms in each of the alkenylene group and the alkynylene group is 2 or 3, the number of carbon atoms in each of the cycloalkylene group and the arylene group is from 6 to 10, the number of carbon atom(s) in each of the alkyl group and the alkoxy group is from 1 to 4, the number of carbon atoms in each of the alkenyl group and the alkynyl group is from 2 to 4, and the number of carbon atoms in each of the cycloalkyl group and the aryl group is from 6 to 10; and wherein a content of the unsaturated cyclic compound in the non-aqueous electrolytic solution is from 0.01 to 5% by weight.

9. A battery pack comprising:

a secondary battery;

a controller configured to control an operation of the secondary battery; and a switch configured to switch the operation of the secondary battery in response to a command from the controller, wherein the secondary battery is provided with:

a positive electrode;

a negative electrode; and a non-aqueous electrolytic solution containing an unsaturated cyclic compound represented by Chemical Formula (1):

(Chemical Formula 1)

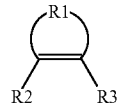

(1)

wherein:

R1 represents at least one group selected from the group consisting of a bivalent hydrocarbon group, a bivalent halogenated hydrocarbon group, a group having such a structure that at least one ether bond is introduced into a bivalent hydrocarbon group, a group having such a structure that at least one ether bond is introduced into a bivalent halogenated hydrocarbon group, a group having such a structure that at least one carbonyl group is introduced into a bivalent hydrocarbon group, a group having such a structure that at least one carbonyl group is introduced into a bivalent halogenated hydrocarbon group, a group having such a structure that at least one ether bond and at least one carbonyl group are introduced into a bivalent hydrocarbon group, and a group having such a structure that at least one ether bond and at least one carbonyl group are introduced into a bivalent halogenated hydrocarbon group; and R2 and R3 independently represent at least one group selected from the group consisting of a hydrogen group, a halogen group, a monovalent hydrocarbon group, a monovalent halogenated hydrocarbon group, a monovalent oxygen-containing hydrocarbon group, a monovalent halogenated oxygen-containing hydrocarbon group, and a monovalent group having such a structure that at least two of the aforementioned groups are bonded to each other, a ring including R1 and a carbon-carbon double bond is a non-aromatic ring;

in a case R2 represents a hydrogen group, R3 represents a group other than a hydrogen group and a halogen group;

in a case R2 represents a halogen group, R3 represents a group other than a hydrogen group, a monovalent oxygen-containing hydrocarbon group and a monovalent halogenated oxygen-containing hydrocarbon group; and R2 and R3 is configured to be bonded to each other;

wherein:

the bivalent hydrocarbon group includes at least one group selected from the group consisting of an alkylene group, an alkenylene group, an alkynylene group, a cycloalkylene group, an arylene group, and a bivalent group having such a structure that at least two of these groups are bonded to each other, the bivalent halogenated hydrocarbon group includes a group having such a structure that at least one hydrogen group in any one of the aforementioned bivalent hydrocarbon groups is substituted by a halogen group, the halogen group includes at least one of a fluorine group, a chlorine group, a bromine group and an iodine group, the monovalent hydrocarbon group includes at least one of an alkyl group, an alkenyl group, an alkynyl group, a cycloalkyl group, an aryl group, and a monovalent group having such a structure that at least two of these groups are bonded to each other, the monovalent halogenated hydrocarbon group includes a group having such a structure that at least one hydrogen group in any one of the aforementioned monovalent hydrocarbon groups is substituted by a halogen group, the monovalent oxygen-containing hydrocarbon group includes an alkoxy group, the monovalent halogenated oxygen-containing hydrocarbon group includes a group having such a structure that at least one hydrogen group in any one of the aforementioned monovalent oxygen-containing hydrocarbon groups is substituted by a halogen group, and the halogen group included in each of the bivalent halogenated hydrocarbon group, the monovalent halogenated hydrocarbon group and the monovalent halogenated oxygen-containing hydrocarbon group includes at least one of a fluorine group, a chlorine group, a bromine group and an iodine group;

wherein:

the number of carbon atom(s) in the alkylene group is from 1 to 3, the number of carbon atoms in each of the alkenylene group and the alkynylene group is 2 or 3, the number of carbon atoms in each of the cycloalkylene group and the arylene group is from 6 to 10, the number of carbon atom(s) in each of the alkyl group and the alkoxy group is from 1 to 4, the number of carbon atoms in each of the alkenyl group and the alkynyl group is from 2 to 4, and the number of carbon atoms in each of the cycloalkyl group and the aryl group is from 6 to 10; and wherein a content of the unsaturated cyclic compound in the non-aqueous electrolytic solution is from 0.01 to 5% by weight.

10. An electric vehicle comprising:

the secondary battery according to claim 1;

a converter configured to convert an electric power supplied from the secondary battery to a driving force;

a driver configured to drive in response to the driving force; and a controller configured to control an operation of the secondary battery.

11. An electric power storage system comprising:

the secondary battery according to claim 1;

at least one electric device to which an electric power is configured to be supplied from the secondary battery; and a controller configured to control the supply of an electric power from the secondary battery to the electric device.

12. An electric power tool comprising:

the secondary battery according to claim 1; and a movable unit to which an electric power is configured to be suppled from the secondary battery.

13. An electronic device comprising the secondary battery according to claim 1 as an electric power supply source.

* * * * *